(12) United States Patent
Khandani

(10) Patent No.: US 11,057,204 B2
(45) Date of Patent: Jul. 6, 2021

(54) METHODS FOR ENCRYPTED DATA COMMUNICATIONS

(71) Applicant: Amir Keyvan Khandani, Kitchener (CA)

(72) Inventor: Amir Keyvan Khandani, Kitchener (CA)

(73) Assignee: Amir Keyvan Khandani, Kitchener (CA)

( * ) Notice: Subject to any disclaimer, the term of this patent is extended or adjusted under 35 U.S.C. 154(b) by 146 days.

(21) Appl. No.: 16/152,282

(22) Filed: Oct. 4, 2018

(65) Prior Publication Data

US 2019/0103964 A1 Apr. 4, 2019

Related U.S. Application Data

(60) Provisional application No. 62/740,792, filed on Oct. 3, 2018, provisional application No. 62/675,611, filed
(Continued)

(51) Int. Cl.
*H04L 9/08* (2006.01)
*H04L 29/06* (2006.01)
*G06F 21/62* (2013.01)

(52) U.S. Cl.
CPC ............ *H04L 9/0869* (2013.01); *G06F 21/62* (2013.01); *H04L 9/085* (2013.01); *H04L 9/0858* (2013.01);
(Continued)

(58) Field of Classification Search
CPC ....... H04L 9/0869; H04L 63/06; H04L 9/085; H04L 9/0891; H04L 9/0897;
(Continued)

(56) References Cited

U.S. PATENT DOCUMENTS 2,995,752 A 8/1961 Shyhalla
3,082,421 A 3/1963 Nicholas
(Continued)

FOREIGN PATENT DOCUMENTS

EP 2180623 4/2010
GB 1091437 11/1967
(Continued)

OTHER PUBLICATIONS

International Preliminary Report on Patentability for PCT/US2013/040822, dated Nov. 18, 2014, (6 pages).
(Continued)

*Primary Examiner* — Aravind K Moorthy
(74) *Attorney, Agent, or Firm* — Invention Mine LLC

(57) ABSTRACT

Embodiments are directed to a method for encrypting data communications, including performing a stochastic procedure between a plurality of nodes, including at least a first node and a second node; collecting a measured outcome of the stochastic procedure, the measured outcome of the stochastic procedure providing a dependent random variable pair; and constructing an encryption key based on one or more correlations identified between at least a first random variable and a second random variable, the first and second random variables forming the dependent random variable pair.

21 Claims, 11 Drawing Sheets

Related U.S. Application Data on May 23, 2018, provisional application No. 62/573,139, filed on Oct. 16, 2017, provisional application No. 62/568,191, filed on Oct. 4, 2017.

(52) U.S. Cl.
CPC .......... *H04L 9/0875* (2013.01); *H04L 9/0891* (2013.01); *H04L 9/0897* (2013.01); *H04L 63/0478* (2013.01); *H04L 63/06* (2013.01); *H04L 63/0853* (2013.01); *H04L 63/0861* (2013.01); *H04L 63/0869* (2013.01); *H04L 63/0876* (2013.01)

(58) Field of Classification Search
CPC ............. H04L 63/0478; H04L 63/0853; H04L 63/0869; H04L 63/0861; H04L 63/0876; H04L 9/0875; H04L 9/0858; H04L 9/3273; H04L 9/0631; H04L 9/0894; H04L 9/0643; H04L 2209/34; G06F 21/62
See application file for complete search history.

(56) References Cited

U.S. PATENT DOCUMENTS

| | | |
|---|---|---|
| 3,184,747 A | 5/1965 | Kach |
| 3,725,920 A | 4/1973 | Kupfer |
| 3,965,475 A | 6/1976 | Deerkoski |
| 4,112,430 A | 9/1978 | Ladstatter |
| 4,268,727 A | 5/1981 | Agrawal |
| 4,343,005 A | 8/1982 | Han |
| 4,701,935 A | 10/1987 | Namiki |
| 4,750,165 A | 6/1988 | Champagne |
| 5,383,224 A | 1/1995 | Mizoguchi |
| 5,388,124 A | 2/1995 | Laroia |
| 5,596,439 A | 1/1997 | Dankberg et al. |
| 5,630,154 A | 5/1997 | Bolstad et al. |
| 5,691,978 A | 11/1997 | Kenworthy |
| 5,805,116 A | 9/1998 | Morley |
| 6,026,167 A * | 2/2000 | Aziz ............ H04L 9/0822 380/28 |
| 6,034,638 A | 3/2000 | Thiel et al. |
| 6,084,919 A | 7/2000 | Kleider et al. |
| 6,255,997 B1 | 7/2001 | Ratkorn |
| 6,281,988 B1 | 8/2001 | Leung |
| 6,317,092 B1 | 11/2001 | De Schweinitz |
| 6,369,758 B1 | 4/2002 | Zhang |
| 6,608,864 B1 | 8/2003 | Strait |
| 6,621,876 B2 | 9/2003 | Camp, Jr. |
| 6,731,908 B2 | 5/2004 | Berliner |
| 6,745,009 B2 | 6/2004 | Raghothaman |
| 6,781,991 B1 * | 8/2004 | Anderlind .......... H04L 41/5003 370/394 |
| 6,864,852 B2 | 3/2005 | Chiang et al. |
| 6,870,515 B2 | 3/2005 | Kitchener |
| 6,917,597 B1 | 7/2005 | Schmidl |
| 6,934,511 B1 | 8/2005 | Lovinggood et al. |
| 7,002,518 B2 | 2/2006 | Lin |
| 7,065,036 B1 | 6/2006 | Ryan |
| 7,091,894 B2 | 8/2006 | Fudge |
| 7,096,042 B2 | 8/2006 | Marinier |
| 7,184,466 B1 | 2/2007 | Seemann |
| 7,187,907 B2 | 3/2007 | Widrow |
| 7,221,688 B2 | 5/2007 | Vanness |
| 7,263,143 B1 | 8/2007 | Rothaar |
| 7,272,366 B2 | 9/2007 | Haapoja |
| 7,286,096 B2 | 10/2007 | Jaffer |
| 7,321,611 B2 | 1/2008 | Fullerton |
| 7,346,100 B2 | 3/2008 | Kumar |
| 7,471,204 B2 | 12/2008 | Safarian |
| 7,482,058 B2 | 1/2009 | Ahmed |
| 7,522,115 B2 | 4/2009 | Waltman |
| 7,627,325 B2 | 12/2009 | McCoy |
| 7,693,174 B2 | 4/2010 | Ishibashi |
| 7,706,744 B2 | 4/2010 | Rodgers |
| 7,817,641 B1 | 10/2010 | Khandani |
| 7,920,539 B2 | 4/2011 | Stanford |
| 7,944,871 B2 | 5/2011 | Imamura |
| 7,991,160 B2 | 8/2011 | Guccione |
| 8,023,438 B2 | 9/2011 | Kangasmaa |
| 8,031,744 B2 | 10/2011 | Radunovic |
| 8,064,502 B2 | 11/2011 | Sawai |
| 8,107,906 B2 | 1/2012 | Lum |
| 8,175,535 B2 | 5/2012 | Mu |
| 8,184,052 B1 | 5/2012 | Wu et al. |
| 8,184,061 B2 | 5/2012 | Sanford |
| 8,208,628 B2 | 6/2012 | Yener |
| 8,238,551 B2 | 8/2012 | Reznik |
| 8,280,046 B2 | 10/2012 | Rudolf |
| 8,306,480 B2 | 11/2012 | Muhammad |
| 8,351,874 B2 | 1/2013 | Dent |
| 8,373,582 B2 | 2/2013 | Hoffberg |
| 8,385,235 B2 | 2/2013 | Chiu |
| 8,401,196 B2 | 3/2013 | Goldberg |
| 8,405,543 B2 | 3/2013 | Kluge |
| 8,423,986 B1 * | 4/2013 | Grechanik ................ G06F 8/30 702/179 |
| 8,498,585 B2 | 7/2013 | Vandenameele |
| 8,587,492 B2 | 11/2013 | Runyon |
| 8,628,650 B2 | 1/2014 | Ah |
| 8,629,650 B2 | 1/2014 | Mohammadian |
| 8,644,768 B2 | 2/2014 | Kluge |
| 8,744,377 B2 | 6/2014 | Rimini |
| 8,767,869 B2 | 7/2014 | Rimini |
| 8,823,577 B2 | 9/2014 | Smid |
| 8,836,581 B2 | 9/2014 | Nysen |
| 8,836,601 B2 | 9/2014 | Sanford |
| 8,836,606 B2 | 9/2014 | Kish |
| 8,837,615 B2 | 9/2014 | Baldemair |
| 8,842,044 B2 | 9/2014 | Nysen |
| 8,860,629 B2 | 10/2014 | Shtrom |
| 8,897,269 B2 | 11/2014 | Ji |
| 8,918,692 B2 | 12/2014 | Braithwaite |
| 8,976,641 B2 | 3/2015 | Choi |
| 9,019,165 B2 | 4/2015 | Shtrom |
| 9,036,749 B2 | 5/2015 | Choi |
| 9,054,795 B2 | 6/2015 | Choi |
| 9,059,879 B2 | 6/2015 | Jaeger |
| 9,071,313 B2 | 6/2015 | Monsen |
| 9,077,071 B2 | 7/2015 | Shtrom |
| 9,077,407 B2 | 7/2015 | Koren |
| 9,077,421 B1 | 7/2015 | Mehlman |
| 9,093,758 B2 | 7/2015 | Kish |
| 9,130,693 B2 | 9/2015 | Reznik |
| 9,246,234 B2 | 1/2016 | Rao |
| 9,276,682 B2 | 3/2016 | Bharadia |
| 9,277,591 B2 | 3/2016 | Amini |
| 9,281,979 B2 | 3/2016 | Maltsev |
| 9,292,711 B1 * | 3/2016 | Roth ................... H04L 63/0876 |
| 9,319,877 B2 * | 4/2016 | Ando ................. H04W 12/041 |
| 9,337,885 B2 | 5/2016 | Mehlman |
| 9,438,421 B1 * | 9/2016 | Roth ....................... H04L 9/088 |
| 9,571,205 B1 | 2/2017 | Suarez |
| 9,608,705 B2 | 3/2017 | Maru |
| 9,622,098 B2 | 4/2017 | Emmanuel |
| 9,713,010 B2 | 7/2017 | Khandani |
| 9,791,552 B1 | 10/2017 | Schuman |
| 9,794,238 B2 * | 10/2017 | Wood ................... H04L 63/0876 |
| 10,067,746 B1 * | 9/2018 | Yu .............................. G06F 7/58 |
| 10,069,479 B1 | 9/2018 | Desclos |
| 10,097,521 B2 * | 10/2018 | Wood .................... H04L 9/0869 |
| 2001/0010495 A1 | 8/2001 | Helms |
| 2001/0024434 A1 * | 9/2001 | Ayyagari ................ H04L 47/10 370/347 |
| 2002/0028655 A1 | 3/2002 | Rosener et al. |
| 2002/0032004 A1 | 3/2002 | Widrow |
| 2002/0097810 A1 | 7/2002 | Seki |
| 2003/0043071 A1 | 3/2003 | Lilly et al. |
| 2003/0114128 A1 | 6/2003 | Haapoja |
| 2003/0189974 A1 | 10/2003 | Ferry |
| 2003/0189975 A1 | 10/2003 | Fullerton |
| 2003/0204728 A1 * | 10/2003 | Irwin .................. H04L 63/1416 713/176 |

(56) References Cited

U.S. PATENT DOCUMENTS

| | | |
|---|---|---|
| 2003/0206579 A1 | 11/2003 | Bryant |
| 2004/0022229 A1 | 2/2004 | Vanness |
| 2004/0027304 A1 | 2/2004 | Chiang et al. |
| 2004/0076246 A1 | 4/2004 | Vanderperren et al. |
| 2004/0078567 A1* | 4/2004 | Newbould ............ H04L 9/3247 |
| | | 713/161 |
| 2004/0132414 A1 | 7/2004 | Sendyk |
| 2005/0020771 A1 | 1/2005 | Ahmed |
| 2005/0024540 A1 | 2/2005 | Kim et al. |
| 2005/0052330 A1 | 3/2005 | Mehltretter |
| 2005/0057420 A1 | 3/2005 | Lin |
| 2005/0083863 A1 | 4/2005 | Umei |
| 2005/0129223 A1 | 6/2005 | Piket et al. |
| 2005/0275576 A1 | 12/2005 | Fudge |
| 2006/0014491 A1 | 1/2006 | Cleveland |
| 2006/0045063 A1 | 3/2006 | Stanford |
| 2006/0109067 A1 | 5/2006 | Shtrom |
| 2006/0192720 A1 | 8/2006 | Shtrom |
| 2007/0026804 A1 | 2/2007 | Ishibashi |
| 2007/0026807 A1 | 2/2007 | Kish |
| 2007/0036353 A1 | 2/2007 | Reznik |
| 2007/0057860 A1 | 3/2007 | Jaffer |
| 2007/0063875 A1 | 3/2007 | Hoffberg |
| 2007/0070902 A1* | 3/2007 | Elaoud ................ H04L 47/30 |
| | | 370/231 |
| 2007/0080891 A1 | 4/2007 | De Lustrac |
| 2007/0082617 A1 | 4/2007 | McCallister |
| 2007/0082622 A1 | 4/2007 | Leinonen et al. |
| 2007/0132651 A1 | 6/2007 | Nilsson |
| 2007/0189528 A1* | 8/2007 | Ueda ...................... H04W 12/04 |
| | | 380/44 |
| 2007/0254692 A1 | 11/2007 | McCoy |
| 2008/0009257 A1 | 1/2008 | Safarian |
| 2008/0063113 A1 | 3/2008 | Gao |
| 2008/0107046 A1 | 5/2008 | Kangasmaa |
| 2008/0123851 A1 | 5/2008 | Guccione |
| 2008/0129640 A1 | 6/2008 | Shtrom |
| 2008/0165874 A1 | 7/2008 | Steele et al. |
| 2008/0233966 A1 | 9/2008 | Scheim |
| 2008/0294970 A1* | 11/2008 | Gross ................ H03M 13/1102 |
| | | 714/801 |
| 2009/0092072 A1 | 4/2009 | Imamura |
| 2009/0100313 A1* | 4/2009 | Gross ........................ G06F 7/58 |
| | | 714/752 |
| 2009/0135748 A1 | 5/2009 | Lindoff et al. |
| 2009/0141900 A1 | 6/2009 | Ye |
| 2009/0186582 A1 | 7/2009 | Muhammad |
| 2009/0190558 A1* | 7/2009 | Strutt .................... H04L 1/0019 |
| | | 370/332 |
| 2009/0213770 A1 | 8/2009 | Mu |
| 2009/0253385 A1 | 10/2009 | Dent |
| 2009/0284218 A1 | 11/2009 | Mohammadian |
| 2009/0323582 A1 | 12/2009 | Proctor et al. |
| 2010/0003931 A1 | 1/2010 | Krishnan |
| 2010/0008406 A1 | 1/2010 | Sawai |
| 2010/0020771 A1 | 1/2010 | Ji |
| 2010/0022201 A1 | 1/2010 | Vandenameele |
| 2010/0086012 A1 | 4/2010 | Rofougaran |
| 2010/0153742 A1* | 6/2010 | Kuo ........................ H04L 63/04 |
| | | 713/189 |
| 2010/0165866 A1 | 7/2010 | Sachse |
| 2010/0165895 A1 | 7/2010 | Elahi |
| 2010/0167662 A1 | 7/2010 | Kluge |
| 2010/0232324 A1 | 9/2010 | Radunovic |
| 2010/0248714 A1 | 9/2010 | Kang |
| 2010/0271987 A1 | 10/2010 | Chiu |
| 2010/0321245 A1 | 12/2010 | Aoki |
| 2011/0080325 A1 | 4/2011 | Livneh et al. |
| 2011/0110451 A1 | 5/2011 | Tsai |
| 2011/0116639 A1 | 5/2011 | Yamada et al. |
| 2011/0143655 A1 | 6/2011 | Ahn |
| 2011/0149714 A1 | 6/2011 | Rimini |
| 2011/0268100 A1 | 11/2011 | Gorokhov |
| 2011/0299386 A1* | 12/2011 | Negoto .................... H04L 45/22 |
| | | 370/221 |
| 2012/0027113 A1 | 2/2012 | Gaal |
| 2012/0068904 A1 | 3/2012 | Shtrom |
| 2012/0087424 A1 | 4/2012 | Brown |
| 2012/0113862 A1 | 5/2012 | Santhanam et al. |
| 2012/0159279 A1 | 6/2012 | Braithwaite |
| 2012/0200158 A1 | 8/2012 | Takei |
| 2012/0201153 A1 | 8/2012 | Bharadia |
| 2012/0201173 A1 | 8/2012 | Jain |
| 2012/0220246 A1 | 8/2012 | Kushnir |
| 2012/0245941 A1* | 9/2012 | Cheyer .................... H04L 63/10 |
| | | 704/246 |
| 2012/0281834 A1 | 11/2012 | Reznik |
| 2012/0284788 A1* | 11/2012 | Fernandez Gutierrez ................ |
| | | H04L 63/12 |
| | | 726/7 |
| 2012/0300680 A1 | 11/2012 | Pietsch |
| 2012/0327881 A1 | 12/2012 | Nakano et al. |
| 2013/0010851 A1 | 1/2013 | Jaeger |
| 2013/0044791 A1 | 2/2013 | Rimini |
| 2013/0089009 A1 | 4/2013 | Li |
| 2013/0089021 A1 | 4/2013 | Gaal et al. |
| 2013/0099974 A1 | 4/2013 | Wang |
| 2013/0102254 A1 | 4/2013 | Cyzs |
| 2013/0114468 A1 | 5/2013 | Hui |
| 2013/0286903 A1 | 10/2013 | Khojastepour |
| 2013/0301487 A1 | 11/2013 | Khandani |
| 2014/0006797 A1* | 1/2014 | Cordelia ............ G06F 12/1408 |
| | | 713/189 |
| 2014/0126675 A1 | 5/2014 | Monsen |
| 2014/0135056 A1 | 5/2014 | Wang |
| 2014/0157367 A1* | 6/2014 | Zhang ................ H04L 63/1466 |
| | | 726/3 |
| 2014/0169236 A1 | 6/2014 | Choi |
| 2014/0204808 A1 | 7/2014 | Choi |
| 2014/0210681 A1 | 7/2014 | Shtrom |
| 2014/0218248 A1 | 8/2014 | Schulz |
| 2014/0219139 A1 | 8/2014 | Choi |
| 2014/0225788 A1 | 8/2014 | Schulz |
| 2014/0269964 A1 | 9/2014 | Du et al. |
| 2014/0333466 A1 | 11/2014 | Mohamadi |
| 2014/0334322 A1 | 11/2014 | Shtrom |
| 2014/0348018 A1 | 11/2014 | Bharadia et al. |
| 2014/0348032 A1 | 11/2014 | Hua |
| 2014/0363008 A1 | 12/2014 | Chen et al. |
| 2015/0029906 A1 | 1/2015 | Jana |
| 2015/0043323 A1 | 2/2015 | Choi |
| 2015/0043685 A1 | 2/2015 | Choi |
| 2015/0049834 A1 | 2/2015 | Choi |
| 2015/0063176 A1 | 3/2015 | Hong |
| 2015/0070243 A1 | 3/2015 | Kish |
| 2015/0071139 A1* | 3/2015 | Nix ........................ H04L 9/088 |
| | | 370/311 |
| 2015/0078217 A1 | 3/2015 | Choi |
| 2015/0085830 A1* | 3/2015 | Nozaki ................ H04W 40/00 |
| | | 370/332 |
| 2015/0139284 A1 | 5/2015 | Choi |
| 2015/0146539 A1* | 5/2015 | Mehta .................... H04L 45/22 |
| | | 370/237 |
| 2015/0171903 A1 | 6/2015 | Mehlman |
| 2015/0188646 A1 | 7/2015 | Bharadia |
| 2015/0223173 A1 | 8/2015 | Khojastepour |
| 2015/0236750 A1 | 8/2015 | Choi |
| 2015/0245296 A1* | 8/2015 | Tyson ............... H04W 52/0251 |
| | | 370/311 |
| 2015/0249997 A1 | 9/2015 | Clegg |
| 2015/0263780 A1 | 9/2015 | Mehlman |
| 2015/0280893 A1 | 10/2015 | Choi |
| 2015/0311599 A1 | 10/2015 | Shtrom |
| 2015/0312905 A1 | 10/2015 | Seo et al. |
| 2015/0318976 A1 | 11/2015 | Eltawil |
| 2015/0333847 A1 | 11/2015 | Bharadia |
| 2015/0334745 A1 | 11/2015 | Zhao |
| 2015/0341125 A1 | 11/2015 | Bharadia |
| 2015/0341879 A1 | 11/2015 | Shtrom |
| 2016/0127876 A1 | 5/2016 | Kish |
| 2016/0226653 A1 | 8/2016 | Bharadia |

(56) References Cited

U.S. PATENT DOCUMENTS

| | | |
|---|---|---|
| 2016/0248160 A1 | 8/2016 | Shtrom |
| 2016/0249376 A1 | 8/2016 | Kish |
| 2016/0321654 A1* | 11/2016 | Lesavich .............. H04L 67/10 |
| 2017/0161635 A1* | 6/2017 | Oono ..................... G06N 7/005 |
| 2017/0195003 A1 | 7/2017 | Rosson et al. |
| 2018/0075347 A1* | 3/2018 | Alistarh ................ G06N 3/084 |
| 2018/0359084 A1* | 12/2018 | Jain ....................... G06F 7/483 |
| 2018/0365021 A1* | 12/2018 | Chen ..................... H04L 9/0631 |
| 2018/0373978 A1* | 12/2018 | Yu .......................... G06N 3/08 |
| 2019/0081884 A1* | 3/2019 | Spohn ................... H04L 45/124 |
| 2020/0204546 A1* | 6/2020 | Li .......................... G06F 21/32 |

FOREIGN PATENT DOCUMENTS

| | | |
|---|---|---|
| JP | 10502220 A | 2/1998 |
| KR | 1020040096404 | 11/2004 |
| KR | 1020070072629 | 7/2007 |
| KR | 1020120080231 | 7/2012 |
| WO | 1994028585 | 12/1994 |
| WO | 1996022643 | 7/1996 |
| WO | 2011065020 | 6/2002 |
| WO | 2003098823 | 11/2003 |
| WO | 2004007497 | 1/2004 |
| WO | WO2009156510 | 12/2009 |
| WO | 2010005951 | 1/2010 |
| WO | 2010051232 | 5/2010 |
| WO | 2011148341 | 12/2011 |
| WO | 2012042256 | 4/2012 |
| WO | 2016014016 | 1/2016 |

OTHER PUBLICATIONS

Chen, B., et al., "Quantization Index Modulation: A Class of Provably Good Methods for Digital Watermarking and Information Embedding", IEEE Transaction on Information Theory, vol. 47, No. 4, May 2001, pp. 1423-1443. (21 pages).
EP Extended European Search Report for EP App. No. 13790076.7, dated Mar. 2, 2016, 8 pages.
EP Extended Search Report for EP App. No., 13790160.9-1874, dated Jan. 16, 2016, 9 pages.
Extended European Search Report for EP App. 13790948.7, dated Nov. 4, 2015, 9 pages.
Gharavol, E., et al., "Robust Joint Optimization of MIMO Two-Way Relay Channels With Imperfect CSI", Communication, Control, and Computing (Allerton), 2011 49th Annual Allerton Conference on, IEEE, Sep. 28, 2011, pp. 1657-1664 (6 pages), XP032085749, DOI: 0.1109/ALLERTON2011.6120368, ISBN: 978-1-4577-1817-5.
International Search Report and Written Opinion for PCT/US2013/040822 dated Jul. 18, 2013. (8 pages).
International Search Report and Written Opinion for PCT/US2014/042136 dated Dec. 9, 2014. (13 pages).
International Search Report and Written Opinion for PCT/US2014/051137 dated Nov. 24, 2014. (10 pages).
International Search Report and Written Opinion from PCT/US2014/050968 dated Nov. 19, 2014. (9 pages).
International Search Report for PCT/US2013/040818 dated Jul. 24, 2013. (2 pages).
Jain, M., "Practical, Real-Time, Full Duplex Wireless", MobiCom '11, Sep. 19-23, 2011, Las Vegans, NC, USA, 2011 (12 pages).
Choi, Jung Il, et al ., "Achieving single channel, full duplex wireless communication", Proceedings from the Annual International Conference on Mobile Computing and Networking, MOBICOM— MOBICOM' 10 and MOBIHOC' 10—Proceedings of the 16th Annual International Conference on Mobile Computing and Networking and 11th ACM International Symposi, Sep. 20, 2010, pp. 1-12 12 pages, XP002696691.
Mcmichael, J. G., et al., "Optimal tuning of analog self-interference ancellers for full-duplex wireless communication". IEEE, Fiftieth Annual Allerton Conference, Oct. 1-5, 2012, p. 246-251. (6 pages).
Persson, D., et al., "Joint Source-Channel Coding for the MIMO Broadcast Channel", IEEE Transactions on Signal Processing, vol. 60, No. 4, Apr. 2012, pp. 2085-2090. (6 pages).
Provisional Application, entitled: "Adaptive Non-Linear Digital Cancellation for Full-Duplex Radios", U.S. Appl. No. 61/864,453, filed Aug. 9, 2013. (27 pages).
Provisional Application, entitled: "Cancellation Circuit With Variable Delay and Amplifier", U.S. Appl. No. 61/876,663, filed Sep. 11, 2013. (20 pages).
Provisional Application, entitled: "Feed Foward Signal Cancellation", U.S. Appl. No. 61/736,726, filed Dec. 13, 2012. (17 pages).
Provisional Application, entitled: "Frequency Independent Analog Cancellation Circuit", U.S. Appl. No. 61/864,459, filed Aug. 9, 2013. (25 pages).
Provisional Application, entitled: "Hybrid IF/RF Digital Cancellation Architectures for Full-Duplex Radios", U.S. Appl. No. 61/915,431, filed Dec. 12, 2013. (31 pages).
Provisional Application, entitled: "Interference Cancellation Architectures With Frequency Isolation", U.S. Appl. No. 62/030,240, filed Jul. 29, 2014. (30 pages).
Provisional Application, entitled: "Method and Apparatus for Mitigating Phase Noise to Improve Self-Interference Cancellation", U.S. Appl. No. 61/865,943, filed Aug. 14, 2013.
Provisional Application, entitled: "Method and Apparatus for Mitigating Phase Noise to Improve Self-Interference Cancellation", U.S. Appl. No. 61/865,943, filed Aug. 14, 2013. (27 pages).
Provisional Application, entitled: "Near Band Cancellation", U.S. Appl. No. 61/970,852, filed Mar. 26, 2014. (28 pages).
Vaze, R., et al., "To Code or Not to Code in Multi-Hop Relay Channels", arxiv.org, Cornell University Library, May 20, 2008, XP080418936, 30 pages.
Provisional Application, entitled: "Signal Cancellation Using Feedforward and Feedback", U.S. Appl. No. 61/760,518, filed Feb. 4, 2013. (19 pages).
Provisional Application, entitled: "Self Interference Cancellation Architecture for In-Band Full Duplex Relay Node", U.S. Appl. No. 61/871,519, filed Aug. 29, 2013, (30 pages).
Provisional Application, entitled: "Techniques for Digital Interference Cancellation", U.S. Appl. No. 62/002,578, filed May 23, 2014. (33 pages).
Provisional Application, entitled: "Tunable Self Interference Cancellation", U.S. Appl. No. 61/950,742, filed Mar. 10, 2014. (32 pages).
Provisional Application, entitled: "Tuning Algorithm for Multi-Tap Signal Cancellation Circuit", U.S. Appl. No. 61/754,447, filed Jan. 18, 2013. (16 pages).
Korean Patent Abstract of 1020070072629, dated Jul. 4, 2007, 1 page.
Extended European Search Report for EP App. 14865287.8, dated Jul. 4, 2017, 7 Pages.
Aono T et al: "Wireless secret key generation exploiting reactance-domain scalar response of multipath fading channels", IEEE Transactions on Antennas and Propagation, IEEE Service Center, Piscataway, NJ, US, vol. 53, No. 11, Nov. 1, 2005 (Nov. 1, 2005), pp. 3776-3784 (9 pages), XP001512766, ISSN: 0018-926X, DOI: 10.1109/TAP. 2005.858853.
Khandani Amir K: "Two-way (true full-duplex) wireless", 2013 13th Canadian Workshop on Information Theory, IEEE, Jun. 18, 2013 (Jun. 18, 2013), pp. 33-38 (6 pages), XP032495648, DOI: 10.1109/CWIT.2013.6621588 , [retrieved on Oct. 4, 2013].
Ding, Cunsheng , et al., "A Generic Construction of Cartesian Authentication Codes", IEEE Transactions on Information Theory, vol. 53, No. 6, Jun. 2007, 2229-2235.

* cited by examiner

METHODS FOR ENCRYPTED DATA COMMUNICATIONS

CROSS-REFERENCE TO RELATED APPLICATIONS

The present application is a non-provisional filing of, and claims benefit under 35 U.S.C. § 119(e) from, U.S. Provisional Patent Application Ser. No. 62/568,191, entitled "EXPLOITING CHANNEL ERRORS TO ASSIST IN KEY ESTABLISHMENT", filed Oct. 4, 2017, U.S. Provisional Patent Application Ser. No. 62/573,139, entitled "EXPLOITING CHANNEL ERRORS TO ASSIST IN KEY ESTABLISHMENT", filed Oct. 16, 2017, U.S. Provisional Patent Application Ser. No. 62/675,611, entitled "METHODS FOR AUTHENTICATION AND ENCRYPTION", filed May 23, 2018, and U.S. Provisional Patent Application Ser. No. 62/740,792, entitled "METHODS FOR ENCRYPTION AND AUTHENTICATION", filed Oct. 3, 2018, all of which are hereby incorporated herein by reference in its respective entirety.

FIELD

The present disclosure relates to secure communications. In particular, the present disclosure relates to systems and methods for cryptographic key creation and usage.

BACKGROUND OF THE INVENTION

Embodiments herein relate to methods to establish and/or enhance the security of data exchange between two legitimate nodes in the presence of an eavesdropper.

Embodiments further relate to the general area of data security, methods for "authentication", "secure data exchange", and "secure storage".

SUMMARY OF THE INVENTION

Embodiments are directed to a method for encrypting data communications, including performing a stochastic procedure between a plurality of nodes, including at least a first node and a second node; collecting a measured outcome of the stochastic procedure, the measured outcome of the stochastic procedure providing a dependent random variable pair; and constructing an encryption key based on one or more correlations identified between at least a first random variable and a second random variable, the first and second random variables forming the dependent random variable pair.

In one or more embodiments, the performing the stochastic procedure includes: transmitting a plurality of data packets between the first node and the second node via a user datagram protocol, the dependent random variable pair being a function of a first travel time between the first node and the second node and a second travel time between the second node and the first node.

In one or more embodiments, performing the stochastic procedure includes: measuring the first travel time and the second travel time as a first loop from the first node to produce the first random variable; and measuring the second travel time and the first travel time as a second loop from the second node to produce the second random variable.

In one or more embodiments, the method includes performing quantization by the first node and the second node to locally extract a bit-string component of each dependent random variable pair, the quantization providing a range of each random variable.

In one or more embodiments, the method includes routing the first loop and the second loop through one or more relay nodes; and measuring a plurality of routed first loops and second loops, each measured routed loop corresponding to a different route between the first node and the second node.

In one or more embodiments, the measuring the plurality of routed first loops and second loops includes transmitting a plurality of data packets from the first node to the second node, each of the plurality of data packets holding pseudo-random data; and receiving, by the first node, a plurality of indices identifying successfully received data packets of the plurality of data packets.

In one or more embodiments, the method includes mixing the identified successfully received data packets at the first node and the second node; generating the pair of dependent random variables as a function of the mixing the identified successfully received data packets; and generating an encryption key or a component of the encryption key by applying a result of the mixing.

In one or more embodiments, the mixing the identified successfully received data packets includes mixing based on a multi-input hash.

In one or more embodiments, the mixing the identified successfully received data packets includes: mixing based on bit-wise addition via an exclusive OR operation (XOR).

In one or more embodiments, the measuring the plurality of routed first loops and second loops includes transmitting a plurality of modulation symbols from the first node to the second node; receiving, by the first node, a plurality of indices identifying successfully received symbols of the plurality of symbols, the successfully received symbols being symbols received with a predetermined reliability; and determining the dependent random variable pair based on each symbol in the selected subset of modulated symbols.

In one or more embodiments, the plurality of modulation symbols are quadrature phase shift keying (QPSK) symbols.

In one or more embodiments, the method includes performing quantization by the first node and the second node to locally extract a bit-string component of each dependent random variable pair, the quantization providing a range of each random variable.

In one or more embodiments, the performing quantization further includes applying recursive Gray labeling as a bit-string associated with each quantization partition; and error-correction coding to correct for mismatches between bit-string components of each dependent random variable pair.

In one or more embodiments, the error-correction coding further includes repeating until a reliability criterion is met to identify a reliable plurality of pairs of binary vectors; performing concatenating at each node one or more local components of a plurality of bit-string pairs to provide a pair of binary vectors, including a first node vector and a paired dependent binary vector at the second node; adding a randomly selected code-word from an error-correction code to the first node vector to mask a plurality of bit values; receiving from the first node the masked binary vector at the second node; adding at the second node the received masked binary vector to the paired dependent binary vector at the second node; decoding at the second node a result of each addition of the randomly selected code word; selecting at the second node, at least one binary vector pair based on a hamming distance to a closest code-word, the hamming distance being less than a threshold as a measure of reliability; adding an error vector at the second node, the error vector obtained by decoding the error-correction code to flip one or more bits and reduce a mismatch with the first node binary vector; and notifying by the second node of a plurality of indices indicative of the reliable plurality of pairs of binary vectors; and applying the reliable plurality of pairs of binary vectors as inputs of a mixing operation, such as bit-wise addition, exclusive OR(XOR), for generating a cryptographic key.

In one or more embodiments, the error-correction coding further includes concatenating one or more local components of each node a plurality of bit-string pairs to generate at least a pair of binary vectors, a first node vector and a paired dependent binary second node vector; identifying by the first node, the first node vector as a systematic portion of a code-word from an error-correcting code and generating respective parity bits associated with the systematic portion; receiving from the first node at the second node, the respective parity bits; associating at the second node the respective parity bits with the paired dependent binary second node vector to form a candidate code word; and identifying by the second node a closest code word of the error-correction code by flipping one or more bits in the systematic portion of the candidate code word to form one or more bit-strings similar to the plurality of bit string pairs of the first node.

In one or more embodiments, the method includes transmitting the respective parity bits in a plurality of consecutive phases from the first node to the second node, each of the consecutive phases activated by a request from the second node to the first node if a combination of the respective parity bits sent in one or more prior phases fails to identify a valid code-word.

In one or more embodiments, a plurality of communication paths exist between the first node, the second node, a client and a server, via a plurality of communication devices, each communication device of the plurality of communication devices supporting a different communication protocol, and, wherein, two or more communication devices of the plurality of communication devices are on a client side connected locally, and form a plurality of loops from the server to the client and back to the server, and wherein each of the plurality of loops is used to generate a separate pair of dependent random variables, and a separate key component, and wherein, each of the separate key components are mixed to generate the encryption key.

In one or more embodiments, at least one of the plurality of communication paths includes a wired internet connection from the server to a first trusted device belonging to the client, and a wireless cellular connection from the server to a second trusted device belonging to the client, wherein at least one of the plurality of loops from the server to the client and back to the server are formed as (1) from server to a first client device to server; (2) from server to a second client device to server; (3) from server to first client device to second client device to server; (4) or (5) from server to second client device to first client device to server.

In one or more embodiments, the constructing the encryption key based on the one or more correlations identified between at least the first random variable and the second random variable, the first and second random variables forming the dependent random variable pair further includes: generating the first and second random variables by translating a content from a first language to a second language wherein a first node translation mechanism is different from a second node translation mechanism to produce two or more different and dependent random variables.

In one or more embodiments, the first language is one or more of a face print, voice print, fingerprint or a speed in typing on a keyboard, and the second language is a collection of one or more numerical attributes associated with the face print, voice print, fingerprint or the speed in typing on the keyboard.

In one or more embodiments, the method includes translating, for each encryption key, by capturing a new record of one or more features associated with the first language and performing the translation to the second language by extracting the numerical attributes associated with the new record; and translating, for each encryption key at a server, by using a dictionary of average numerical attributes associated with client features, and using error-correction to remove mismatches between the first random variable and the second random variable, and updating a dictionary of a plurality of average values related to one or more client features to improve client representation.

In one or more embodiments, the method includes verifying whether the pair of binary vectors, a first node vector and the paired dependent binary second node vector are identical by: applying a one-way hash function to each of the pair of binary vectors; transmitting from the first node to the second node a first hash value for comparison with a second hash value; and forming the encryption key if the first hash value matches the second hash value.

In one or more embodiments, the performing the stochastic procedure includes starting from the first node, and transmitting a plurality of data packets to the second node via a user datagram protocol, and wherein, the second node relays the plurality of data packets transmitted by the first node and received at the second node, back to the first node, and the first node relays the plurality of packets transmitted by the second node and received at the first node, back to the second node, and the operations of relaying between the first node and the second node is repeated multiple times, and the dependent random variable pair is formed by: measuring, at the first node, a difference between a first transmit time that a first packet is transmitted from the first node to the second node, and a first receive time that a last packet, transmitted by the second node, is received at the first node, and measuring, at the second node, a difference between a second receive time that the first packet transmitted by the first node is received at the second node, and a third receive time that the last packet transmitted by the first node is received at the second node.

Figure 1:
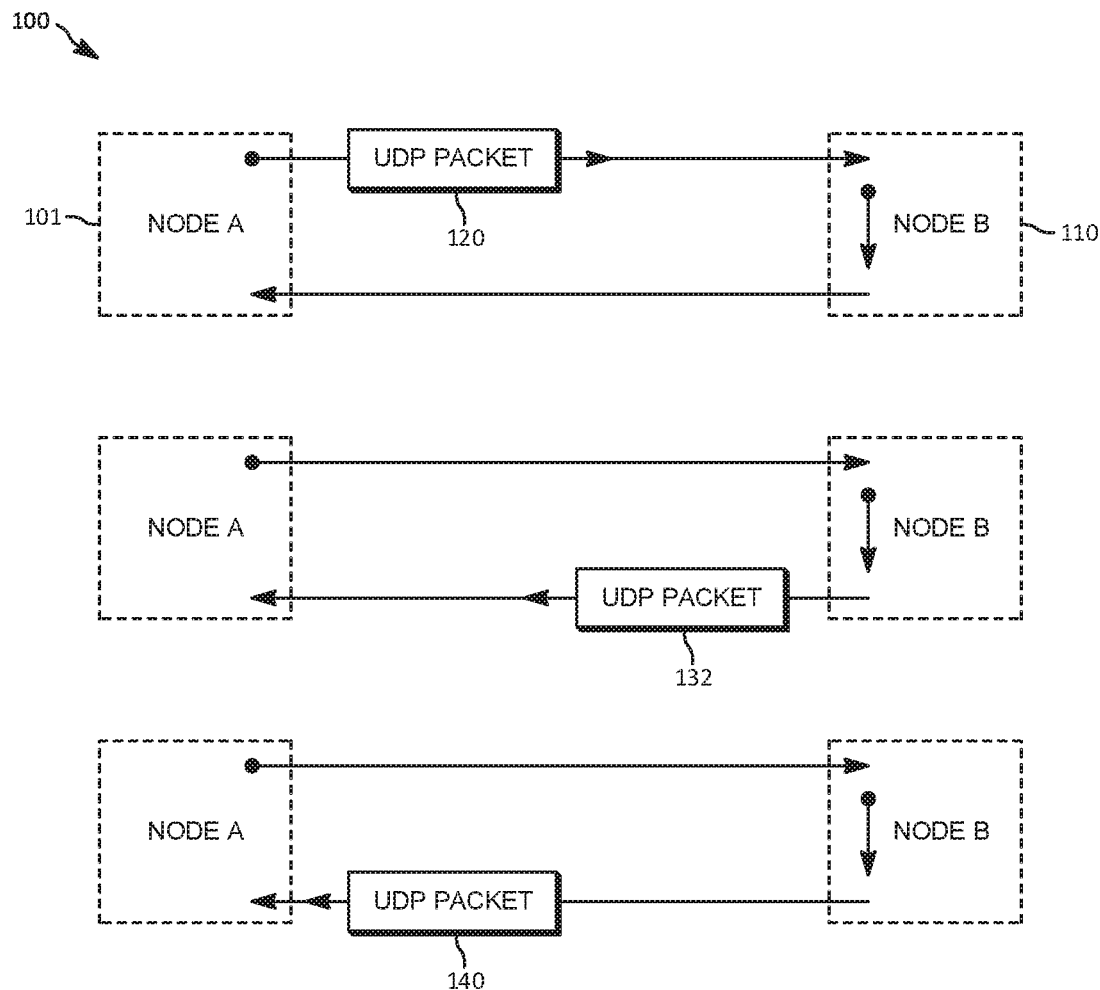
FIG. 1 illustrates a set of packet transmissions between two nodes in accordance with one or more embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments herein.

The apparatus and method components have been represented where appropriate by conventional symbols in the drawings, showing only those specific details that are pertinent to understanding the embodiments of the present embodiments so as not to obscure the disclosure with details that will be readily apparent to those of ordinary skill in the art having the benefit of the description herein.

DETAILED DESCRIPTION

Embodiments herein relate to the general area of data security, including methods for "authentication", "secure data exchange", and "secure storage". Methods also relate to establish and/or enhance the security of data exchange between two nodes such as an "Access Point" and "Client", or "Server" and "Client", or node A and node B in the presence of an eavesdropper (Eve, or node E). Some embodiments rely on generating dependent random variables at the legitimate nodes, and using the random nature of such variables, to establish a secure key between legitimate parties, while keeping the eavesdropper uninformed of the final key. In particular, in some embodiments dependent random variables are generated by relying on: "channel error", and/or "transmission delay" and/or "packet reordering/loss", and/or "conversion (translation) of an informative content (content) from one representation form (first language) to a second representation form (second language) so that the conversion is not one-to-one, such that a translation is inherently accompanied by some randomness in the conversion from the first representation to the second representation.

In the context of secure data storage, embodiments herein provide methods for distributed construction, maintenance and safeguarding of an encryption key used to encrypt data prior to being stored, as well as methods for a client's password (key) recovery without the need to store the client's password (key) in any storage entity other than the storage unit(s) trusted and maintained by a client. For example, a client could memorize the password (key), or store it on a storage device that is not connected to the Internet, and thereby cannot be accessed by any external/unauthorized entity.

Embodiments herein further provide methods for real-time, interactive user authentication. Authentication typically relies on multiple trusted devices owned by a client that are locally connected to each other, and could also be connected to the Internet for accessing the server.

Authentication, in some embodiments, includes verifying a client by relying on a collection of validation reference points, collectively contributing to the authentication, rather than a single reference point. In some embodiments the reference points, for example, client devices that each has its own access mechanism, such as a password, interact with each other in real-time such that any delay in such mutual interactions can be monitored by a server as a means to detect suspicious circumstances, and accordingly take appropriate measures. Also, in case the security of one or more of such client's devices is compromised, uncompromised devices can compensate and maintain the accuracy of the authentication.

Some embodiments include methods for distributed authentication wherein a collection of nodes mutually authenticate each other. In such embodiments, methods include periodic updating of authentication credentials. Security related data (such as authentication credentials and/or encryption keys) are constructed and maintained in a distributed manner, allowing to gradually update subsets of security-related data values over time, causing gradual changes that eventually propagate and cause a change in security related data. Propagating changes over time prevents hackers from overcoming safeguard mechanisms over an extended period of time.

Key Generation

Some embodiments for data transmission address a shortcoming of the current encryption systems which, in essence, rely on a static mechanism for the application of the underlying encryption keys, and also suffer from difficulties in transferring the encryption keys to legitimate nodes (key distribution) without disclosing information to unauthorized parties. Instead of static encryption keys, embodiments provide for updating existing keys over time, without disclosing the key content to possible eavesdroppers. Embodiments include key generation that "procure" new keys via a deterministic instruction set, such as a recipe of deterministic actions/decisions, resulting in outcomes with some randomness, that result in measurable outcomes at different points of a network.

Measurable outcomes can be observed and measured at separate points that are similar to each other, but are not necessarily the same. The outcomes measured at separate points form a set, for example a pair, of dependent random variables. In some embodiments, an encryption key is constructed from dependent random variables. In some embodiments, legitimate nodes, upon measuring a local random outcome, cooperate with each other and thereby remove mismatches between measured outcomes and reach to a same collection of bits to be used as a key or as a component to be used in constructing a key. In some embodiments, updating an existing key includes adding new information to it through a mixing procedure. As a result, in case an eavesdropper attempts to replicate the procedure used by the legitimate nodes in the formation of key, the eavesdropper may gain access to a local measurement of stochastic outcomes, which will be similar, but not exactly the same as the outcomes measured at verified, legitimate nodes.

In some embodiments, relying on dependent random variables for key formation, methods include at least two operations to provide methods for constructing keys for legitimate nodes, as compared to an eavesdropper that may be following a similar set of steps as the legitimate nodes in an attempt to gain access to the new key. In some embodiments, methods include legitimate nodes cooperatively selecting a subset of measured outcomes that meet reliability criteria for the legitimate nodes. Eavesdroppers can also measure outcomes, which only follow general stochastic behaviors without any preference or selection in terms of reliability.

A second operation includes cooperation through exchange of data between legitimate nodes, exploiting an error correction code, towards removing the remaining mismatches between their measured outcomes. In some embodiments include a supplementary operation based using a one-way function (such as a hash function) such that the legitimate nodes can mutually verify their local constructed copies of key are identical.

As used herein terminology, such as "random experiment" includes a "stochastic procedure" to refer to a deterministic instruction set that results in measurable random outcomes. Also, the terms "random", "stochastic", "non-deterministic" and "statistical" herein are used interchangeably.

Random experiments and stochastic procedures apply to methods disclosed in embodiments herein in different methods. Some embodiments include measuring quantities that have a reciprocity property, meaning that, if two nodes measure a reciprocal quantity, the results of their measurements will be the same other than for some variations due to secondary random events that affect the result of the measurements. In some embodiments, a time gap between measurements conducted at the separate nodes apply to affect a result. Some embodiments include a reciprocal quantity of travel time of packets between two nodes in a network. The travel time is a function of distance between two nodes (responsible for "similarity" in the reciprocal measurements) as well as secondary random events such as queuing in the intermediate network switches and/or software/hardware resource sharing within each of two legitimate nodes that affects, in a random manner, the time it takes for each node to capture each packet and record corresponding travel times.

Figure 2:
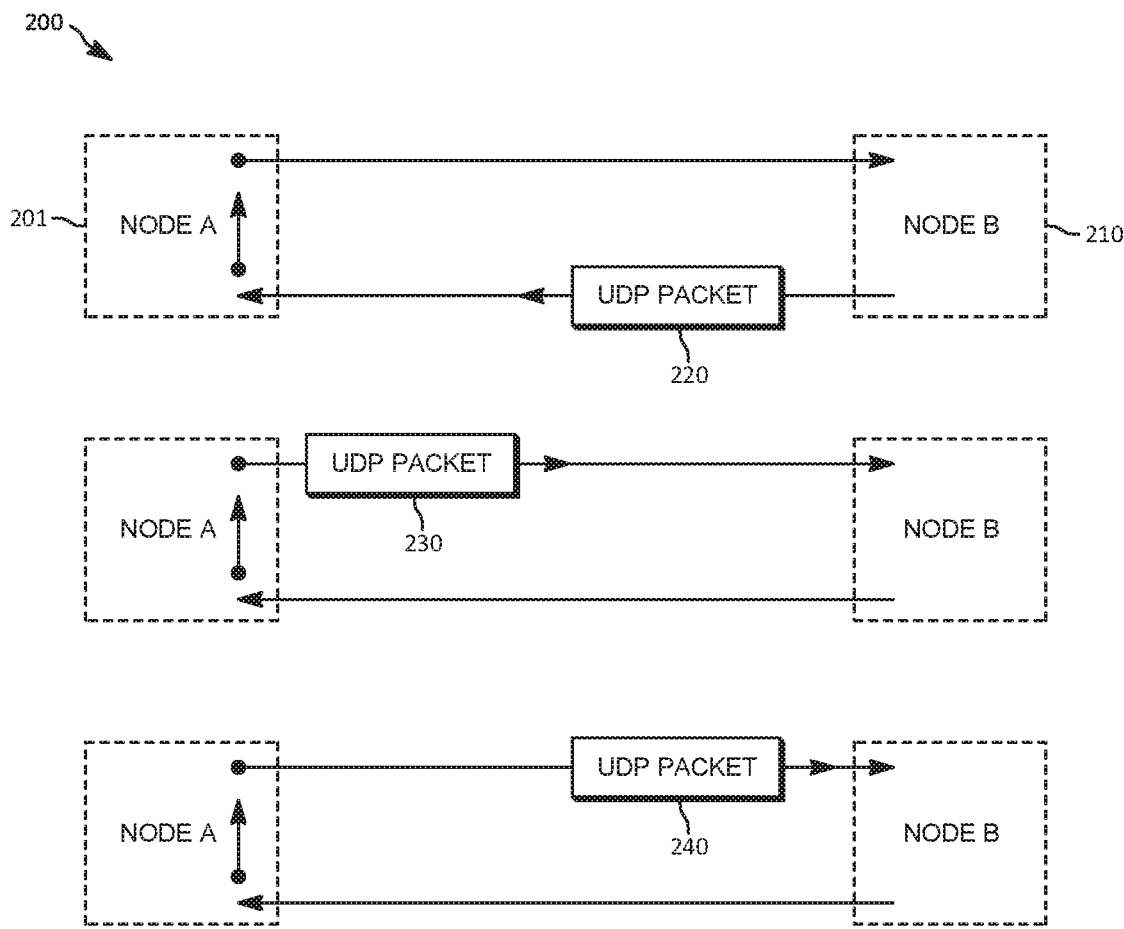
FIG. 2 illustrates another set of packet transmission between two nodes in accordance with one or more embodiment.

Referring now to FIG. 1, a loop 100 between node A 101 and node B 110 for measurement of delay based on an operation performed by node A 101, preferably simultaneously with a similar operation at node B with the roles of nodes A and B exchanged as shown in FIG. 2. As shown, node A 101 transmits a packet, such as a user datagram protocol (UDP) packet 120 and records a transmit time "TA". node B 110 relays the same UDP packet 120, which is received as UDP packet 140 by node A 101 where the receive time "RA" is recorded. In practice, the measurement is performed by sending a series of successive packets and averaging out the measurement results due to different packets, as will be appreciated by one of skill in the art.

Referring now to FIG. 2, another loop 200 illustrates measurement of delay based on an operation between node A 201 and node B 210, with roles reversed from loop 100. In some embodiments, loop 200 can be performed simultaneously with a similar operation at node A with the roles of nodes B and A exchanged as shown in FIG. 1. As shown, node B transmits a UDP packet UDP to node A 201 and records a transmit time (TB), which is relayed by node A 201 as packet 230 back to node B 210, and UDP packet 240 is recorded (RB) at node B 210, where time delay is calculated as RB-TB. In practice, the measurement is performed by sending a train of successive packets and averaging out the measurement results due to different packets.

Figure 3:
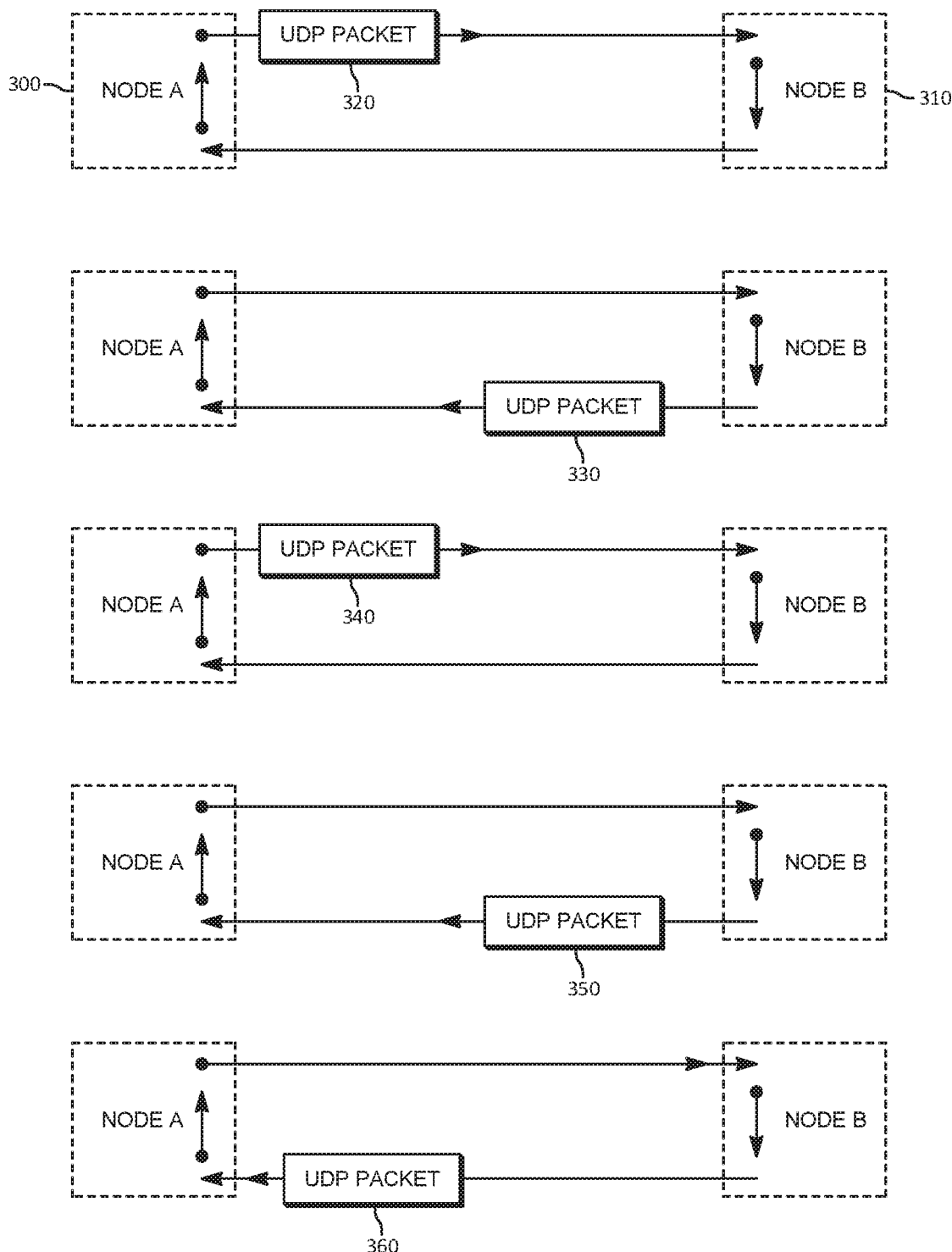
FIG. 3 illustrates another set of packet transmissions between two nodes in accordance with one or more embodiment.

Referring to FIG. 3, embodiments include multiple delay measurements at node A 300 based on traversing the closed loop between the two nodes multiple times to improve accuracy by generating similarity between reciprocal random variables. The measurement procedure shown in FIG. 3 starts from node A 300, and can be performed simultaneously with a similar operation started at node B 310 with the roles of nodes A and B exchanged. In practice, the measurement is performed by sending a series of successive packets and averaging out the measurement results due to different packets.

FIG. 3 illustrates packet 320 being transmitted to node B 310, being relayed as UDP packet 330 back to node A 300, and then packet 340 relayed back to node B 310, being related as UDP packet 350 back to node A 300 and received as UDP packet 360 where a transmit time is recorded calculating the loops back and forth.

Figure 4:
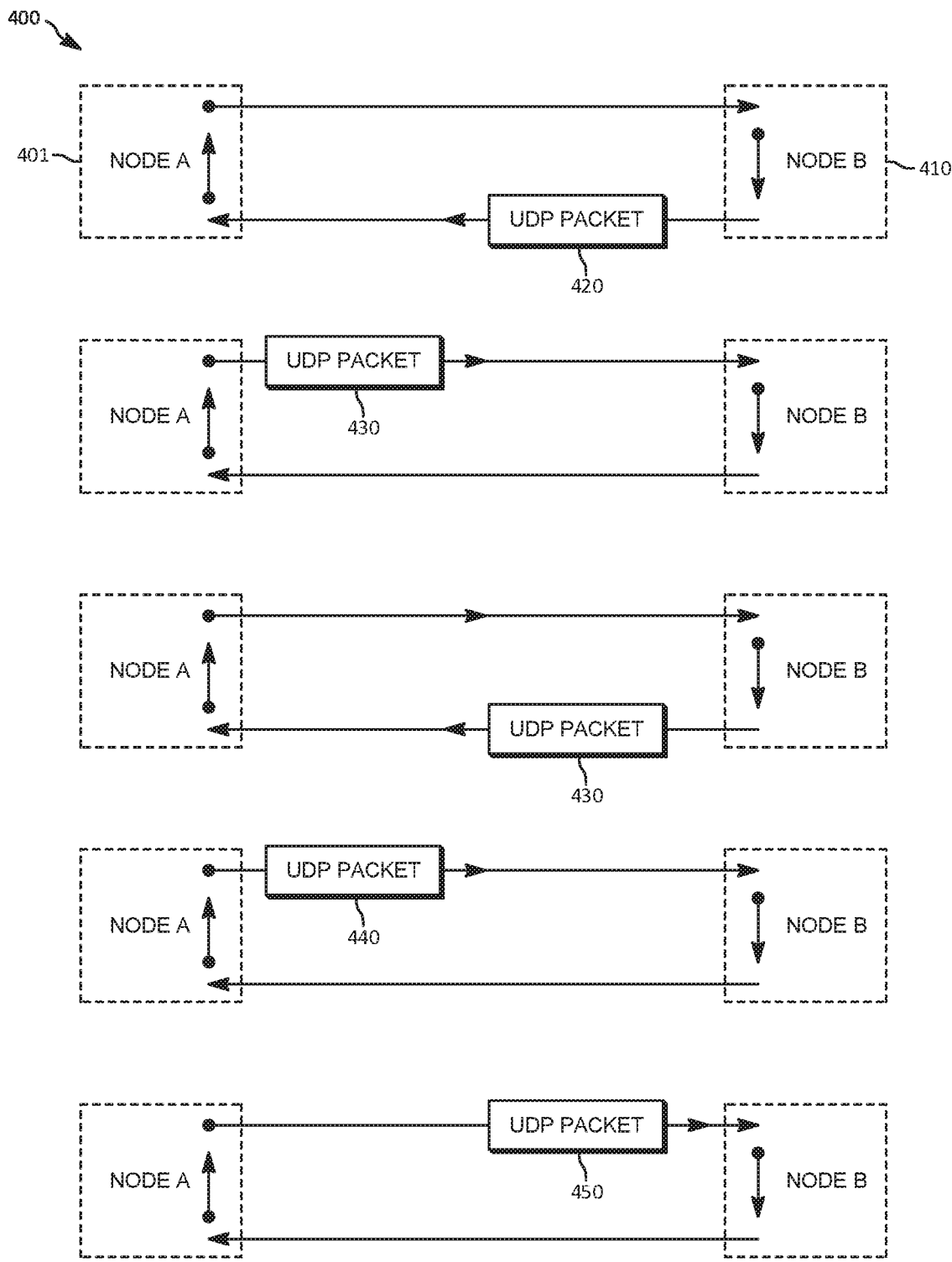
FIG. 4 illustrates another set of packet transmissions between two nodes in accordance with one or more embodiment.

FIG. 4 illustrates an embodiment for delay measurement 400 which begins at node B 410 based on traversing the closed loop between the two nodes for multiple times to improve accuracy. The measurement procedure shown starts from node B 410, and is performed simultaneously with a similar operation started at node A 401 with the roles of nodes B and A exchanged. In practice, the measurement is performed by sending a series of successive packets and averaging out the measurement results due to different packets. As shown node B 410 sends UDP packet 420 to node A 401, and recording a transmit time TB, node A 401 relays UDP packet 430, node B 410 relays UDP packet 430, node A 401 relays UDP packet 440, and node B 410 receives UDP packet 450 receives and records a receive time RB and computes a delay time as RB-TB.

Figure 5:
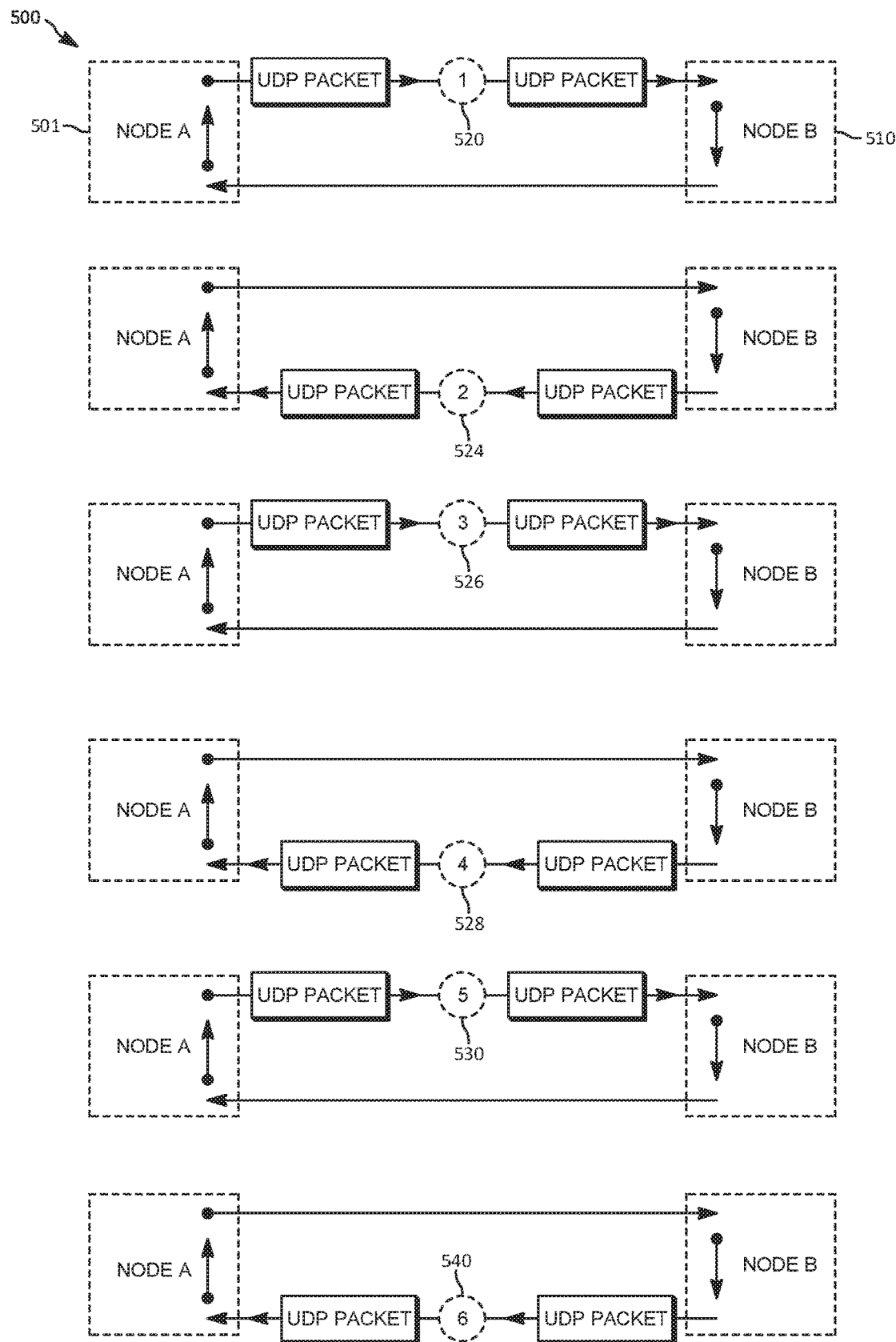
FIG. 5 illustrates another set of packet transmissions between two nodes in accordance with one or more embodiment.

FIG. 5 illustrates a more detailed view for looping between the nodes 500. More specifically, loop 500 shows node A 501 transmitting a UDP packet with node A 501 recording a transmit time TA, and node B recording a receive time RB1 in link 1 520. Link 2 524 includes node B 510 relaying the UDP packet and node A 501 receiving the recording a receive time RA1. Link 3 520 includes node A 501 relaying the UDP and node B 510 receiving the UDP packet and recording a receive time RB2. Link 4 528 includes node B 510 relaying the UDP packet and node A 501 receiving and recoding a time RA2. Link 5 530 includes node A 501 relaying the UDP packet to node B 510 and node B 510 receiving the UDP packet and recording a receive time RB3. Finally, link 6 540 includes node B 510 relaying the UDP packet and node A 501 receiving the UDP packet and recording a receive time RA3. Thus, node A computes a RA3−TA as a first dependent variable, and node B computes RB3−RB1 as a second dependent variable.

FIG. 5 illustrates that paths contributing to the loop 500 can be measured at each of the two nodes and links that are the same in delay measurements. Referring back to FIGS. 1 and 2, the delay measurements for loop node A 101 back to node A 101 and a loop from node B 110 back to node B 110 in a statistical sense, should have the same average delay. However, in FIGS. 1 and 2, the two measurements include different links (same links measured at different times), and although the average delay measured at each of the two nodes will be the similar, the instances of travel times when traversing the links are somewhat independent of each other. Thus, in some embodiments, a method includes averaging many independent measurements to approach the statistical average of the delay with high accuracy. On the other hand, in FIGS. 3, 4, and 5, the travel times contributing to the values measured at the two nodes are the closer in value, except for a small difference due to a single link that is included in one measurement, but not the other. Thus, measurements based on FIGS. 3, 4, and 5 are more accurate.

Referring to FIG. 5, links between node A 501 and node B 510 are labeled with link 1 520, link 2 524, link 3 526, link 4 528, link 5 530 and link 6 540. Note that the measurement at node A 501, TA-RA3 includes the travel times in links 1,2,3,4,5 and 6. On the other hand, measurement at node B 510, RB3-RB1 includes the travel times in links 2,3,4 and 5. Thus, four of the six links contributing to the values measured at node A 501 and node B 510 are the same, and consequently, the values measure at node A 501 and node B 510 are highly correlated.

The measurement at node A including six travel times, while the measurement at node B includes only four travel times. Thus, some embodiments include normalizing each of the two measurements with respect to their corresponding average values, and quantizing each measured quantity (at each of the legitimate nodes) relying on the statistical behavior of the value measured at the corresponding node.

Pseudo-Random Bit Packets to form Dependent Random Variables

In some embodiments, methods include relying on channel noise and/or packet loss in links connecting legitimate nodes. In this case, upon transmission of a symbol or data packet over such a communication channel that is prone to error, the corresponding channel inputs and outputs will be dependent, but not the same. In particular, the methods include sending UDP packets containing pseudo-random bits over a wireless channel (or another channel prone to noticeable packet loss) and using the packets that are received successfully as pairs of dependent random variables. In this case, the bit contents of such a subset of packets that are successfully received by a receiving legitimate node are bit-wise added (XOR) at the two legitimate nodes, and can be, according to embodiments, used for generating a cryptographic key. Thus, if the number of packets is large enough (relative to the probability of packet loss in the link), then the chances that an eavesdropper has received all the packets that are received successfully at the receiving legitimate node can be made to be very small. Those of ordinary skill in the art will appreciate that if the eavesdropper lacks access to even a single one of these packets available at a receiving node, the eavesdropper will be ignorant of the final result of the bit-wise addition. In addition, the legitimate receiving node can request a retransmission, but an eavesdropper cannot, a property that is exploited in some of the embodiments to provide superiority for the legitimate nodes in competing with eavesdroppers.

Modality Translation

A third category is based on translating a content from one language or modality to another, with the property that any such translation will produce similar results following the original content, but the results will not be exactly the same. The terms "language" "modality" and "translation" is used to refer to a wide class of operations that can transform one form for the perception of a distinct informative content (referred to herein as "content")", or a "phenomenon", to another possible form for the perception of the same content/phenomenon. For example, in terms of the modality used to record musical notes. A language can be composed of a set of symbols. Thus, Symphony No. 41 composed by Mozart, can be recorded as a sequence of symbols from this modality as a musical language (first language). Symphony No. 41 can be considered "content" expressed in a unique way as a collection of symbols from a first modality. If a group of musicians plays Symphony No. 41 of Mozart using their musical instruments, the generated sound is the second language/modality expressing the same content (Symphony No. 41 of Mozart), and waveforms generated by musical instruments are the result of translation from the first language/modality to the second language/modality. In this example, the act of playing the music is an act of translation from a first modality (written musical notes for Symphony No. 41) to a second modality (waveforms that can be heard). The translation causes inherent randomness, meaning that if the same written musical notes is played in two different occasions, the corresponding sound waveforms will be similar, but not the same. The methods in embodiments herein exploit this similarity and randomness to generate an encryption key. Another example is a person's face (content from a first language/modality) and numerical attributes that are extracted for face recognition (second language/modality). If a same algorithm is used to extract such numerical attributes from two different pictures taken in two different occasions from the same person, the corresponding numerical attributes will be similar, but not the same. Again, the methods of embodiments disclosed herein exploit this similarity and randomness to generate an encryption key.

Encryption Engine Using Dependent Variables

Embodiments herein include an encryption engine for data communications between two nodes, such as node A and node B, assuming that the information to be exchanged between node A and node B is secured with a layer of encryption described herein that supplements the built-in encryption used by the underlying communications protocol to create a twice-encrypted channel between the two nodes; the encryption key for transmission between node A and node B is constructed from similarities between two dependent random variables, called a dependent random variable pair; one random variable can be collected (measured) at node A and its corresponding (dependent) variable forming the pair is collected at node B; and each dependent random variable pair is generated by conducting a random experiment as a stochastic procedure involving the two nodes, and, at each node, collecting the outcome of the random experiment, stochastic procedure that is measurable at that node. In some embodiments, the stochastic procedure includes determining travel times such as those collected with regard to FIGS. 1-5.

Referring back to FIGS. 3, 4 and 5, in some embodiments, a stochastic procedure includes sending data packets, such as User Datagram Protocol (UDP) packets, between the two nodes, and relying on each dependent random variable pair formed by measuring packets' travel times in the loop formed between node A and node B, i.e., the loop A→B→A for measurements at node A and the loop B→A→B for measurements at node B. In another embodiment, the loops between the two nodes, node A and node B, are routed by passing through a select set of intermediate relay nodes, and as a result, multiple travel times are measured, each corresponding to a different route between node A and node B. In another embodiment, the loop is circled multiple times to improve accuracy as described with respect to FIGS. 3, 4, and 5.

In another embodiment, the dependent random variable pair for a node A and a node B, is generated by relying on the channel error in a communication link connecting the two nodes, and includes one of the two nodes, sending data packets, such as UDP packets, each packet containing pseudo-random data, to its counterpart, node B. Next, node B informs node A of the indices of the subset of data packets that have been successfully received in the first transmission attempt. Next, the content of each data packet that is in the selected subset generates a pair of dependent random variables.

With identical values, for node A and node B, and the selected subset of packets undergo two identical mixing operation at the twos, with the result of the mixing at each node to be used as an encryption key, or to be used as a key component in the construction of the key.

In some embodiments, a method includes mixing using two identical multi-input hash functions at the two nodes, wherein the selected subset of data packets are used as inputs to the multi-input hash function, with the corresponding hash value at each node used as an encryption key, or to be used as a key component in the construction of an encryption key.

In some embodiments, the mixing is based on bit-wise addition (XOR) of the selected subset of data packets, with the result at each node to be used as an encryption key, or to be used as a key component in the construction of an encryption key.

In another embodiment, the dependent random variable pair for node A and a node B is formed by relying on the channel error in a communication link connecting the two nodes. In some embodiments key generation includes sending modulated symbols from one of the two nodes, such as node A, for example using Quadrature Phase Shift Keying (QPSK), to its counterpart, node B. Next, node B informs node A of the indices of a selected subset of modulated symbols that have been received with a reliability higher than a threshold T. Next, each symbol in the selected subset of modulated symbols at node A, and its corresponding noisy version at node B, are used as the components of a dependent random variable pair.

To derive a key from the dependent random variables, embodiments include methods at each of the two nodes, node A and node B, locally extracting a bit-string from a local component of each dependent random variable pair, for example by quantizing the range of each continuous random variable and using recursive Gray labeling as the bit-string associated with each quantization partition, and then error correction coding to correct for mismatches between the two components of each such pair of bit-strings.

In some embodiments, to perform error correction, each node concatenates its local components of several bit-string pairs, resulting in a pair of binary vectors, one vector at node A and its paired dependent binary vector at node B, followed by a method including first, at one of the two nodes, say node A, randomly selecting a code-word from a code C that added to the binary vector formed at node A to mask its actual bit values. Next, sending from node A the resulting masked binary vector to node B. Next, node B locally adding each received masked binary vector to its paired dependent binary vector at node B. Next, node B decoding the result of each such summation to its corresponding closest code-word in C. Next, the method includes node B, relying on the hamming distance to the closest code-word in C as a measure of reliability, selecting the binary vector pair if the hamming distance to the decoded code-word in C is less than a threshold TR.

Next, the method includes node B adding an error vector obtained in the decoding to its local binary vector, and thereby flipping some of its bits in an attempt to reduce the mismatch with the binary vector at node A. Next, the method is repeated multiple times until an adequate number of reliable binary vector pairs are gathered.

In some embodiments, the method includes node B informing node A of the indices of the binary vector pairs that meet the set reliability criterion. Also, in some embodiments, nodes A and node B locally use their respective components from the selected pairs of binary vectors as inputs to the key generation algorithm.

In another embodiment, methods include each node concatenating local components of several bit-string pairs, resulting in a pair of binary vectors, one vector at node A and its paired dependent binary vector at node B, and providing that one of the two nodes, say node A, considers its local binary vector as the systematic part of a code-word from an error correcting code CC, and generating its corresponding parity bits. Next, providing for node A sending the resulting parity bits to node B, such as over an encrypted communications channel established in earlier rounds. Next providing for node B associating the set of parities received from node A with the binary vector at node B acting as the systematic part, and thereby forming a candidate code-word. Next, the method can include node B finding the closest code-word from CC to each such candidate code-word by flipping some of the bits in its systematic part in an attempt to make each of its bit-strings more similar to its paired dependent bit-string at node A. In some embodiments, the parities are sent in multiple consecutive phases from node A to node B, and each phase can be activated by a request sent from node B to node A if the combination of all parities sent in previous phases have not been adequate for the decoding at node B to succeed in finding a valid code-word.

Multiple Communication Devices

In some embodiments, the methods include using more than one communication path between a node A and a node B, the client and the server, which are formed by using multiple communication devices at the client side, each device supporting a different communication protocol. Thus, two or more communication devices on the client side can be connected locally, and used to form multiple loops from the server to the client and back to the server. In some embodiments, each such loop is used to generate a separate pair of dependent random variables, and thereby a separate key component. In some embodiments, key components are mixed to generate an encryption key.

Figure 6:
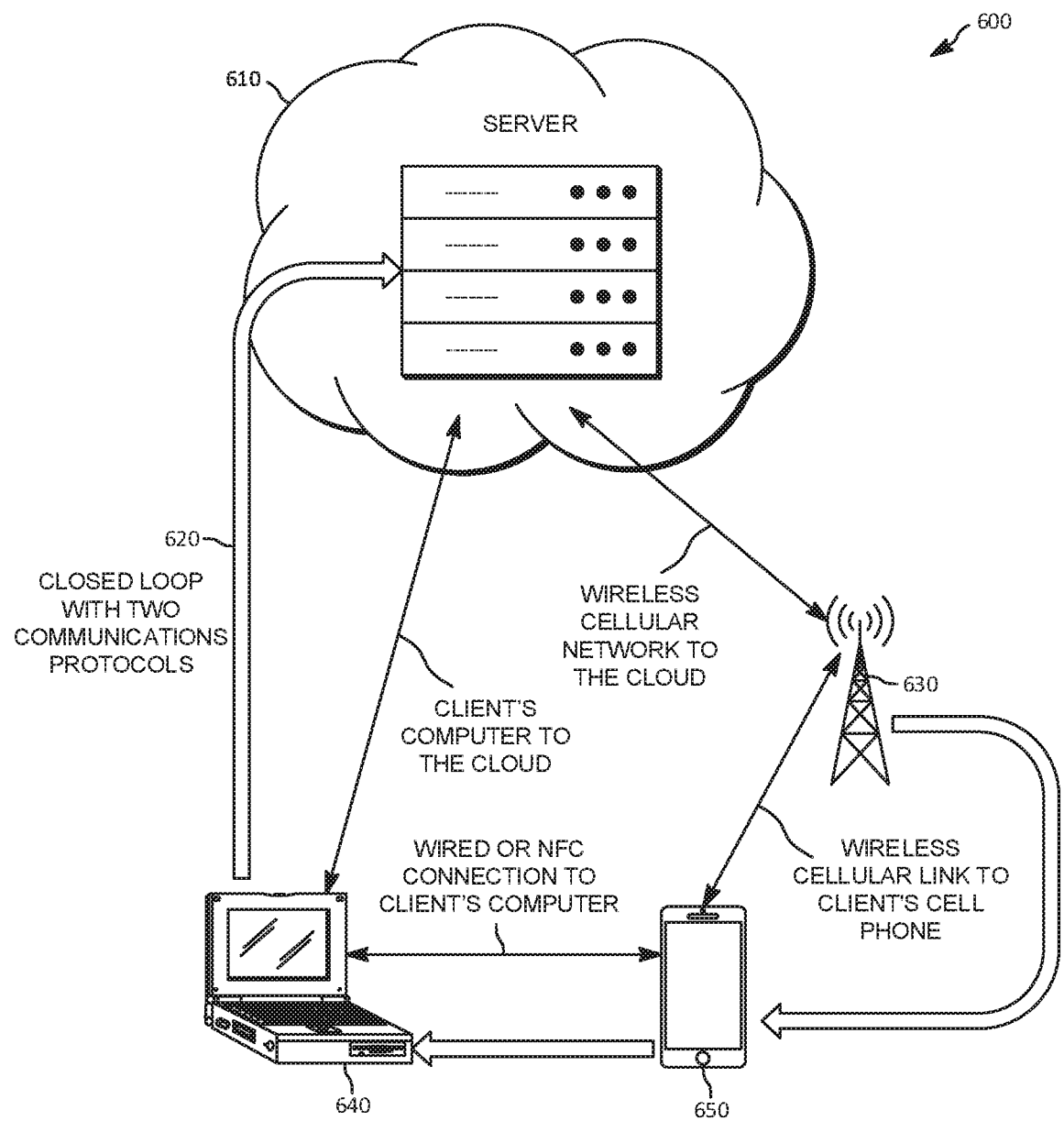
FIG. 6 illustrates a set of transmissions between a server, mobile device and client computer in accordance with one or more embodiment.

Referring now to FIG. 6, a closed loop 600 illustrates a server 610 in a closed loop with two communications protocols 620 over a wireless cellular network to the cloud 630 including a client computer 640 and a client mobile device 650. Using two separate protocols provides two independent challenges for an eavesdropper. Loop 600, in some embodiments, is used to verify that client 640 is present and actively involved in the authentication procedure. The real-time nature of loop 600 allows detecting suspicious situations by measuring and monitoring delay in the loop, for example by monitoring how fast a client reacts to an instruction by the server, for example, typing a sentence as requested in real-time by the server to verify that the client is real, and owner of the cell phone/device. Loop 600 can be also used for measuring delay to be used as source of common randomness, or sending UDP packets over the constituent cellular link and exploiting the high error rate existing in wireless as the backbone for the methods that extract a key relying on channel error.

In another embodiment, the dependent random variables are generated by translating a content from a language L1/modality to a language L2/modality at a node A and at a node B, wherein the translation mechanism at node A is different from the translation mechanism at node B, such that, in translating a given content, the two translation mechanisms generate different, but dependent results.

In some embodiments, language L1/modality is a feature of a client, such as client's face or voice or finger print, and language L2/modality is the collection of some numerical attributes extracted from each such feature, and key generation method includes, at each round of establishing a new key, translation is performed anew at the client's side by capturing a new record of the client's feature, for example by taking a new photo from client's face, and extracting the numerical attributes corresponding to the new record. Next the method includes translating at the server side relying on a dictionary of average values related to each particular client with entries that are tuned over time, each time that the client has accessed the service, to better represent the client on the average.

Another embodiment relates to methods for key generation a verification phase that verifies if two paired bit-strings, or two paired binary vector composed of multiple pairs of bit-strings, available at node A and node B, are the same or not. According to one method, the bit-string(s) at one of the two nodes, say node A, is used as the input to a one-way function resulting in a hash value. Next, the hash value is sent to node B, such as over an encrypted communications channel established in earlier rounds, to be compared with the hash value computed at node B based on the bit-string available at node B, and wherein, only pairs that pass the verification phase can be used in the formation of the key.

Secure Data Storage

Some embodiments include an encryption engine for secure data storage, in which, an encryption key, Ks, is constructed from two or more key elements, providing access to all key elements is required to construct Ks key elements are distributed among multiple key-keepers with separate and independent safe-guard mechanisms such that a potential breach in one or more of the key-keeper(s) does not reduce the difficulty of breaching the remaining key-keepers. To encrypt data at a node, some embodiments include having all the key elements are gathered at the client using an encrypted communications channel. In some embodiments, Ks is locally regenerated by the client, data is locally encrypted by the client, and then all the key elements except for the key elements that belong to the client, as well as the main encryption key Ks, are deleted at the client's side. In some embodiments, to decrypt data at the client, all the key elements and the encrypted data are gathered at the client using an encrypted communications channel. In some embodiments, Ks is locally regenerated by the client, data is locally decrypted by the client, and then all the key elements except for the key elements that belong to the client, as well as the main encryption key Ks, are deleted at the client's side.

Some embodiments provide that one or more servers are used for the purpose of securely storing some data that belongs to the client. In some embodiments, Servers act as key-keepers as well as storage units for storing data. In some embodiments, servers, as well as the client, each keep at least one of the key elements. In some embodiments, data belonging to the client is encrypted and decrypted within a client's trusted computing device, such as a personal computer or a cell phone, while client's key elements are each stored in a separate trusted storage device belonging to the client, such as a smart card or a cell phone, or are simply memorized by the client. In some embodiments, client's trusted storage devices can be locally connected to the client's trusted computing device in order to temporarily transfer each of client's key elements from its corresponding trusted storage device to the client's trusted computing device.

In some embodiments, one or more of the client's key elements are passwords memorized by a user, and to enable password recovery, there is a password recovery transformation associated with each password, that, when applied to an associated password recovery phrase known to the user, will regenerate the corresponding password, and the password recovery transformations associated with different passwords are kept on the server side, preferably each stored on a different server with an independent safe-guard mechanism, and the associated password recovery phrases are kept at the client's side, preferably each stored on a separate client's trusted storage device, or are memorized by the user.

In another embodiment, the password recovery phrase associated with each password is constructed from the answers provided by the client to some questions that are set beforehand between the client and the server(s), preferably at the time of client's initial registration, and the questions are kept at the server side, preferably each stored on a different server with an independent safe-guard mechanism, and the answers are stored at the client side, preferably each stored on a separate client's trusted storage device, or are memorized by the client.

In some embodiments, the data to be securely stored, is safe-guarded by using a second layer of encryption, wherein client's data, upon being encrypted on the client's trusted computing device with a first layer of encryption, called the client's centric encryption, is further encrypted on the server side with a second layer of encryption, called server-centric encryption, prior to being stored on a storage server.

In some embodiments, the encryption key for server-centric encryption is decomposed into multiple key elements such that the bit-wise addition of these key elements generates the server-centric encryption key, and each key element is stored on a separate server, and all key elements are needed in order to reconstruct the server-centric encryption key. Such key elements are occasionally updated. In some embodiments, in a first method of (partial) updating, a subset of key elements is modified in a manner that the server-centric encryption key remains the same. In some embodiments a second method of (complete) updating, the server-centric encryption key and all its associated key elements are modified.

Secure Authentication Engine

Embodiments herein further include a secure authentication engine. In some embodiments the secure authentication engine includes an authentication procedure that is interactive in the sense that the server will, in real-time, ask the client/user to react to some instructions, for example, in an authentication based on face verification, server asks the client to move his head in certain direction, or type certain word. Next, the server checks the client's reaction to the servers instructions. Next, if the delay in detecting client's reaction is above certain threshold TD, and/or the metric extracted for client verification, for example metrics extracted for the purpose of face verification, are not reliable, then the server requires that the client/user enters into a subsequent complementary authentication procedure, for example authentication based on a finger print.

According to some embodiments for authentication auxiliary features related to any particular client are included. For example, some embodiments include a user's location in conjunction with client's earlier record of movement. Some embodiments include a users typical times of the day in conjunction with corresponding locations for accessing the service. Some embodiments include features such as the serial number of user's device accessing the service. Some embodiments include a combination of auxiliary features are used to assist in a user's authentication.

In some embodiments, more than one device from the client side are involved in the closed-loop authentication procedure, and with client's multiple devices securely connected to each other. Thus, a loop is formed between server and client, server→client→server, the loop passing through multiple client's devices. In some embodiments, more than one communication protocol contributes to the closing of the loop from the server to the client and back to the server. In some embodiments, the delay in traversing such loops is measured and used as metrics in determining if the client is actually present, and if the links are being closed by real-time involvement from the client side.

In one embodiment, the loop involves a single trusted device on the client side that can connect to the Internet using two different communication protocols. The loop is formed, starting from the server and using a cellular connection to the client's trusted device, followed by a different communication protocol from the client's trusted device back to the server, for example, using a wireless connection from the client's trusted device to a cable modem within client's local area network, back to the server. In another embodiment, the loop involves at least two trusted devices on the client side that can connect to the Internet using two different communication protocols, and the loop is formed, starting from the server using a cellular connection to the client's first trusted device, for example client's cell phone, followed by a connection from the client's first trusted device to the client's second trusted device for example client's computer, followed by a different communication protocol from the client's second trusted device back to the server, for example using a wireless connection from the client's second trusted device to a cable modem within client's local area network, back to the server.

Common Randomness Used for Security

Some embodiments relate to interactions between an access point and a server. The terminology of "Access Point" and "Server" are used to represent a central entity that will interact with one of more "Client". The term "Access Point" is used when such interactions is contained within a local area, such as a router in a wireless local area network (WLAN), or a gateway in the Internet of Things (IOT). On the other hand, the term "Server" typically applies to scenarios that involves interactions beyond a local area, such as interactions over the Internet, or interactions with an entity in the cloud. In some embodiments, data is exchanged between "Access Point" and "Client" over their previous exchanges of information to secure current as well as future messages. For purposes of building state system, information used can include a function of a subset (or all of data sent to another party, data received from another party, attributes with some form of "Common Randomness", including but not limited to time of the day, time of transmissions, time interval between successive transmissions, length of data packets, number of retransmissions for each packet, phase and/or magnitude of the RF channel between legitimate nodes at the time of each transmission, MAC address, IP addresses, serial number, etc., of one or both of legitimate nodes, features of signal(s) received from commonly available sources, e.g., TV signals, GPS signal, AM signals, etc., difference between the clock speed of the Access Point and Client.

In some embodiments, common randomness established between Client and Access Point can include a shared secret, which can be renewed over time, and is established between Client and Access Point without explicit transmission of the underlying information.

State of the system is captured in the form of the content of a binary word, say with M bits, called "state vector", hereafter. Consequently, the state vector can take $2^M$ different values. The state vector, which evolves over time as a function of a subset (or all) of above items (provided in the above itemized list) can be the same at both legitimate nodes. In some variations, particularly when wireless is used as the transmission medium, communications between legitimate nodes is equipped with "error detection", and accordingly, legitimate nodes have access to request for retransmission by sending a NAK (i.e., negative acknowledgment, or not acknowledged) signal in case of receiving a packet in error. In some variations, particularly when wireless is used as the transmission medium, legitimate node, upon receiving data, will listen to the transmission medium in order to detect if an imposter acts on its behalf and requests a retransmission of the data that has been just received by that legitimate node. Thus, the legitimate nodes can track the state diagram independent of each other, i.e., both legitimate nodes can track the evolution over time of the state vector. On the other hand, eavesdropper will not be able to accurately track the evolution of the state vector. The reason is that, eventually, eavesdropper will receive a packet in error. In this case, if eavesdropper requests a retransmission of the erroneous packet (by sending a NAK with the ID of the legitimate recipient of the packet, i.e., act as an imposter), then the legitimate recipient will detect the presence of an imposter and will inform the rest of the network of a potential security breach. If eavesdropper avoids the request for retransmission and instead uses the erroneous data to update its local copy of the state vector, it will lose synchronization (in terms of tracking the state vector) with the legitimate nodes. To enhance this feature, embodiments include methods to make sure the effect of each data bit, if received in error, propagates into the future and continues to differentiate the copy of the state vector built locally by eavesdropper from the actual state vector built/tracked by legitimate nodes.

According to some embodiments, each data bit, at the transmitter side, together with the current value of the state vector, enter into a hash function, resulting into two outputs: The new state vector. The value of the bit to be transmitted. Examples of methods that include a hash function includes one (or a combination) of methods includes computing an XOR to determine a bit to be transmitted, the XOR of the data bit with a selected subset of bit values within the state vector. In some embodiments, K of the bit positions within the state vector are used to select one of $2^K$ pre-defined binary masks, each of size M, and then, depending on the value of the data bit, the selected mask or its binary negative (all M bits are flipped) are added to the binary state vector (used to mask the state vector). In some embodiments, a state vector is the content of a shift register with a recursive structure, wherein the feedback tabs of the shift register are selected such that the impulse response of the shift register is a Maximum Length Sequence (MLS). MLS is a bit sequence generated using a maximal linear feedback shift register. These are periodic binary functions which reproduce every binary sequence (except the zero vector) that can be represented by the shift registers (i.e., for length-m registers they produce a sequence of length $2^m-1$). In some embodiments, conventional hash functions used in legacy encryption systems, called hereafter "legacy hash functions". In more general terms, the hash function explained above can be viewed as a random number generator with multiple inputs.

In another embodiment, the nodes are first authenticated through a reliable (secure) link, e.g., through a wired connection, or through Near Field Communications (NFC). During the same phase, the initial values of the sate vectors are set (state vectors are initialized).

In other embodiments, the initial value of the state vector is set during a training phase, wherein the Access Point and the Client exchange randomly generated data to initialize the value of the state vector. In another embodiment, the training phase is completely or partially repeated, e.g., In regular time intervals; after exchanging certain amount of data; when one of the two legitimate nodes senses a potential security breach; when data being exchanged is of higher sensitivity.

In another embodiment, during the training phase, legitimate transmitters reduce their power level, and/or intentionally add a randomly generated noise to their transmitted signal, such that any receiver aiming to detect the training packets unavoidably encounters detection errors. In this manner, legitimate units can make sure (increase the chances) that eavesdropper, if listening, will receive some of the data packets transmitted during the training phase in error. On the other hand, a legitimate node receiving such training packets from its counterpart can request a retransmission when faced with an erroneous packet (i.e., it can send a NAK signal containing its digital ID). However, Eve cannot initiate this NAK procedure without being (with a high probability) detected by the legitimate recipient. As a result, legitimate parties will eventually initialize their state vectors, while making sure eavesdropper has fallen, with very high probability, out of sync with them.

In another embodiment, data gathered during training phase will be mixed with earlier history.

In another embodiment, the training phase relies on packets being sent form the Access Point to the Client, while Client only sending back NAK in case of detecting a packet being in error.

Figure 7:
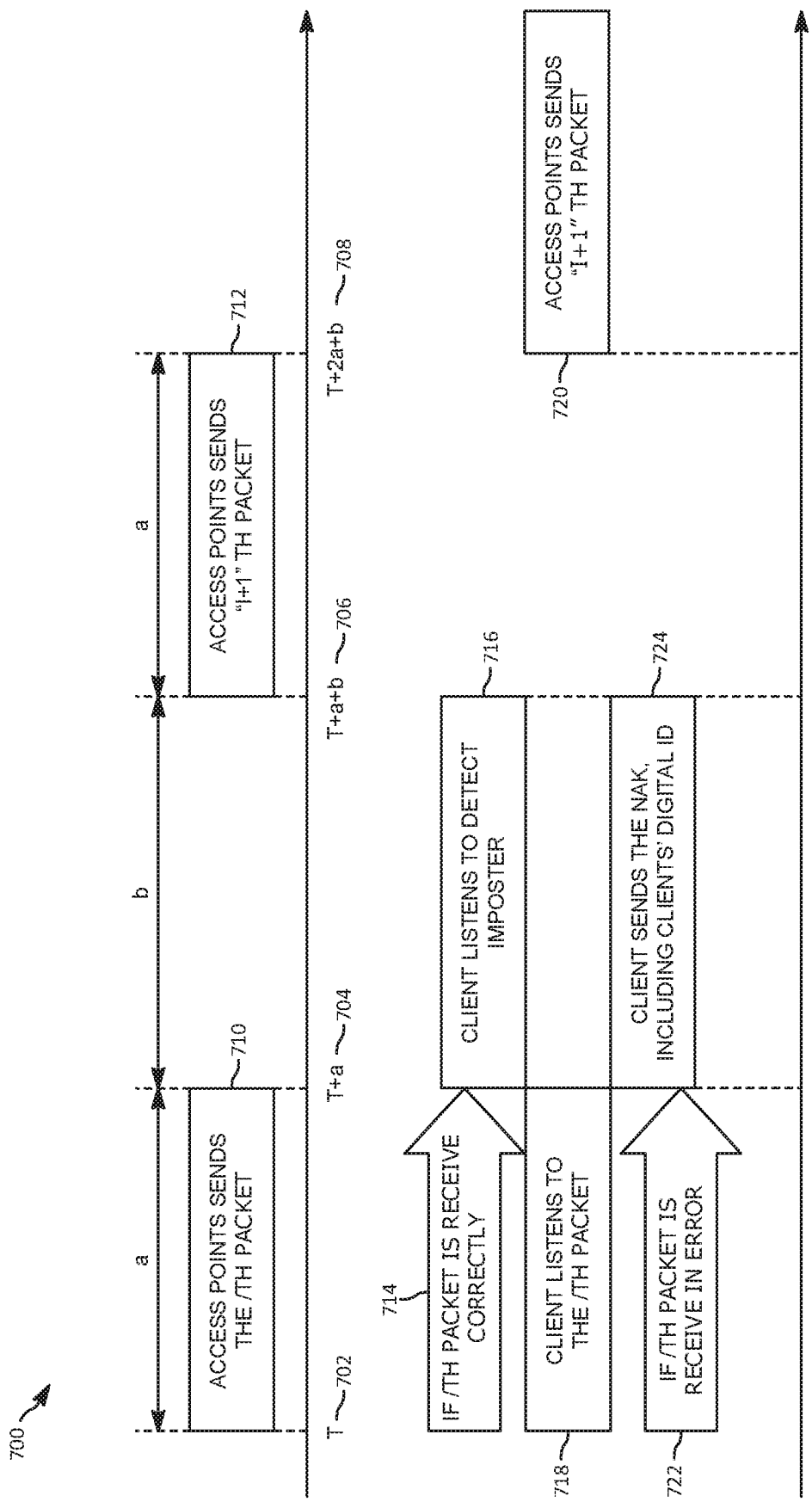
FIG. 7 illustrates a timing diagram in accordance with one or more embodiment.

Referring now to FIG. 7, embodiments further provide a training phase 700 in which a Client is in a listening mode, and Access Point is in the transmit mode. As shown, the training can include a time T 702, T+a 704, T+a+706, and T+2a+708. As shown at 710 an Access point send the ith packet, after time "b" access point send the i+1th packet 712. If the ith packet is received correctly at 714, the client listens to detect an imposter at 716. Client listens to the ith packet at 718, and the client listens to the i+1th packet at 720.

If the ith packet is received in error at 722, client sends a NAK, including a client's digital ID at 724.

Thus, the Access Point generates a sequence of random data packets (of a known/fixed length), and sends them to the client at regular time intervals. Client listens to each packet, checks the packet for possible error (e.g., using Cyclic Redundancy Check). If packet is received correctly, the client continues to listen to make sure eavesdropper does not act as an imposter. If packet is received in error, the client sends a NAK including the Client's digital ID (such as its MAC or IP address).

Encryption Key Formation Based on Random Channel Errors

Figure 8:
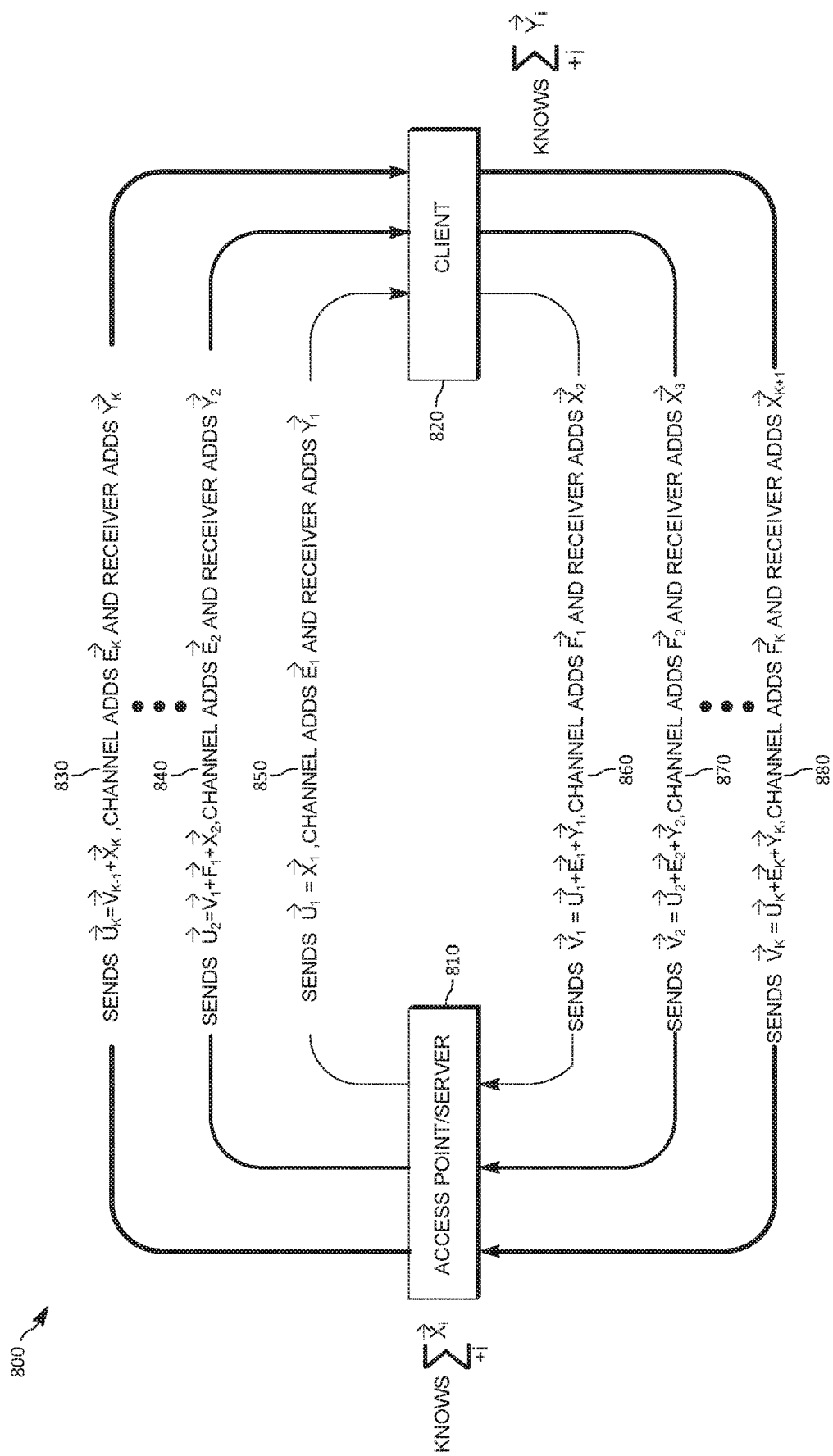
FIG. 8 Illustrates a transmission diagram between an access point/server and a client including channel error in accordance with one or more embodiment.

Referring now to FIG. 8, some embodiments include transmissions in a noisy channel 800 between legitimate nodes access point/server 810 and client 820 that rely on the randomness of channel errors to establish a secure encryption key.

As shown 830 provides for Access Point sending $$\vec{U}_K = \vec{V}_{K-1} \oplus \vec{F}_{K-1} \oplus \vec{X}_K$$

and the channel adds error $\vec{E}_K$ and the receiver adds $\vec{Y}_K$

At 840, the Access Point sends $$\vec{U}_2 = \vec{V}_1 \oplus \vec{F}_1 \oplus \vec{X}_2$$

$\vec{E}_2$ and receiver adds $\vec{Y}_2$

At 850, Access Point sends:

$$\vec{U}_1 = \vec{X}_1, \text{ channel adds } \vec{E}_1 \text{ and receiver adds } \vec{Y}_1$$

At 860, the client sends $$\vec{V}_1 = \vec{U}_1 \oplus \vec{E}_1 \oplus \vec{Y}_1, \text{ channel adds } \vec{F}_1 \text{ and receiver adds } \vec{X}_2$$

At 870, the client sends $$\vec{V}_2 = \vec{U}_2 \oplus \vec{E}_2 \oplus \vec{Y}_2, \text{ channel adds } \vec{F}_2 \text{ and receiver adds } \vec{X}_3$$

At 880, the client sends $$\vec{V}_K = \vec{U}_K \oplus \vec{E}_K \oplus \vec{Y}_2, \text{ channel adds } \vec{F}_K \text{ and receiver adds } \vec{X}_{K+1}$$

In some embodiments, "Diffusion" as is appreciated by those of skill in cryptography, is used to spread out the effect of each bit on a block of bits involved in key exchange. For example, diffusion can include masking, in which each bit selects a mask or its complement, depending the value of the bit, to be applied (added modulo two) to the entire block of bits to be used in the key establishment.

In other embodiments, methods include hashing, in which a sequence of bits are used as the address into a hash generator (e.g., a hash table), with the generated hash vector (e.g., content of addressed memory location in the hash table) being used as randomized output of the randomization procedure. Size (binary length, or width) of the hash generator/table can be the same or different form the block size. Using the data to be hashed as both input and key to a legacy encryption engine, such as Advanced Encryption Standard (AES).

In some embodiments, methods allow to condense the extracted key to enable spreading out ambiguities about bits throughout the block. Examples include using a hash table/generator wherein the size (binary length, or width) of the hash vector is less than the block size. A many to one binary function (mapping a binary vector of certain size to another binary vector of a smaller size).

In some embodiments, pruning is used to delete some bit positions that are less reliable form further contributing to the formation of the final key. Examples include deleting bits depending on their channel reliability (soft values). Repeating each bits several times, computing a reliability for each bit based on majority counting at the destination, and deleting bits accordingly. Adding code-words from a Forward Error Correcting (FEC) code to stings of bits, sending the output (which is masked by the selected code-word from the FEC) to the other legitimate party, which is added to the local copy of corresponding bits at the receiving side and then the result is decoded to find the closed code-word of the FEC, and then deciding about reliability of the string by counting the number of bit differences found through decoding.

In some embodiments, verification is used at either ends of the link to verify if the other party has access to an identical key. Verification is performed such that the legitimate parties can verify their counterpart has an identical key, while avoiding to disclose information (minimizing the amount of information that is being disclosed) that can help eavesdropper to reconstruct the key, or correct for possible errors in its local copy. Verification can include computing a "key token" and sending it to the other party for the purpose of verification. For example, computing a vector of parities for the derived key and sending the resulting binary vector to the other party; input the derived key into a many to one binary function (mapping a binary vector of certain size to another binary vector of a smaller size) and send the resulting binary vector to the other party. Verification can rely on known methods for hashing used in legacy encryption techniques. In some embodiments verification can include encrypting a known message (e.g., "hello world"), relying on one-way functions commonly used in traditional cryptography (e.g., discrete logarithm) and send the result to the other party. The other party attempts to recover the message relying on its local copy of the key, and if successful, will inform the other party.

Some embodiments include error correction that allow the two legitimate parties to send one another information that would enable their counterpart to correct erroneous bit positions in its local copy of the key. In some methods error correction includes sending a vector of parities for the entire block of data (candidate for the key), or for a select subset of its bit positions with less reliability; sending a vector of parities for the entire block of data (candidate for the key), or for a select subset of its bit positions with less reliability, after repeating and permuting such bits to create confusion and diffusion, and also increase the block size of the underlying FEC to improve its correction capability in dealing with situations that the original key size is small.

Techniques for error correction can be enhanced by using adaptive coding schemes, wherein the number of parities is kept at the minimum possible level to allow legitimate parties to correct for the differences between their local copies of the key, while disclosing minimum information. This can be achieved by sending additional party bits upon a request from the legitimate counterpart. This concept mimics the concept of Adaptive Repeat Request (ARQ) used in conventional transmission techniques. One main difference between the setup used herein and conventional transmission strategies is that, here, all that is needed is that the two legitimate parties reach to the same vector, regardless of what the values of the bits may be. In contrast, in conventional transmission strategies, the information content cannot be changed in the process. In other words, in the current setup, the two parties need to reach to the same bit values, while in transmission, the receiving party should be able to recover the exact bit values sent by its counterpart.

In some embodiments, parties may combine the information gathered in subsequent rounds, and/or in subsequent renewed attempts to establish a key, to guess the pruned and/or erroneous bits positions.

Referring back to FIG. 8, in some embodiments, the loop for key formation is traversed K times, while the two parties keep a local copy (including any soft channel output) of what has been received in each round. The legitimate parties rely on a combination (all, or a subset) of the aforementioned procedures (i.e., "Pruning", "Randomization", "Privacy Amplification", "Verification", "Error Correction", and "Information Consolidation"), operating in a subset of rounds (or operating in all rounds), to derive a shared key. The reliability of bits are extracted from channel soft outputs, and/or by repeating each bit several times and relying on majority counting to derive the bits' reliabilities, or the use of FEC as mentioned earlier.

In some embodiments, the loop for key formation is traversed K times, while the two parties keep a local copy (including any soft channel output) of what has been received in each round. The legitimate parties, in each round (or in a subset of rounds), rely on "Pruning" of unreliable bits followed by "Randomization" of remaining bits prior to closing the loop in that particular round. In one embodiment, the parties will inform their counterpart of the bit positions that are pruned. In other embodiments, the party pruning the bits does not inform the other party of the bit positions that are pruned and rely on the other party to guess the pruned and/or erroneous bits positions from its local copies received in each round. In another embodiment, the parties do not directly inform their counterpart of the bit positions that are pruned, but will send some parity information that would help the other party to guess the pruned bit positions (relying on the parity information received form its counterpart, as well as relying on its local copies received/stored in subsequent rounds and their corresponding reliability values). In some embodiments, pruning follows a "Verification" step, performed in a subset of rounds, to stop the looping procedure when a shared key is found. In another embodiment, the receiving party will use the verification tokens received in each verification step, in combination with other relevant information mentioned earlier, to guess the pruned and/or erroneous bits positions. The reliability of bits extracted from channel soft values, and/or by repeating each bit and relying on majority counting to derive the bits' reliabilities, or the use of FEC.

In another embodiment, the legitimate parties intentionally add noise to the signal prior to closing the loop to induce errors for eavesdropper (will be helpful if eavesdropper relies on multiple antennas to enhance its receive SNR).

In another embodiment, the procedure of establishing a key is repeated multiple times and all the observations gathered during these rounds, and their associated looping(s), are combined to guess the pruned and/or erroneous bits positions. In some embodiments, the information communicated in each round aims to learn from the past history and complement the information provided to the other party in earlier rounds. An example is selective retransmission of the information sent in some of the earlier round(s).

Some embodiments include methods of selective retransmission including generating a random binary vector by an access point and sending it to a client. Next, after a client receives the vector, recording the soft channel values, making a decision on the bits, and sending the resulting vector back to the Access Point. Next, when an Access Point receives the vector, recording the soft channel values, making a decision on the bits, masking the vector with a new randomly generated binary vector, and sending the resulting vector back to the Client. Next, according to embodiments, the steps are repeated V times.

Next, the client records the final vector (which in some embodiments is a sum of the original binary vector and all masks generated by the Access Point, plus any vectors due to channel error caused in the process of traversing the loop). Next, the client computes a parity (or a set of parities), for example using a Cyclic Redundancy Check generator, or a Low Density Parity Check (LDPC) code for the final vector. Next, the client sends the parity computed to the Access Point. Next, the Access Point adjusts its local copy of the "original binary vector, plus all subsequent masks" by flipping the minimum number of bit positions in this vector such that the resulting binary vector has the same parity as the one generated/sent by the Client, and records the resulting vector. In some embodiments, the Access Point uses a decoding algorithm, or an iterative decoding algorithm in the case of LDPC, for the underlying code. Next, Access Point restarts the process and repeats the procedure for W times. Next, Access Point and Client, separately, compute the sum modulo two of all W binary vectors recorded at their ends. Next, Access Point and Client verify they have access to identical vectors, if yes, this vector is used as the key, or as a "key component". If not, the entire procedure is repeated.

In another embodiment, client discards U of the least reliable bits, and informs the Access Point of the position of deleted bits. In another embodiment, client discards U of the least reliable bits, but will NOT explicitly inform the Access Point of the position of deleted bits and let Access Point guess the positions based on soft channel values, and knowing the original vector. In another embodiment, Access Point and Client, each discard P of the least reliable vectors before adding them. In one embodiment, this decision is made jointly by the two legitimate nodes through public negotiations. In another embodiment, Client discards a subset of the vectors, informs the Access Point of the corresponding indices, and then the validity of the key is verified. In another embodiment, Client discards a subset of the vectors, informs the Access Point of the corresponding indices, then the validity of the key is verified, and if key is not verified, a different subset of vectors are discarded, until key is verified or a threshold is exceeded.

Another embodiment a method includes uses the following procedure to find an encryption key.

First, a Client generates a random binary vector X, and encodes it using a Forward Error Correcting (FEC) code, to obtain a binary vector Y. Next, Y is modulated to vector C. Next, C is transmitted to the Access Point, and C+Z is received by the Access Point, where Z is the vector of additive noise. Next, Access Point decodes the received vector C+Z to obtain the closest (with the highest conditional probability) valid code-word $\underline{Y}$. Next, Access Point accepts $\underline{Y}$ is the reliability of decoding is higher than a threshold T, otherwise, the result is discarded. The outcome of this process (acceptance/rejection) is communicated to the Client. Next, all Steps are repeated until M vectors are accepted by the Access Point. Next, the Access Point adds the M vectors that have been accepted to generate a vector $\underline{W}$. Next, the Client adds the original forms of the M vectors that have been accepted to generate a vector W. Next, the Access Point and Client verify if W and $\underline{W}$ are identical. If the they are identical, W=$\underline{W}$ will be used as the key, or as a "key component" (to be defined later). Otherwise, steps are repeated until a valid key is found.

Another embodiment uses the following method. First, Access Point generates $Q=2^q$ random bits and sends them to the Client. Next, Client picks the bit with the highest reliability and sends its index, using q bits, to the Access Point. Next, both steps are repeated K times and then the Access Point and Client verify if the resulting K bits are identical. If the bits are identical verification is positive, then they use the resulting K bits as the key, or as a "key component" (to be defined later), otherwise, the procedure is repeated.

In another embodiment, the steps are repeated N times, and the results are added (modulo two) before entering the verification step.

Another embodiment uses the method. First, Access Point generates a random bit, modulates it, adds some noise to it, and sends the result to the Client. In one method, the Client receives the modulated bit and forwards it to the Access Point. Client also makes a hard decision on the received signal to recover an estimate of the corresponding bit value. Next, the Access Point, seeing the result of what is received and knowing its own noise added to the signal prior, will estimate if the Client has decided about the bit correctly. If yes, it signals the Client to keep the bit, otherwise, the bit is dropped. Each step is repeated to create multiple bits, which are added to create a sum-bit A. Further, each step is repeated to create several sum-bits. Next, Sum-bits are used to form a binary vector. Next, Access Point and Client verify if the vectors obtained at the two legitimate nodes are identical. If the vectors are identical, the result will be used as the key, or as a "key component otherwise, steps are repeated.

Methods herein explained above are enhanced by "gauging" and "adaptation" procedures. Gauging is used to measure the bit error rate and/or the signal-to-noise ratio in underlying links: Client→Access Point, Access Point→Client, and underlying loops: Access Point→Client→Access Point, Client→Access Point→Client. Adaptation is used to adjust the transmit power and/or the level of added noise to bring the bit error rate and/or the signal-to-noise ratio to certain level, which would increase efficiency in establishing a key for a desired (target) level of security (making sure eavesdropper is subject to an adequate level of ambiguity).

In another embodiment, Access Point aims to send the bits of a secure key to the Clients, while making sure the SNR of the Access Point→Client is as high as possible, while the SNR of the link Access Point→Eavesdropper is low, or at best is a random variable taking different values regardless of Eavesdroppers attempts to improve its reception SNR. In one embodiment, the Access Point sends additional bits to contribute to the construction of the overall key, or the "key component" (to be defined later), in time instances that the SNR of Client→Access Point and/or the SNR of the link Access Point→Client are high.

In another embodiment, the Access Point measures the impulse response of the channel from Client→Access Point, and uses this impulse response, say of time duration IM, to create a coordinate system of size IM×IM, and then sends the key bits over the coordinate with maximum SNR to the Client, while sending random noise over the remaining coordinates. Hereafter, such a coordinate system is referred to as eigen-basis. In some embodiments, the method includes beamforming in time domain to improve the SNR for the Client, while creating noise for eavesdropper damming eavesdropper's reception). Other embodiments rely on beamforming in frequency domain, and/or in space domain (antennas' domain) and/or time domain to improve the SNR for the Client in the direction that the Client will listen, while generating jamming noise in all other directions to hinder eavesdroppers reception.

Figure 9:
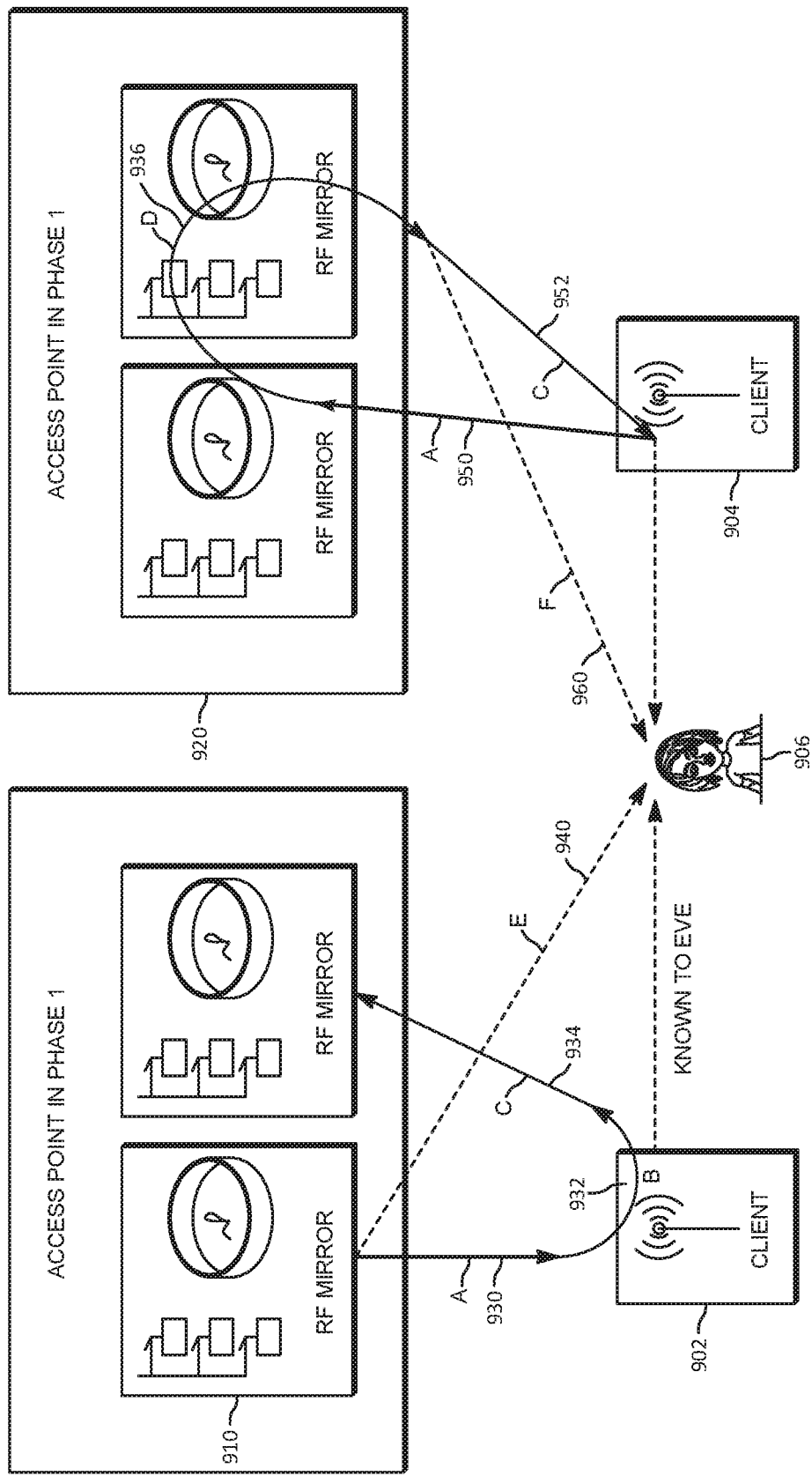
FIG. 9 illustrates a transmission between two clients and two access points/servers in accordance with one or more embodiment.

In some embodiments, using channel reciprocity, the phase of the channel between legitimate parties masks a phase shift keying modulation carrying a secure key, or carrying information that would help the legitimate nodes to establish a secure key. In each round, the RF channel determining the phase values is perturbed through switching of some parasitic RF elements Referring to FIG. 9, some embodiments uses channel reciprocity to enable the legitimate parties to generate a longer key with independent phase values, while the environment surrounding them is fairly static (in terms of fading and channel phase characteristics).

As shown, a client 902 and a client 904 may have an eavesdropper 906 attempting to eavesdrop using Access Point in Phase 1 910 and an Access Point in Phase 2 920. Channel values A 930, B, 932, C 934, E 940 operate in Phase 1. Channel values A 950, D 936, C 952 and F 960 operate with Access Point in Phase 2 920. In one embodiment B and D are random phase values locally generated and added in legitimate nodes. B and D are private. In some embodiments the A+B+C path and the A+D+C can be public. In some embodiments, the parasitic RF elements are incorporated in the Access Point, while a Client relies on its simple antenna structure used for its regular transmission/reception. In an embodiment, the data received at a given node is related to one instance of key establishment, instead of being detected locally (detection involves operations such as synchronization, demodulation and error correction), are first locally masked and the results are sent to a central node for detection. Masking is such that, if the node initiating this operation gets access to both original sequence (of received symbols) and the bit values of their masked version after detection, the node will be able to extract the original information content, while access to the bit values of their masked version alone does not permit Eavesdropper 906 to reconstruct the original data content.

An example is as follows: nodes rely on a binary code with hard decision for error correction, and the legitimate node initiating the distant error correction process will first select a valid code-word, randomly selected from the underlying binary code, adds it (bit-wise) to the received sequence of bits (uses it to mask the bit stream), and sends the result for distant processing (error correction) in the Cloud. In this case, upon receiving the corrected binary vector, the node initiating the process will, once again, add the selected random (valid) code-word to the corrected binary vector and this will remove the effect of the masking. In a one embodiment, Access Point will complete the two phases shown in FIG. 9, and then will change the RF parasitic elements and go through these two phases once again. Upon repeating these steps for S times, Access Point will generate a random key, apply forward error correction to this randomly generated binary vector, modulate it over S successive M-PSK constellations, accounts for the relevant phase values (namely A+B+C and D corresponding to each of the S steps), and sends the resulting vector of modulated symbols to the Client. Client will compensate for the unknown phase values (namely A+D+C and B corresponding to each of the S steps), demodulate the result, masks the resulting binary vector with a valid (randomly selected) code-word, and sends the result for distant processing (error correction) to the Cloud.

Another embodiment includes a channel training phase, Client sends a training signal, and Access Point, while scanning through several of the antenna configurations (created by switching the parasitic elements) will measure the channel impulse responses for the different configurations of antennas (these are like different realizations of the underlying RF channel).

Upon completion of this step, Access Point computes the Eigen-basis for these different channel realizations, and selects a subset of the channel realizations that have a better gain to the Client.

Access Point relies on the selected subset of an Eigen-basis and sends the key bits over them to the Client. For this purpose, Access Point sweeps through selected antenna configurations, for each configuration selects the corresponding basis that has the maximum gain to the Client (or equivalently said, the basis that beam-forms on the client), modulates that basis with one or multiple key bit(s), while sending a noise signal jamming the sup-space orthogonal to the Client's beam-formed direction(s). The noise is independent over the jammed coordinates and has equal energy over all the jammed dimensions. To improve security, modulation can include a partial key-bit, in the sense that several such bits are sent and XORED at the Client side.

Other embodiments rely on above procedure, in addition to beamforming in frequency domain, and/or in space domain (antennas' domain) and/or in time domain to improve the SNR for the Client in the direction that the Client will listen, while generating jamming noise in other directions.

In another embodiment, the Access Point and/or the Client induce time, space and/or frequency selectivity in the channel to their legitimate counterpart, and let the counterpart select the configuration that maximizes the SNR in the legitimate link. Some embodiments, use Orthogonal Frequency Division Multiplexing (OFDM) signaling, wherein one of the legitimate parties, say the Access Point, induces frequency selectivity by sending multiple copies of the signal with pseudo-random relative time shifts. This induces frequency selectivity, and then the counterpart (in this case, the Client) selects the OFDM tone with the highest SNR, and informs its sending party (in this case, the Access Point) to use that specific tone to send a group of key-bits, a single key-bit, or part of a key-bit. The pseudo-random time shifts are changed, for example in each transmission, to improve security. In another embodiment, the sending party, say the Access Point, through measuring the impulse response of the link Client→Access Point will adjust the relative time shifts to improve the SNR in the link Access Point→Client.

Some embodiments include communications scenarios wherein content of data packets can be made available to legitimate nodes at an Application Layer, i.e., access to Physical (PHY) and Medium Access Control (MAC) layers is not possible or is limited. Embodiments include methods to establish and/or enhance the security of data exchange between two legitimate nodes (hereafter called "node A" and "node B") in the presence of an eavesdropper (node E). Such embodiments apply to wireless transmission systems with support for User Datagram Protocol (UDP), wireless transmission sending bits/packets without following any particular standard, while giving access to the user to read the content of transmitted packets. Hereafter, this is referred to as "Direct Transmission", connections over Internet supporting UDP, and cConnections over Internet supporting TCP/IP.

Some embodiments rely on the channel bit/packet errors, and/or on the random nature of the packet arrival (and/or inter-arrival) times to establish a secure key, or "key component", between node A and node B, while keeping node E uninformed of the key.

In some embodiments, a wireless transmission medium, node A generates a number of data packets, say K, each containing random data. If the UDP protocol, or "Direct Transmission", does not include Cyclic Redundancy Check (CRC), or the built-in CRC is not reliable, node A includes a CRC parity sequence to each packet, and sends the packets to node B using UDP, or "Direct Transmission". If one has access to power control in node A, the transmit power will be intentionally reduced to cause more packet errors. If this is not possible, then packets will be transmitted at normal transmit power level. node B checks the packets upon reception, detects which packets are received correctly, and will inform node A of the indices of the packets that are received correctly. node A and node B, each add all the packets that are received correctly, and use the result as an initial key, or "key component". To add confusion for node E, node A will apply a hash function to the random bits in each packet, such that if the packet is received in error, majority of its bits are in error and node E cannot extract any useful information about the content. To increase the error rate for node E, node A and node B can go through a looping of packets.

Other embodiments include methods using an underlying wireless standard with a mechanism for retransmission of erroneous packets that cannot be easily disabled. An example is the case of Long Term Evolution (LTE) cellular systems. In this case, a sequence of UDP packets are transmitted at equal time intervals from one legitimate node to the other, receive times of packets are recoded at the receiving end, and packets that are received with delay (indication of retransmission) are discarded. In this case, packets that are received with smaller delay (indication of success in the first transmission attempt) can be used as if the underlying standard did not have a retransmission mechanism.

According to some embodiments, data exchange, at least in part, is equipped with error detection and retransmission. In such cases, embodiments include methods to continually change encryption keys over time and improve security. Upon establishing an initial key, node A and node B, each build an internal state system that accepts as input their current key and each error-free data packet exchanged between node A and node B (retransmitted until there are no errors) and generates a new encryption key.

According to some embodiments, using the Internet, the packet error rate may be too low to allow establishing a secure key in a reasonable time. Thus, some embodiments include node A and node B sending a sequence of packets, at periodic time intervals (with exact measurement of their local time), in the directions "node A→node B" and simultaneously "node B→node A". The packets' inter-arrival times, measured at the counterpart node, are used, with the aid of a hash function, to generate some random bits (to be used as part of the key). node A and/or node B can intentionally change the routing path to their counterpart to increase the randomness in the arrival and inter-arrival times. Time information, in its simplest form, is the transmission delay between legitimate nodes measured at different times, or over different routing paths.

In some embodiments, node A and node B further measure the Internet paths followed in node A→node B (measured at node B) and node B→node A (measured at node A) and use that information, again through a hash function, to generates some random bits.

In some embodiments, one of the two nodes, such as node A, sends a sequence of random data packets to its counterpart, here node B, and the two nodes agree to use certain packets within the sequence of packets and XOR them to generate the initial key. The packets with certain indices in the original sequence sent by the sender node, and same indices at the receiving node when received packets are ordered according to their arrival time. As packets are likely to arrive out of order, then a node E listening for eavesdropping is likely to receive (at least) one of those packets out of order (time index of at least one packet at node E does not correspond to its original index within the sequence of transmitted packets). The legitimate nodes are also likely to experience a change in the ordering of the packets. To address this issue, the legitimate nodes will enter a verification phase to make sure they have generated the same key, and if the verification fails, the procedure will be repeated. Verification is performed using a one-way function used in traditional cryptography to cipher a known message, such as "Hello World", which the other party will try to decipher using its local copy of the key. A procedure (relying on one-way function) does not disclose the key content, and if the verification phase fails, the procedure will be repeated. Methods according to embodiments using verification can be enhanced by equipping it with the user of forward error correction (FEC).

In some embodiments, nodes measure the time delay and delay profile in the link between them. One of the two nodes, say node A, sends a sequence of random data packets to its counterpart, here node B, and adjusts the transmission times of a select subset of the packets such that the receiving node (node B) receives a particular subset of packets at times that satisfy certain mathematical condition in terms of their (approximate) arrival and/or inter-arrival times. An example for such a mathematical function is as follows: The measured time delay is used to extract some bits from the delay value, for example, by using the bit value at certain bit positions agreed a-priori between legitimate nodes. These bits are used as inputs to a hash function and the result is used to initialize a random number generator. A few of values generated by the random number generator are used to specify time positions, i.e., the packets that will contribute to the key construction (to be used as "key components", which are binary vectors which will be subsequently XORED, or mixed in other ways, to generate the key).

These pseudo-random values can be viewed as indices of "key components" packets in the sequence of transmitted packets. The following method is an example for an algorithm to gather "key components" from the delay between nodes: Delay between legitimate nodes is measured through collaboration between them. An example for such a collaboration is: A packet is sent from each node, which is looped by its counterpart, and the aggregated delay (loopback delay) is measured at each node. The method is performed multiple times and results are averaged to improve accuracy in estimating the loop back delay. The method is repeated when the delay profile needs an update, for example, when the key is not verified, or when significant time has passed during the process of gathering an adequate number of "key components", or when a new routing path is used. This operation can be enhanced by using separate Internet nodes to act as a set of relays in closing the loop between node A and node B. By selecting the set of relay nodes, and their orders, legitimate nodes will be able to measure multiple such delay values, each corresponding to a different path (looped through different intermediate relay nodes).

M packets are sent sequentially within a time duration of T second.

Arrival times (in terms of a proper unit of time) are rounded to closet integer.

Packets for which arrival times are equal to M modulo some prime number, say P, are selected.

Both nodes extract the packets above and store them as "key components".

In some embodiments, the method is repeated "N" times to find more "key components". To enhance randomness, this step could be performed after changing the routing path and/or waiting for some time such that delay between nodes has changed.

In some embodiments, all "key components" are XORED to find a potential key.

The two nodes enter a verification phase to make sure the key is identical on the two sides.

If the key does not pass the verification phase (step "h"), the entire procedure is repeated.

Techniques explained in various embodiments, can include adjusting the internal clock frequencies of node A and node B to correct for mismatches between their time clocks. Embodiments herein disclose the following techniques for this purpose. Thus, embodiments can be used to synchronize nodes on the network, replacing or enhancing the other synchronization techniques currently used, e.g., those based on Global Positioning System (GPS).

To synchronize node A and node B, one of the two nodes sends a sequence of packets, at equal time intervals, to the other party. The packets are preferably UDP. Assuming node A acts as the master in this process, each packet (preferably UDP packet) sent by node A contains the time stamp (generated by node A) corresponding to the transmission time of the corresponding packet. node B, upon receiving the packets, records the content of each packet (transmit time at node A) and its local time stamp recoding the corresponding receive time. Then, node B, measures the difference between subsequent transmission times and averages the values (called "averaged transmit deltas"), as well as the difference between corresponding subsequent receive times and averages the values (called "averaged receive deltas"). The difference between these two average values, once normalized by (averaged transmit deltas+averaged transmit deltas)/2, is equal to the time gap between node A and node B measured in one unit of time. This process can be enhanced by repeating the procedure (preferably simultaneously) by changing the role of node A and node B in terms of the one acting as the master. The procedure can be also enhanced by using an accurate external source of clock, a node C, (e.g., a node with GPS synchronization) to act as the reference clock and then node A and node B can separately adjust their local clocks to be the same as that of node C by applying the above procedure to "node A with node C" and "node B with node C". In practice the low cost oscillators have frequency drifts over time, that can be modeled based on information such as temperature, and models that captures period drifts in the clock frequency. By using such a model at each node (model is trained based on relevant information gathered at each node), and periodic application of above procedure, the clocks are node A and node B can further reduce the difference between their clocks.

The above embodiment has been explained in terms of "time/delay", which is a quantity with the following properties: it is a random quantity and it is a realization of the random variable measured in the path A→B at node B is (approximately) is the same as the realization measured in the path B→A at node A (assuming measurement/observation time instances at the two nodes are not too far from each other). Hereafter, this property is referred to as "path reciprocity".

There are other quantities with such reciprocity property that can be used (instead, or in combination with "time/delay" explained above). Another embodiment includes enhancing the effect and variety of such reciprocal random variables in a controlled manner. Using multiple computer servers which are installed in different locations, for example in different geographical locations, can form a mesh (every node can send packets to every other node). The mesh structure allows establishing a number of distinct network paths between the two legitimate nodes (packets routed through such paths will go through different network links and experience a different sample of the reciprocal random variable). Examining these different paths in terms of the reciprocal random variable being utilized (e.g., the "mutual delay between legitimate nodes", such as, travel time between the two legitimate nodes corresponding to a particular routing in the mesh structure) provides a larger number of possibilities to generate "key components".

In another embodiment, legitimate nodes rely on their local copies of a set of reciprocal random variable and each node (locally) generates a key. As these local copies of keys might not be the same, these two key copies are referred to as "local initial key pair", hereafter. As an example, a random number generator with multiple inputs can be used. The random number generators are identical at the two legitimate nodes. Each node relies on its local copies of reciprocal random variables, possibly in conjunction with history of information exchange and/or key(s)/key component(s) established between the two nodes (Nose A and node B), as inputs to its local multi-input random number generator. Upon completion of this phase (resulting in "local initial key pair"), the nodes can verify if the key copies are the same, and if the answer is negative, the nodes can either reinitiate the process, or enter a "key consolidation phase" to correct for possible mismatches between the two local keys. This phase of "key consolidation" can be performed with or without information exchange about errors.

Some embodiments rely on reciprocity of delay in sending packets over Internet, as a source of common randomness between legitimate nodes. In this case, the two legitimate parties, say node A and node B, perform the following operations for measurement of delay. node A sends a sequence of packets to node, node B forwards the received packets back to node A, node A measure the delay in the loop A→B→A. Likewise, node B (simultaneously) sends a sequence of packets to node A, node A forwards the received packets back to node B, node B measures the delay in the loop B→A→B. The two legitimate nodes measure the time that has taken each such packet to traverse their respective loops, and average these values to compute the travel time in their respective loops, namely A→B→A and B→A→B. Note that, in this manner, the two legitimate nodes measure the travel times in the paths A→B and B→A, resulting in measuring the same travel times at the two nodes. In one embodiment, the looping is repeated a few times, say 3-4 times, to make sure values measured at the two legitimate nodes are closer to each other. In the following, this is explained for the case of repeating the loop twice. In this case, for the procedure initiated by node A, the looping includes the paths A→B, B→A (one round), A→B, B→A (second round), and at this point the travel time of T(A→B)+T(B→A)+T(A→B)+T(B→A) is measured at node A. Likewise, for the procedure initiated by node B, the looping includes the paths B→A, A→B (one round), B→A, A→B (second round), and at this point the travel time of T(B→A)+T(A→B)+T(B→A)+T(A→B) is measured at node B. In some embodiments, the two nodes perform these operations of sending packets, forwarding, resending, forwarding, . . . and measuring travel times, simultaneously in order to make sure the network load and its variations over time has a lesser effect of the measured times. In some embodiments, method steps are repeated multiple times, each resulting in a separate measurement of the travel times at the two nodes. These collections of measured travel times are used, independently at each node, to extract a sequence of bits at each node, relying on the property that the travel times measured by the two nodes will be close to each other. These two sequences of bits may be different in a small number of bit positions, an issue which will be handled by the procedures explained earlier for bit correction and subsequent verification. In a one embodiment, the packets used for this purpose are UDP, to avoid additional delays imposed by various layers involved in networking. The technique disclosed above can be further enhanced by deploying a multi-level FEC structure for correcting the mismatches between the bits extracted at the two nodes. In this case, in a first level of error correction, one of the two nodes, say node A, sends a sequence of parities (e.g., generated using an LDPC code) to the other node, here node B. These first level parities are generated according to a subset of bits that have the highest chance of being the same at the two nodes. Then, the receiving node, here node B, uses the received parities to change its local copy of bit positions that, upon decoding of the underlying code, turn out to be different than the copy at node A. Once this first level of differences are adjusted, the sets of bit values can be separated into two subsets, say subsets A0 and A1 at node A and subsets B0 and B1 at node B. Due to the first stage adjustment, sets A0 and B0 will be the same, and likewise, sets A1 and B1 will be the same. Then, the same procedure of generating and transmitting parities will be repeated separately over subsets A0 with B0 and A1 with B1. This results in removing the differences between a second bit between node A and node B. This procedure can be continued in the same recursive/nested manner in order to extract more unified bit values.

Methods include the situation that the packets sent between nodes, to measure reciprocal time delays, do not have any content, other than, possibly, a simple index to show the order of each packet in its corresponding sequence. In another embodiment, the content of the packets are filled with random bits generated at the node acting as the master. Then, upon making sure the packets are divided into subsets at each node, and these subsets at the two nodes due to error removal are the same, the contents of the packets within each subset can be bit-by-bit XORED to create additional common information between the two nodes, to be mixed with the key components formed at each node. The operation XOR has the property that the order of the packets within subsets do not affect the outcome of their corresponding bit-by-bit addition. In general, the operation of XOR can be replaced with a variety of other mixing techniques with cumulative and associative property.

Key Consolidation Without Exchange of Information

According to some embodiments, two nodes, independent of each other, can correct for issues that are more likely to be the cause of mismatch. For example, each node can flip some of the bits in its local copy of the key, and then the two nodes retry the verification phase. The bits to be flipped are selected as the bits that are less likely to be correct. These bits are flipped in the entries used as the input to the random number generator and the random numbers are generated anew. Another example is the case of generating multiple component key pairs, with the intension of XORING them (independently at each node) to generate the final key pair. In this case, if the verification phase fails, then the nodes can improve the possibly of a match by dropping some of the keys from their local collection. For example, key components generated during time intervals that the delay jitter has been higher can be dropped (again, each node decides independently/locally which of the key components should be dropped from its local collection) and then the verification phase will be repeated. In another embodiment, the two nodes rely on a small subset of their local bits, with same indices on both sides, say 5 bits, to form letters (letter size will be 32 for the example of using subsets with 5 bits). These bits can be selected based on some pre-agreed pseudo-random selection of bit positions. Then, the selected subset of bits are replaced in the original set and the process is repeated with a new pre-agreed pseudo-random selection of bit positions. The point of this supplementary disclosure is that, if the set of bits are too large, then the probability that all bits within the sets turn out to be the same at the two legitimate nodes diminishes. Relying on a subset of a smaller size provides the means of improving the probability of reaching to the same final outcome at both nodes, while controlling (limiting) the chance of success for the Eavesdropper.

The methods according to embodiments can include a subsequent phase of "Key consolidation with exchange of information", wherein an error correction code operating over symbols of the size generated by the subsets is deployed. For the example of using 5 bits, the error correcting code will operate over a symbol size of 32.

Key Consolidation with Exchange of Information

Node A and node B, simultaneously, find the round trip delays of the paths A→B→A and B→A→B, respectively. These measurement can include additional null packets, called "time beacon null-packets", hereafter, sent with a fixed time gap, which can be used as the receiver side of the loop to derive a reliability figure for the accuracy of time measurements through extracting the time gaps between the null packets, and observing how these time gaps (which were supposed to be the same) change across successive "time beacon null-packets".

Node A and node B, each (locally) extracts some bits from the measured round trip times. These bits are selected from the actual measurement such that, these are fairly reliable for the legitimate parties, while not easy to guess for a node E (Eavesdropper). For example, a few consecutive bits from the middle part of the numerical values of measured times can be extracted. This is based on discarding a few of LSBs from the measured time value (to reduce error), then extract some bits, and discarding the rest of MSBs (making it harder to guess the extracted bits for a node E). The position of this window for the extraction of the useful bits, and the length of the window, can be determined based on figures of accuracy extracted using "time beacon null-packets", or other means available for measuring time jitter in networks. Here, we assume the length of the window for the extraction of useful bits is WL. This operation results in establishing a symbol from the set $\{0,1,2, \ldots 2^{WL}-1\}$ between the legitimate parties. This operations can be repeated (successively, or preferably with some time gap to improve randomness), and the final outcome is a collection of CS symbols from the set $\{0,1,2, \ldots 2^{WL}-1\}$. It can be also combined by the methods explained earlier for successive/nested extraction of bits.

Nodes A and node B, each, locally, mix the new CS symbols with the current key, or a hash function of it. Note that the "current key" means the key that has been in use between legitimate nodes and is preferably updated each time a data packet is exchanged, by mixing the old key with the content of the data packet. Mixing means using a hash function with multiple inputs and with the new key as its output, for example, a random number generator with multiple inputs, and with the output to be the new key.

Node A and node B verify if the new key obtained in step 3 is valid, if yes, the key will be updated, and if not, the process is either repeated from scratch, or the nodes enter step 5 below in an attempt to correct the mismatches between the local keys. This decision of "restarting from scratch", or "attempting to correct errors" can be based on the reliability values recorded in the process of establishing the raw keys.

Nodes A and node B, each, locally, view their copy of the raw key as the systematic part of a code-word with alphabets from the set $\{0,1,2, \ldots 2^{WL}-1\}$. The two nodes negotiate the structure of a proper error correcting code (operating over symbols form the alphabet set $\{0,1,2, \ldots 2^{WL}-1\}$). The structure (code strength) can be decided based on reliability values extracted in earlier steps. One of the nodes, say node A, generates the first parity and sends it to its counterpart, here node B. This can be communicated through a public channel, or preferably through a secure or semi-secure channel between node A and node B (to be explained later). node B finds the most likely vector in the coset specified by the value of this parity, and uses the systematic part of this new vector as its new local copy of the "raw key". The two nodes then attempt to verify the new "raw keys" ("raw key" of node B has been revised). If this fails, then node B relies on its revised "raw key", plus the first parity it has received from node A, and generates the second parity for this combination. Such combinations, to be formed recursively (in a nested manner) by adding new parities to the partial code-words found in earlier steps will be called a "partial code-word" hereafter. This procedure is repeated for a specific number of times, each step equipped with a "verification attempt", and if the process does not result in a valid key, then the process will be abandoned (the old key will continue to be used until it is modified by data exchange, and/or by another new attempt to generate a new key component using the procedure explained here.

Another method for error correction is based on the following strategy: The two nodes start by working on the first parity. The parity can take $2^{WL}$ values. Each node computes the likelihood of its systematic part, modified to create these $2^{WL}$ values for the first parity. The nodes send to one another these $2^{WL}$ different likelihood values. This enables the nodes to decide for a common value for the first parity ("common" means "the same value for the first parity at both nodes"). The decision is based on minimizing a metric, typically measuring the degradation in likelihood value of the systematic part to have certain value for the first parity. In other words, if a hard decision on the systematic part results in value X for the first parity, then, the metric corresponding to a value of Y for the first parity is computed as follows: The most likely combination of systematic part resulting in value Y for the parity is found. This value will be called hereafter the "conditional probability of the systematic part conditioned on the parity being equal to Y". Then, the ratio of the "conditional probability of the systematic part conditioned on the first parity being equal to Y" is divided by the "conditional probability of the systematic part conditioned on the first parity being equal to X". The logarithm of this ratio will be used as the "cost metric" associated with realizing a value of Y for the parity, as compared to the value of X (X results in the highest probability for the systematic part). The overall metric to realize a value of Y for the parity will be the "sum of the cost metrics of the two nodes for the parity being equal to Y", resulting in a "min-sum" decision rule. Having access to the cost metric of their counterpart, each node can decide for the best value for the first parity (value that minimizes the sum of the cost metrics). Then, each node locally adjusts its systematic part, and the verification phase is attempted. If the verification fails, then the two nodes bring the second parity into the picture. The two-tuple of the first and second parity can take $2^{WL} \times 2^{WL}$ values. Similar to the case of the first parity, each node separately computes the cost metric for each of these $2^{WL} \times 2^{WL}$ possible cases, and then the nodes decide for the value for this two-tuple that minimizes the sum of the cost metrics. This procedure continues until either "the verification turns out to be successful", or "a condition determining the procedure should be restarted, or abandoned/postponed" is reached. Such a condition is set to avoid disclosing too much information to a node E that may be eavesdropping. In any of such algorithms related to different embodiments, it is possible to improve the security of the key by the following procedure:

If the process for generating a new key is successful, the result will be considered as a "key component", and will be mixed with the "current key" to generate the "new key", and then the "new key" will replace the "current key" (i.e., "current key" will be updated). If the process for generating a new key is not successful, then the system continues with the current key. An additional level of security can be achieved by mixing the key with the information exchanged between the legitimate nodes.

Procedures explained so far for error correction differ from traditional Forward Error Correction (FEC). In traditional FEC, the procedure of encoding a message entails adding some redundant parities to it, and the procedure of decoding entails finding/correcting possible errors, such that the original encoded message is reproduced without error. However, in the current context (using "error correction" to help in "key consolidation"), the intension is not necessarily "to correct the errors", the two nodes aim to share an identical key (reach to the "same key at both ends"), without any preference to the numerical value that the components of such a shared key may represent.

In another embodiment, the application of error correcting codes in "key consolidation" follows the traditional ways followed in FEC encoding and decoding. In this case, the messages sent between the two legitimate nodes for the purpose of "key consolidation" are composed of the systematic part, plus some parities, and the receiving end aims to find the valid code-word with the highest likelihood value. For this class of embodiments (applying traditional FEC to help in "key consolidation"), the nodes can rely on a gradual transmission of parities to keep the leakage of information as small as possible. These approaches resemble traditional Hybrid ARQ.

In another embodiment, instead of using FEC, the two nodes use a one-way function to consolidate their raw keys. In one example, node A identifies a specific number of its least reliable key symbols. It then concatenate those symbols to generate a smaller vector of key symbols, shown by vector VS, hereafter. node A uses a one-way function, say OF, and computes OF(VS). It sends the OF(VS), plus the location of unreliable symbols used to generate VS to its counterpart, here node B. node B, knowing the positions of unreliable symbols, will change those symbols, will concatenate the resulting changed values and form a set of vectors $VS_i$. It than computes $OF(VS_i)$ for different values of i and pick the one that results in the same outcomes as OF(VS). The simplest form of a one-way function is based on using the function "$G^{VS}$ modulo P", i.e., multiplicative group of integers modulo P, where P is a prime number, and G is a primitive root modulo P. It is obvious to individuals skilled in the art that this operation can involve the entire key. A related embodiment is based on the following: One of the nodes, say node A, having its local copy of raw key, VS, computes $VS^{-1}=1/VS$ where the inversion is performed based on the group operations over the underlying multiplicative group of integers modulo P. Then, node A computes $Q=(G^{1/VS}$ modulo P) and sends the result to node B. node B, computes ($Q^{VS'}$ modulo P) by attempting different likely key configurations where VS' is derived from its local copy of the raw key through modifying some of the less reliable symbols. The operation is expected to result in identity element of the group, and will stop if this is found by searching over a specific number of least reliable key symbols. In this case, node B, by expanding its local raw key, say in binary expansion, can simplify the computation of exponents of Q by expressing ($Q^{VS'}$ modulo P) in terms of products of terms of the form ($Q^B$ modulo P) where B captures the effect of a bit in the computation. In this manner, node B can compute ($Q^B$ modulo P) for the bit positions that are less reliable and study the effect of flipping those bits without the need to redo the entire computation.

The methods for key consolidation can be enhanced by first going through a "pruning operation". An example for such a pruning operation is as follows: Each node locally prunes some of its most unreliable positions, and each party informs its counterpart of the positions pruned at its end, then the union of these two sets of pruned positions will be deleted from the raw keys at both ends.

In some applications, in particular in signaling over the Internet, the core packet-based transmission strategy may be too reliable for the methods. To overcome this issue, embodiments include methods to create an overlay channel from the underlying packet transmissions. Example of such an overlay channel are "modulo-channel" explained next.

Formation of "Modulo-Channel"

"Modulo-channel" is based on nodes being synchronized.

Time is divided into time segments, each segment is long enough to include several null-packets. Null packets are short packets with no information content.

Transmitter of the "modulo-channel" encodes the message (to be transmitted over the "modulo-channel") into a sequence of symbols from an alphabet set $\{0,1,2,\ldots P\}$. A message of length LM is transmitted in LM time segments. If the l'th symbol is SM, then the transmitter adjusts the transmission time of the l'th null packet (to be sent in the l'th time segment) according to the value of the symbol SM (which is in the set $\{0,1,2,\ldots P\}$). Receiver finds the arrival time of the successive null-packets, and converts these time values into integers by computing their residues modulo P (hereafter referred to as ModP operation). To communicate symbols from the set $\{0,1,2,\ldots P\}$, transmitter adjusts the transmission time of the l'th null packet (to be sent in the l'th time segment) according to the value of the l'th symbol, say SM, such that the corresponding ModP operation at the receiver side results in SM.

The above "modulo-channel" can be enhanced by refreshing the mutual time measurements between the legitimate nodes in regular time intervals, within the total time window used to convey a composite message over the "modulo-channel". Such an update can include "time beacon null-packets" sent with a fixed time gap, which can be used as the receiver side of the "modulo-channel" to derive a reliability figure for the accuracy of time measurements through extracting the time gaps between the null packets, and observing how these time gaps (which were supposed to be the same) change across successive "time beacon null-packets". nodes can also tune their respective oscillators to reduce the error between their time clocks using method explained earlier. This is the technique based on sending successive packets with the information contents of transmission times, recording the corresponding received times at the receiving nodes, measuring/recording the time differences, and then reducing error through separately avenging values in each of the two sets of time differences (averaging values within each of the two sets, one set corresponding to the transmit times, and another set corresponding to the receive times).

Formation of a Semi-Secure Channel From a Modulo Channel

The legitimate nodes rely on their local reference of time to establish a semi-secure channel between them. This is a channel that has packets at its input, and packets at its output, and the legitimate nodes aim to make it harder for node E to detect the packets sent over this channel form node A to node B, and vice versa. To establish a semi-secure channel, node A and node B measure one or a set of reciprocal random variables between them, and use a combination of these quantities to initialize a random number generator on both sides. One example is based on measuring the travel time (delay) to their counterpart (node B and node A, respectively). The two nodes divide the time axis in unit of packets and record the arrival time for each packet. They pick a time duration T that allows L packets to be sent from node A to node B, and vice versa. The two nodes index the packets by converting the corresponding arrival times to an integer, for example by computing the residue of the arrival times modulo a prime number P. The two nodes pick packets for which the indices belong a sequence, hereafter called "valid sequence". For the provided example of computing the indices using residue of the arrival times modulo a prime number P, the nodes, for example, can select packets for which indices are equal to Q<P. Another example for selecting the sequence is based on using a random number generator, for example using the recurrence relationship:

where a, b and m are large integers. The random number generator is initialized with a reciprocal random variable, for example, the loopback delay (delay of A→B→A and B→A→B) between the legitimate nodes. For the example of computing the indices using residue of the arrival times modulo a prime number P, the generated random numbers are computed modulo P. The loopback delay can be updated in regular time intervals within the selected time window T by dividing the time duration T into U equal segments. For this particular example, at the start of every T/U time segment, the two nodes simultaneously initiate a measurement process to find the delay of A→B→A and B→A→B. To establish the semi-secure channel, the two nodes generate a number of data packets, of equal lengths, some containing dummy bits, and some containing the data each legitimate node wishes to send to its counterpart. Each legitimate node places the data packets within the sequence of packets communicated within the time duration T (duration T is filled with data packets and dummy packets). Each node selects the location of its corresponding data packets such that, with high probability, its counterpart receives the data packets at time instances that belong to the "valid sequence" that has been already established between the two legitimate nodes. The semi-secure channel can be enhanced through looping between legitimate nodes (see FIGS. 12,13,14) and using "masking packets". To explain the idea of "masking packets", let us consider the semi-secure channel from node A to node B, i.e., A→B. The process starts by the two nodes first establishing a valid sequence. Then, node B generates a dummy packet $Y_1$ (to act as a "partial masking packet") and sends it to node A (relying on "valid sequence" for its placement within all the packets that are being continually sent). node A, extracts and store $Y_1$, generates a dummy packet $X_1$ (to act as an additional "partial masking packet"), XOR it with $Y_1$, and sends the result to node B. node B, extracts $X_1+Y_1$ (will be able to extract/store $X_1$ as it knows $Y_1$), generates a dummy packet $Y_2$ (to act as an additional "partial masking packet"), XOR it with $X_1+Y_1$, and sends the result to node A. This lopping operation continues multiple times, and at the end, node A and node B gain access to the partial masking packets generated at their counterpart node. The sum of these "partial masking packets" will be used to mask the packets to be exchanged over the "semi-secure" channel.

Next, embodiments include methods that rely on the "semi-secure channel" established between the legitimate nodes, and some "reciprocal random variables" established between the legitimate nodes, to derive a secure key. The established "reciprocal random variables" can be mixed to enhance security, for example using a random number generator that accepts multiple inputs, and generates an output as a function of those inputs. The result of such a mixing is called "raw key", hereafter. Note that the copies of the "raw keys" at the two legitimate nodes might not be the same due to possible errors and mismatches in the process of computing the local copy of the "raw key" at each node. The two nodes enter a verification phase to verify if the local copies of the "raw keys" are the same. In the case the verification phase fails, the legitimate nodes may decide to restart the process of establishing new "raw keys", with or without using any information from the earlier failed round(s). Another option is to first try to correct any mismatches between the two local copies of the "raw key". As mentioned earlier, this operation is called "key consolidation". The role of the "semi-secure channel" is to help the legitimate parties to communicate information towards "key consolidation", with minimal leakage of useful information to any potential node E that might be eavesdropping.

In various embodiments, a "valid sequence" can be generated from scratch each time that is needed, or preferably, new information gathered to establish a valid sequence are mixed with prior valid sequences already established between nodes A and B. Hereafter, such an operation will be referred to as "renewal of valid sequence" vs. "establishment of a valid sequence" which is the terminology to be used when the valid sequence is established for the first time. An example for "renewal of valid sequence" is based on forming a state diagram at the two legitimate nodes, with the state capturing the past history of established valid sequences, and with an input that is the new information. The idea is that access to both past and present information is required for the legitimate nodes to confirm their legitimacy, making it harder for a node E to eavesdrop the values.

In another embodiment, the two legitimate nodes first establish a semi-secure channel. Then, one of the nodes, say node A, generates H packets, each containing random bits. These packets are sent over a semi-secure channel to the other node, here node B. Methods include refreshing the reciprocal random variables being utilized in uniform time intervals within the transmission of H packets, where transmission of H packets is assumed to take a time period of T. Some embodiments use "packet propagation delay" (i.e., the delay of the path A→B and the delay of the path B→A that are the pair of reciprocal random variables). The delay measurements are updated in regular time intervals within the selected time window T by dividing the time duration T into U equal segments. For this particular example, at the start of every T/U time segment, the two nodes simultaneously initiate a measurement process to find the delay of A→B and B→A. node B, upon receiving the H packets, will rank the packets based on their reliability. Reliability of a packet will be higher, if the time jitter around the time of the reception of that particular packet is lower, and/or the difference between the actual arrival time of that particular packet and the time that the packet would be expected if all packets were taking the same time to travel from node A to node B, i.e., delay of the path A→B were constant for all packets. Once the unreliable packets are identified, the node B will inform node A (using the semi-secure channel) of the packets that are unreliable and should be dropped. The indices of such unreliable packets are sent one by one to node A in the reverse order of reliability (less reliable packets are handled sooner). Upon informing node A of the index of an unreliable packet, that packet is dropped from the mixing operation and the process of verification is repeated. If verification is still unsuccessful, another packet will be removed, and the process repeats. This operation continues for a certain number of times, and if the final outcome (verification) is still unsuccessful, the entire procedure restarts.

Key Establishment at the Application Layer

Some of the methods herein rely on channel (or network) errors to establish a secure key. On the other hand, in communication over the Internet, the packet error rate is typically low, but the chances of packets being reordered, particularly if the packets are short UDP packets, is significantly higher. Methods of herein aim to enhance this erroneous behavior and exploit it towards creating a secure key. To achieve this goal, another embodiment embeds the information in the order of packets as follows: One of the nodes, say node A, generates NP short UDP packets, each of size SP bits. Among these SP bits, a subset of size IB, where $NP=2^{IB}$ are used to label the packets from 0 to NP−1. These packets can be arranged in NP! (NP factorial) ways. These different permutations, called "permutation labeled" symbols hereafter, are considered to form an alphabet set of size NP!, node A generates a random binary sequence of a proper size and adds a sequence of parities to it (such that errors in the sequence of bits can be detected). The size is selected such that, after adding parities, the length of the resulting binary sequence is the largest integer less than or equal to $\log_2$(NP!). The resulting binary sequence is used to select one of the possible permutations of the NP packets (this will be called "permutation labeling, hereafter"). Then, node A repeats this procedure for TN times and sends all the resulting packets (total of NP×TN packets) to node B. To make sure that the group of NP packets corresponding to each permutation labeling are received together (without any packets from one permutation labeling being mixed with another set of the NP packets related to a different permutation labeling), a sufficiently long time guard is inserted between successive segment of NP packets (packets related to different permutation labeling are separated from each other). Upon receiving the packets, node B will parse the received packets into segments of size NP, recovers the bit label for each segment (computes the inverse of the permutation labeling operation for each group of NP packets), and checks for the validity of added parities. If this test for a segment fails, it means the packets within that time segment have been reordered. Such segments will be dropped from consideration. Then, node A is informed (by node B) which time segments are dropped, and which have been received correctly (i.e., the NP packets within the corresponding time segment are NOT reordered). Note that packets in consecutive time segments carry the consecutive permutation labeling words, and some of these words will be dropped from consideration. Then, the bit labels (permutation labeling word) corresponding to those time segments that have been received correctly will be mixed (e.g., XORED) by both ends (node A and node B) to generate a shared key component. In some transmission scenarios, the packets may have errors (in spite of being received in order), and to handle this issue, embodiments include adding a second set of parities, such as Cyclic Redundancy Check (CRC), to the data content of each packet to detect possible packet errors. This will be necessary if the underlying protocol does not include error detection, or if the error detection mechanism deployed as part of the protocol is not reliable. In such cases, time segments with erroneous or dropped packets will be discarded.

Some embodiments include embedding the key information entirely in the ordering of packets. As the effective size of the shortest UDP packet supported by a particular network may be larger than IB, the rest of each packet can be filled with random data. This random data can be: (1) discarded, (2) used as redundancy to reduce packet errors, and/or (3) carry additional random bits to be used (upon successful inversion of permutation labeling) as part of the key generation algorithm (e.g., some form of pseudo-random number generator with multiple inputs can be used to perform this operation of mixing in order to generate the key).

In some embodiments a degree of control over the probability of packets undergo reordering within each time segment of NP packets. For this purpose, methods include inserting a time gap between successive packets forming each time segment. In one embodiment, the size of the packets, the value of NP, and the time gap between successive packets, are selected such that the probability of reordering within each time segment of NP packets is high (say around 50%, or higher). For such a value, about half of the TN segments will be received reordered, and will be discarded. Now, if the probability of reordering event for a node E (acting as eavesdropper) is equal to PR, then the chances that all the segments used in key generation are received in order by node E (consequently, the corresponding permutation labels are detectable correctly by node E) is equal to: $(1-PR)^{(TN/2)}$, which should be (and can be easily made to be) a very small value. The reason is that, the contents of all segments received without error will be mixed (e.g., XORED), and consequently, even a single error (reordering of packets within a single segment among all segments that are being used in key generation) will render the result useless for the eavesdropper.

Some embodiments are directed to realizing permutation labeling, i.e., labeling (enumerating) all permutations of NP distinct objects. For this purpose, first the label, denoted by LL, is divided by NP and its residue, denoted by $0 \leq R(NP) \leq NP-1$, is used to position packet indexed by 0 in one of the available NP positions. Then, the label is modified according to $[LL-R(NP)]/NP \rightarrow LL$. Next, the algorithm positions the packet indexed by 1 in one of the remaining NP-1 positions. To do this, LL. is divided by (NP-1) and its residue, denoted by $0 \leq R(NP-1)$ NP-2 is used to position packet indexed by 1 in one of the available NP-1 positions. Then, the label is modified according to $[LL-R(NP-1)]/(NP-1) \rightarrow LL$. This procedure continues until all positons are filled. This operation can be viewed as expanding an integer value (partial key, plus the associated CRC) on a basis with NP digits, where the first digit is base NP (this digit is used to place the packet indexed by 0 in one out of available NP positions in the 1$^{st}$ step of permutation labeling), the second digit is base NP-1 (this digit is used to place the packet indexed by 1 in one out of available NP-1 positions in the 2$^{nd}$ step of permutation labeling), the third digit is base NP-2, and so on.

In addition to embedding information in the order of packets, it is also possible to include data in each packet. Additional data can be used to: (1) enhance error correction within each packet, and/or (2) be used to generate a longer key through mixing. An example for the first application is repeating the bits labeling each packet. An example for the second application is based on using a multi-input pseudo-random number generator, which relies on the information extracted from the permutation labeling, plus the contents of successive packets as distinct inputs to the multi-input pseudo-random number generator. This means, for example, the data extracted from the order is used as the first input to the multi-input pseudo-random number generator, the data content of the first packet is used as the second input to the multi-input pseudo-random number generator, the data content of the second packet is used as the third input to the multi-input pseudo-random number generator, and so on.

Various other forms of multi-input randomization is feasible too, and will be clear to individuals skilled in the art.

The methods herein according to some embodiments generate a key for each session. In this case, the number of key components need to be adapted to the channel condition. In general, the channel is required to create certain level of ambiguity for any parties listening to its content. Depending on the observed level of ambiguity in the channel, the number of key components can be adjusted (typically need to be increased, if the channel is more reliable) such that the probability of an eavesdropper having received all the key components correctly, is very low (should be below certain threshold depending on the target level of security). In such setups, if in some occasions the channel is too reliable, the system can withdraw form generating a secure key, and for example, restore to plain legacy encryption techniques.

In some embodiments, newly generated key components will be mixed with the history of alink, the history of one of the nodes, or the history of both nodes. In particular, the key components could be mixed with the data exchanged between the nodes, or simply mixed with the current key to generate a new key. It can be also mixed with methods based on "salt" and/or "nonce" used in legacy encryption methods. In a one embodiment, the two nodes will occasionally renew their keys, for example: (1) in regular time intervals, (2) when the channel condition is suitable for the purpose of generating a new key component (i.e., the channel is not too reliable to compromise security, but is reliable enough such that a new key component can be generated in a reasonable time, (3) when the key is getting old, i.e., it has been reused for certain time period, or for a certain number of times, or (4) when the data to be exchanged is of a higher sensitivity and needs more protection.

In some embodiments, it is desirable that channel errors, such as packet reordering, result in total confusion for the eavesdropper. This means, if there are TO options for a given symbol, if the symbol is in error, then, ideally, all remaining TO-1 possible options should have equal probability. In the case of error due to packet reordering, it will be difficult to satisfy this requirement. The reason is that, reordering of a packet typically involves a small number of displacements in the immediate neighborhood of its original position. This may enable the eavesdropper to perform an exhaustive search by swapping some of the packets with their neighbors. In some embodiments, the following strategy overcomes this problem. The transmission is organized into TM transmissions of symbols, with symbols composed of NP packets. Each symbols can take NP! different possibilities (values). This results in a total of $[NP!]^{TM}$ options. The combination of these TM symbols will be referred to as a "composite symbol", hereafter. In some embodiments, spreading out the effect of an error includes a large number of symbols. In some embodiments, the method includes deploying a coding scheme, preferably non-systematic, that encodes all these TM symbols at once. Other forms of hashing, such as using hashing masks, are possible as well. For the case of using coding, assume RT bits can be represented using these $[NP!]^{TM}$ options, i.e., RT is the largest integer smaller than $TM \times \log_2(NP!)$. First, a set of random bits are generated and encoded using a binary code with a large minimum distance, and with a given code-rate of, say 0.5. Then, a set of parities is added to the encoded bits. The size of the initial set of random bits and the size of the added set of parities are such that the total number of bits will be equal to RT. The resulting bits, representing a numerical value of say VV as a binary number, are used to label the TM symbols, where each symbol has a cardinality NP!. This is achieved by first expanding the numerical value of VV on a number basis composed of TM digits, where each digit takes value in the range of [0, NP!−1]. Then, the numerical value of each digit is used, in conjunction with the aforementioned "permutation labeling" algorithm, to find the permutation of NP packets constructing each of the TM digits (composite symbols). Then, a total of TN of these "(encoded) blocks of composite symbols" are transmitted, and the rest of the procedure follows as was disclosed in earlier, simpler, version of this algorithm operating on a single "permutation labeled" symbol, rather than this more involved version operating over a combination of TM of such "permutation labeled" symbols (composite symbol). Although this procedure is explained in the language of using a binary code, in some embodiments, the code operating over larger symbol sizes can be used as well. A suitable example would be Reed-Solomon codes operating over symbols of size NP!. Unlike conventional scenarios for the application of error correction coding (where it is desirable to deploy codes that can be easily decoded), here, just to the contrary, it is desirable that the deployed channel code cannot be easily decoded. As a result, random like codes would be a viable option in this application. An example would be a group code, with a pseudo-random generate matrix, operating over symbols of size NP!. In addition, the minimum distance of the code is simply a means to spread out the effect of labeling over a large number of symbols.

In another embodiment, the coding scheme is of high rate (even a rate of 1, i.e., no redundancy), and consequently, the code minimum distance will be small (the smallest possible value would be 1 for a code of rate 1). The code could rely on a pseudo-random generator matrix composed or integer elements, say in the range [0, NP!−1] or in some other range to simplify the complexity of multiplication, and the multiplication by the generator matrix would be modulo NP!.

In some embodiments, methods apply to "mask" the individual "composite symbols" (there are TN such "composite symbols") such that, if a node receives all the TM components ("permutation labeled symbols") constructing a given "composite symbol" correctly, then the node can easily reconstruct an associated binary label. However, the intension of "masking" is that if a subset of the TM "permutation labeled symbols" associated with a given "composite symbol" are in error, then the eavesdropper cannot easily perform an exhaustive search in an attempt to recover the binary label associated with that particular "composite symbol". To achieve this goal, in another embodiment, node A starts by generating each "composite symbol" using a random number generator. For each "composite symbol", node A generates TM integers, each uniformly distributed in the range [0, NP!−1]. Then, node A sends the "composite symbols" to node B over the channel explained earlier, which embeds information in the order of packets (packets are indexed by an integer in [0, NP−1]), and exploits the fact that packets will not be necessarily received in the same order that are being sent. The masking operation, which will be performed at both legitimate nodes (node A and node B) is an operation that maps the original uniformly distributed TM integers labeling the "permutation labeled symbols" into another set of uniformly distributed TM integers (this means integers are uniformly distributed in the set [0, NP!−1] before, as well as after, this mapping). Such a mapping is performed separately for each of the TN "composite symbols", preferably without reusing any of the mapping (masking) functions. An example for masking function is based on multiplication with a random matrix, where all operations in the matrix multiplication are performed modulo NP!. Another example is using a non-linear mapping [0, NR−1]→[0, NP!−1], again, with the property that the all integers before and after mapping are uniformly distributed in the set [0, NP!−1]. Channel coding is an example of linear mapping, and the channel code could be of rate 1 (multiplication by a full-rank, rectangular matrix of size NP!×NP!), or a code of a lower rate. Another example based on nonlinear mapping relies on traditional methods for confusion and diffusion used in legacy encryption methods, for example mapping through the use of S-box similar to AES. The important point is that, both ends first apply the masking transformation and then map each of the resulting "composite symbols" (with modified "permutation labeled symbols") into binary labels. The mapping to binary labels can be performed using the method explained earlier based on expansion of numerical values using number systems/bases.

In expansion related to "permutation labeled symbols", the bases are of values, NP, NP−1, NP−2, . . . , 1. In expansion related to "composite symbols", all the bases are of values NP!. The important point is that, if all the "permutation labeled symbols" constituting a given "composite symbol" are received correctly, then the corresponding binary labels generated at node A and node B will be the same, otherwise, there will not be any straightforward relationship between labels (that could be exploited by an eavesdropper). To add to the complexity of extracting information for an eavesdropper, in one embodiment, the masking function is a one-way function, for example, based on discrete logarithm, or AES algorithm where the key and input data are the same. To add to the complexity of extracting information for an eavesdropper, in another embodiment, the masking function is composed of a sequence of masking functions, where each of these constituent masking functions includes parameters that are adjusted based on the outcomes of the previous masking step(s). For example, there could be multiple linear or nonlinear transformations, indexed by 0,1, . . . TL, which are cascaded, and the index of the "K"th masking transformation is selected based on the values of certain subset of the "permutation labeled" symbols computed in steps 0,1, . . . , K−1. Another option is based on using random number of generators with parameters that are set based on the outcomes of the previous masking step(s). Structure of signaling for this embodiment is shown in FIG. 10.

Figure 10:
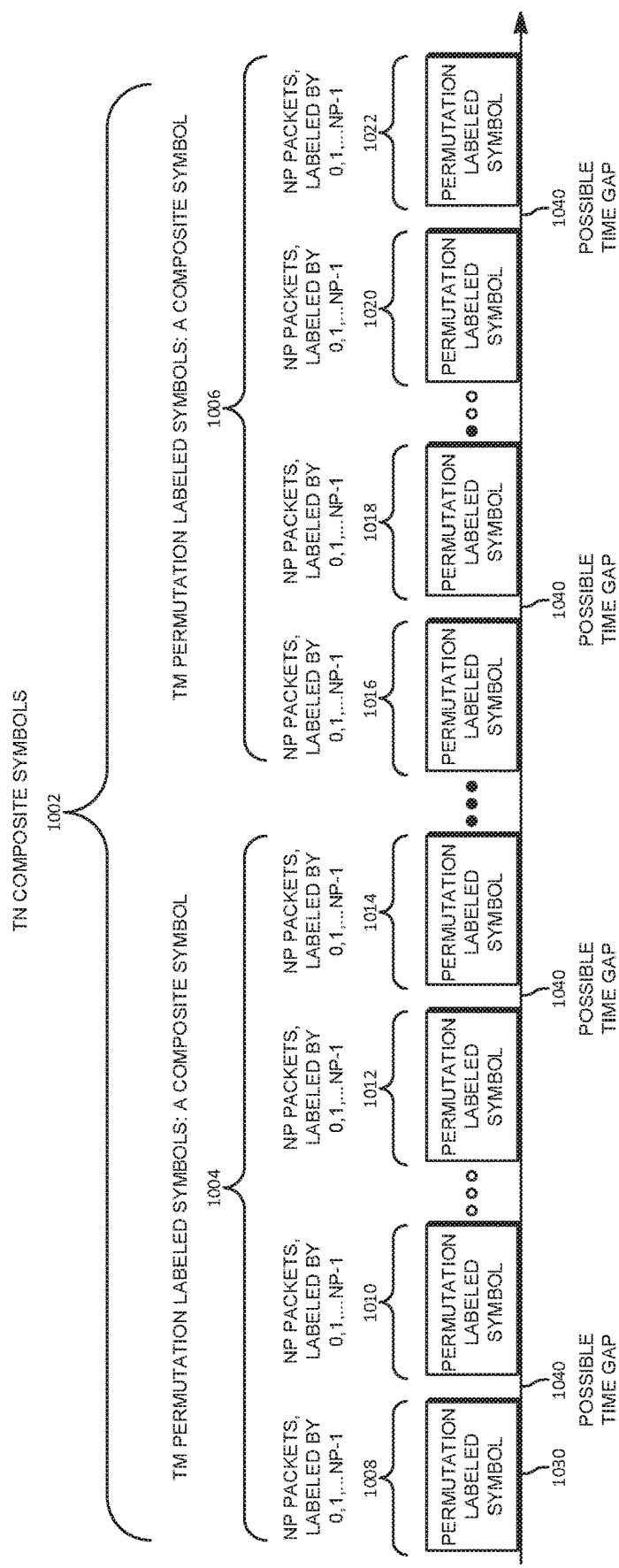
FIG. 10 illustrates composite symbols and permutations in accordance with one or more embodiment.

Referring to FIG. 10, TN composite symbols 1002 is shown including TM permutation labeled symbols as a composite symbol 1004 and 1006. The composite symbols 1004 includes NP packets labeled by 0, 1 . . . NP−1 1009, 1010, 1012, 1014. Composite symbol 1006 include NP packets labeled by 0,1 . . . NP−1 1016, 1018, 1020 and 1022. Each are permutation labeled symbols 1030 with possible time gaps 1040.

The concept of masking according to some embodiments, can be used to enhance embodiments disclosed herein. A communications system between two legitimate nodes, composed of a channel transmitting channel symbols—for example: a group of indexed UDP packets over Internet, a UDP packet over a wireless link, I/Q modulated symbols, etc.; Data can be embedded into a sequence of channel symbols; Channel symbols are subject to error; Channel symbols are grouped into composite symbols; A method for binary labeling of the sequence of channel symbols grouped into a composite symbol, and its inverse labelling; Consecutive composite symbols are labeled separately from each other, but the channel symbols within a given composite symbol are labeled as a group; A mapping to induce dependency by assigning a sequence of channel symbols (a composite symbol) into another sequence of channel symbols (a different composite symbol), such that, each component of the composite symbol at the output of the mapper is affected by all components of the composite symbol the input to the mapper.

One of the legitimate nodes, such as node A, selects a random sequence of channel symbols, grouped into a sequence of composite symbols. Composite symbols formed are transmitted to the other legitimate node, here node B. Each node, separately, applies the pre-agreed mapping (the mapping that induces dependency) to the components of each composite symbol, to generate a set of transformed composite symbols. Node A is the one that had initially generated these symbols and have them in storage, and node B has received them through the channel. Each node, separately, applies the inverse labeling operation to each transformed composite symbol.

The binary labels obtained by the above algorithm are potential key components. Node B identifies the (transformed) composite symbols that are received correctly, informs node A, and then both nodes mix (e.g., compute the XOR) of these binary labels corresponding to all usable (transformed) composite symbols to find a key component.

In another embodiment, to improve security, the two legitimate nodes, node A and node B, each (separately) create a public key and a private key. Then, depending on the direction of communication, each node (or both nodes) will send its (their) public key(s) through a semi-secure channel to their counterpart.

In another embodiment, for example in encrypting of data stored in a laptop, encryption is performed with the combination of two keys. One of these keys is stored on the laptop, and the other one is stored on a different device, for example on a handheld device (such as a cell phone or a tablet), or an employee's smart ID card. The two units rely on some form of an erroneous communication link (of the kinds associated with embodiments)—preferably a wireless link such as Near Field Communications (NFC) or Bluetooth, to establish two shared keys. These two keys will be mixed, for example bit-by-bit XORED, and the result is used to encrypt sensitive information on the laptop (and possibly on the handheld device as well). To access the files on these devices, the two units should be placed in close proximity of each other, for example, using NFC. During the same session, the keys after being used to decrypt, will be replaced by two new keys (again, each to be stored in one of the two devices). The combined key is enhanced by mixing it with a password, or other forms of authentication, such as various bio-metric signatures.

The methods can be combined with legacy encryption techniques, e.g., "methods known for public key cryptography", and/or "methods based on using passwords".

All mentioned embodiments can be enhanced by relying on randomly selected hashing operations that create a longer key from a shorter key. The hashing function can be negotiated between legitimate nodes in each instance that a new hash function is needed. Another embodiment builds the hash function from the state of the system, and/or from part of the established key, and mixes it with some new parameters to be negotiated between legitimate nodes in each instance of generating a new hash function. In some embodiments, such hash functions are not known a-priori, and each is used only once.

In some embodiments, methods combine the various techniques explained above in different classes of embodiments to obtain a key, or a key component. It also includes methods for privacy amplification to improve the quality of the key. It also includes known techniques for using a key to establish a secure link without disclosing the content of the key. It also includes application of known authentication methods to use part of the generated key for authentication. It also includes methods to combine the disclosed procedures with legacy encryption procedures, such as methods using SIM cards, or embedded SIM, to enhance the capability of the legacy encryption technique.

Methods can be enhanced by relying on third party node(s), say "trusted server(s)", which has/have a secure (or semi-secure) link to both nodes. The legitimate nodes, instead of communicating directly, will exchange information through one or a combination of such trusted servers.

Methods can be enhanced by relying on a mesh of connected servers, which can act as a relay in connecting node A to node B. In such a configuration, the relay (or relays) can be selected to: (1) increase randomness, (2) select a particular path of relay(s) that would provide a better channel for the purpose of key establishment.

It will be appreciated by a person skilled in the art that various classes of embodiments explained above can be combined. For example, fourth class of embodiments can be combined with the first class to establish a key in communications over the Internet, and renew the key based on the history of information exchange between the legitimate nodes.

Embodiments can be used in conjunction with known methods for initial authentication and key establishment, such as those based on using a password.

Encryption

Encryption is based on establishing a random key between two legitimate parties to be used for symmetric-key encryption. The key is established by first providing a source of common information (called common randomness hereafter) between the two legitimate parties, which will be subsequently used to extract a key. The source of common randomness is based on having a channel with noise/errors between the two legitimate parties, and using this channel to provide two sets of bits, one set at each party, in a manner that the bits between the two legitimate parties are dependent on each other, but are not necessarily the same (there is error). The main requirement is that, if an eavesdropper also monitors the procedure of key establishment, the set of bits formed at the eavesdropper will have some errors with respect to the two sets formed at the two legitimate parties and the errors among the three sets of bits formed at the three parties are close to being statistically independent of each other. This means, there is a noisy channel between legitimate parties (relating the bits formed at the two legitimate parties), and the channel to the eavesdropper (wiretap channel) is noisy as well, with a noise that is independent (or close to independent) from the noise in the channel between the two legitimate parties. Once the two sets of bits are formed at the two legitimate parties, then the two parties rely on additional exchange of information for the purpose of "key distillation" also called "key consolidation" (means each party cleans up its respective set of bits, and the two legitimate parties reach to the same set of bits with high probability). The legitimate parties have access to a many-to-one function, which will be used as a one-way function, for the purpose of "key verification" (means verifying if the two sets of bits being gradually distilled at the two legitimate parties are the same, or not). The operation of verification requires some exchange of information, but due to the nature of one-way function to be used, the result does not convey much useful information to the eavesdropper. At each step of information distillation, one of the legitimate parties uses its most recent distilled set of bits as an input to the one-way function, and sends the result to the second legitimate party. The second legitimate party also uses its most recent distilled set of bits as an input to the same one-way function and (locally) compares the result with what has been received from its counterpart. The process stops when the results are the same. The two legitimate parties also have access to a many-to-one function which can be used locally to distill the sets of bits. This means, the noisy bits are used as input to the many-to-one function, and the output is considered as a potential candidate for updating the distilled set of bits. The many-to-one function is typically a binary error correcting code with an appropriate level of redundancy, and the operation of "key distillation" entails finding the closest valid code-word to the set of bits at each legitimate parties. Key distillation is computed locally at each of the two legitimate parties by decoding the underlying binary code with the corresponding set of bits to be distilled (at each of the two legitimate parties) as the noisy input to the decoder. The two legitimate parties, in subsequent steps of key distillation can request their counterpart to selectively send some side information that would mutually help the distillation process. For example, if the legitimate parties have access to a reliability indicator for their bits, can selectively request their counterpart to help in reducing the noise in parts of their bit stream that is more noisy, or can drop selected parts of their respective bit stream (parts that have lower reliability) from further involvement in the distillation process, and inform their counterpart of such pruning of bits. The important point is that the indices of the bits, to be sent from one party to its counterpart, does not entail any information about the content of the bits, as a result, the two parties can collectively decide to operate over a subset of bits that is more likely to generate a valid shared key.

In some embodiments, a basic model for key establishment is composed of three parties having access to three noisy copies of some random bits. These parties are specified by "Client" and "Server" for the legitimate pair, and by "Wiretap" for the eavesdropper. Client and Server have access to another channel for communications between them, which may be secure, or insecure. Wiretap can listen to the communications over this channel. The exchange of information between Client and Server over this channel helps the two legitimate parties to: (1) Limit the key extraction to a subset of noisy information available to them which has a higher reliability. (2) Verify if the keys generated on the two sides are the same. To enable such a procedure, the necessary ingredient is the ability of "limiting the key extraction to a subset of noisy information which has a higher reliability". The measure of reliability could be, for example, the soft information of various bit observed over a noisy channel, which enables the legitimate parties to throw away some of less reliable bits, inform the other party of the indices of the remaining subset, and then mixing the remaining bits, e.g., using an XOR operation, separately at each side. In this case, Wiretap is assumed to monitor the exchange of information and as a result knows the indices of the selected subset of bits to be used by the legitimate parties. The mixing (e.g., XOR) operation used by legitimate parties causes an error propagation effect for the Wiretap unit, in that if there is a single erroneous bit in the selected subset of bits on the Wiretap side, then the result of mixing operation computed by the Wiretap unit will be independent of the result computed by the legitimate parties. This feature is due to the requirement that the error process at the Wiretap node is independent of the error process at the two legitimate parties. As a result, the bit positions without error at the legitimate parties (reliable bits that are selected by the legitimate parties for further processing towards establishing a key) have a probability of error equal to the a-priori error probability. As a result, the chances that all the bits selected by the legitimate parties are received error free at the Wiretap node will be extremely low.

In communication over some channels, such as the Internet, there is no such measure of reliability available that can be used by the legitimate parties. Embodiments disclose a method to address this issue, i.e., a procedure for "forming a measure of reliability". In an embodiment targeting this shortcoming, one of the two legitimate parties selects a code-word from an appropriate binary code and adds it to the noisy bits on its side and sends the result to the other party. The other party adds its version of the noisy bits to the received bits and then decodes the result to the closest valid code-word. If the Hamming distance to the closest valid code-word is below certain threshold, the bit stream is considered acceptable (success), otherwise, the stream is dropped from consideration (failure). If the experiment is successful, the error pattern found in the decoding is used as the error pattern between the noisy bits at the two legitimate parties. This error pattern is used to distil the corresponding bit stream, as one of the final steps in the key distillation. It is obvious that the block length of the underlying binary code can be such that it covers a subset of the noisy bits, in the sense that noisy bits are first divided into segments of equal size and each segment undergoes a separate process. The entire procedure, from generating new noisy bits to the completion of distillation can be repeated until a key of an appropriate size is found. Once the resulting bit pattern has passed the verification phase, it will be ready to serve the purpose of generating the actual secure key. To make sure that this last step of generating the actual key benefits from the past history of key exchange between the legitimate parties, each of the two legitimate parties will run a state machine at its end. The state machine accepts the newly established (verified) bit stream as input. Noting all previous keys have been used as the input to this state machine at some earlier step in the history of key exchange, it can be concluded that the state of the machine will be dependent on the entire past history. Upon inputting the new key into the state machine, the corresponding output will be used as the actual key. The use of the state machine guarantees that, in order for the Wiretap unit to generate the same key, it should have been able to follow all the history of key exchange between legitimate parties, with a success in building its own copy of all prior keys without any errors. The rate of the binary code used in "forming a measure of reliability" should be determined according to the expected rate of discrepancy (error probability) between the sets of bits formed at the two legitimate parties. Embodiments include wherein the rate of the code is adaptive and is decided based on the expected error rate in different segments of the noisy bits under consideration (each segment will be the subject of a separate information distillation). The block lengths of the codes used in different segments can be also adaptive in terms of adapting to the length of each segment. In some cases, as will be discussed later, it will be preferable to partition the set of bits into segments of different lengths, possibly discard some of the segments, and have a separate information distillation for each of the remaining segments.

How can one generate the noisy sets of bits? An example for the generation of such noisy bits is based on broadcasting a sequence of bits over a wireless channel, which results in all parties, i.e., legitimate parties and Wiretap unit, receiving and being able to build a noisy copy of the broadcasted bits. The issue is that, in communications over the Internet, it is not possible to broadcast bits such that any possible recipient receives them with noise, such that the noise terms at different listening units are independent (or close to independent). Embodiments disclose a method to address this requirement.

Some embodiment rely on reciprocity of delay in sending packets over Internet, as a source of common randomness between legitimate nodes. In this case, the two legitimate parties, say node A and node B, perform the following operations for measurement of delay. node A sends a sequence of packets to node, node B forwards the received packets back to node A, node A measure the delay in the loop A→B→A. Likewise, node B (simultaneously) sends a sequence of packets to node A, node A forwards the received packets back to node B, node B measures the delay in the loop B→A→B. The two legitimate nodes measure the time that has taken each such packet to traverse their respective loops, and average these values to compute the travel time in their respective loops, namely A→B→A and B→A→B. Note that, in this manner, the two legitimate nodes measure the travel times in the paths A→B and B→A, resulting in measuring the same travel times at the two nodes. In some embodiments, the looping is repeated a few times, say 3-4 times, to make sure values measured at the two legitimate nodes are closer to each other. In the following, this is explained for the case of repeating the loop twice. In this case, for the procedure initiated by node A, the looping includes the paths A→B, B→A (one round), A→B, B→A (second round), and at this point the travel time of T(A→B)+T(B→A)+T(A→B)+T(B→A) is measured at node A. Likewise, for the procedure initiated by node B, the looping includes the paths B→A, A→B (one round), B→A, A→B (second round), and at this point the travel time of T(B→A)+T(A→B)+T(B→A)+T(A→B) is measured at node B. In some embodiments, the two nodes perform these operations of sending packets, forwarding, resending, forwarding, . . . and measuring travel times, simultaneously in order to make sure the network load and its variations over time has a lesser effect of the measured times. The above procedures are repeated multiple times, each resulting in a separate measurement of the travel times at the two nodes. These collections of measured travel times are used, independently at each node, to extract a sequence of bits at each node, relying on the property that the travel times measured by the two nodes will be close to each other. These two sequences of bits may be different in a small number of bit positions, an issue which will be handled by the procedures explained earlier for bit correction and subsequent verification. In some embodiments, the packets used for this purpose are UDP, to avoid additional delays imposed by various layers involved in networking. The technique disclosed above can be further enhanced by deploying a multi-level FEC structure for correcting the mismatches between the bits extracted at the two nodes. In this case, in a first level of error correction, one of the two nodes, say node A, sends a sequence of parities (e.g., generated using an LDPC code) to the other node, here node B. These first level parities are generated according to a subset of bits that have the highest chance of being the same at the two nodes. Then, the receiving node, here node B, uses the received parities to change its local copy of bit positions that, upon decoding of the underlying code, turn out to be different than the copy at node A. Once this first level of differences are adjusted, the sets of bit values can be separated into two subsets, say subsets A0 and A1 at node A and subsets B0 and B1 at node B. Due to the first stage adjustment, sets A0 and B0 will be the same, and likewise, sets A1 and B1 will be the same. Then, the same procedure of generating and transmitting parities will be repeated separately over subsets A0 with B0 and A1 with B1. This results in removing the differences between a second bit between node A and node B. This procedure can be continued in the same recursive/nested manner in order to extract more unified bit values.

Methods have been disclosed for the situation that the packets sent between nodes, to measure reciprocal time delays, do not have any content, other than, possibly, a simple index to show the order of each packet in its corresponding sequence. In another embodiment, the content of the packets are filled with random bits generated at the node acting as the master. Then, upon making sure the packets are divided into subsets at each node, and these subsets at the two nodes due to error removal are the same, the contents of the packets within each subset can be bit-by-bit XORED to create additional common information between the two nodes, to be mixed with the key components formed at each node. The operation XOR has the property that the order of the packets within subsets do not affect the outcome of their corresponding bit-by-bit addition. In general, the operation of XOR can be replaced with a variety of other mixing techniques with cumulative and associative property.

Another embodiment for creating an effect similar to broadcasting bits over a wireless broadcast channel is as follows. There is a source of common information in certain language (L1) available to all nodes. In other words, all parties have error free access to some content based on L1. There is a second language L2. It is possible to translate contents formed based on language L1 to language L2. Languages L1 and L2 have the property that the translation between them cannot be perfect (there is simply no notion of perfect translation). An example is someone sings a song in one language, say English, and another singer translates and sings the same song in another language, say French. Although the words used by the two singers have similar meanings, the two songs cannot be said to be the same, and one cannot even define the concept of "perfect" (error free) replication in such a process of translation. Another example is playing a musical instrument according to some musical notes. Two individuals may play the same musical instrument according to the same musical notes, but the resulting music cannot be considered to be exactly the same. In our model for key exchange, this analogy is equivalent to having a song from certain singer in English publicly available, then each party (legitimate parties, as well as, possibly, wiretap unit) have their own local singer singing the translated song in French. The local copies of the song played at each of the two legitimate parties will remain local to them, and will be used as the source of "noisy common randomness" between them. This creates an effect similar to that of broadcasting bits over a noisy wireless broadcast channel. In such a scenario, even if a wiretap unit has access to many more and significantly better singers, the wiretap unit will not be able to use these extra resources to improve the quality of its local copy, wherein "improve" in this context means something that is more similar to the local copies formed at the two legitimate parties-note that the similarities between the two copies formed at legitimate parties will serve as the main tool to establish a key between them. It does not matter how much the extracted key is similar to the actual content before various translations, what matters is that the two legitimate nodes can mutually reach to a unified key, which should be kept secret from eavesdropper (should be different from the copy extracted at the eavesdropper based on its local translation). In some embodiments, the language L1 is written text in the English language, and the language L2 is certain features in the waveform generated by reading the English text by a reader. In this embodiment, the key exchange starts by the server randomly selecting an English text (say a paragraph with certain number of words) from a large set of options available in a data bank—another example is based on randomly selecting certain number of words from an English dictionary. The procedure requires that the client seeking access read the text, and thereby generate a local copy of his/her speech signal (language L2). The server can build a dictionary for each of its clients based on the history of their key exchanges and use that dictionary to improve the quality of its local copy of the content translated to language L2. Note that the translated version in language L2 depends on the person reading the text and features of his/her sound, as a result, the server, by tuning its translation engine to adapt to the features of each client separately, can enhance the similarity between its local copy of the translated content (translated from L1 to L2) and the content that will be formed locally at the client side by reading the text, locally storing the sound, and using client's computer to (locally) process the recorded waveform to generate the corresponding (translated) content and storing the result (all processing and storage will be local to the client). If the server does not have access to enough data for a particular client to form a reliable adaptation rule, it can rely on other sources to create its local copy of the content in language L2, the main requirement is that the procedure and the data used for this purpose by the server should not be available to the wiretap unit (otherwise, wiretap unit can rely on the same resources and generate a local copy in L2 that is very similar to the local copy formed at the server). For example, the server can pick the data related to another client at random and use it to generate its local copy in language L2. It is also possible for the server to gather and use some relevant side-information for each client to be used in the translation process performed by the server (note that the server, unlike the client, does not access to the actual speech signal generated by the client through reading the selected text). Examples for such side-information include: "age", "gender", and "factors that determine the speaker accent such as place of birth". In this embodiment, language L2 can be the audio signal in time domain, or in frequency domain, or preferably features of voice that are extracted and used in speaker identification and/or voice recognition, such as cepstrum. The parsing of the translated content can be based on the structure of the underlying language. For example, parsing can be based on identifying and separating phonemes, and discarding of parsed segments can be based on the expected error rate in the corresponding segments. For example, the part corresponding to transitions between subsequent alphabets or phonemes forming a word can be discarded. The reason is that, these transitional parts depend on the content and flow at a word level, i.e., they depend on how phonemes are glued together to form a particular word. As a result, the signature vector for a given phoneme, in particular its beginning and end (that are affected more pronouncedly by the neighboring phonemes in the word) depend on the word that contains the phoneme, and consequently, it will be subject to a higher level of variation (noise). On the other hand, the translation at the server side is based on just artificially building the speech signal in L2 (as if the computer is reading the text) by gluing the phonemes extracted from previous readings by the same client, where the phonemes were extracted and collected in the process of reading a variety of other words containing the same phonemes, or words. In summary, this means, the middle parts of the signature vectors corresponding to each phoneme, or word, will provide a more reliable source of information for the purpose of translating the content to L2.

In another embodiment, the language L1 is a set of computing tasks, and Language L2 is the usage of resources in computer running each of these tasks as a function of time, and side-information is the features of the computer such as its CPU model, memory, network speed, etc.

In another embodiment, the language L1 is a shape, and language L2 is digitized X and Y coordinates of the pixels forming the shape. Text from L1 could be a pre-agreed content, such as a personal signature, or can be dynamically performed by client's real-time drawing of shapes selectively shown by the server on client's screen. The drawing platform can be the touchpad, or the touch screen available on the client's computer or handheld. In some embodiments real-time drawing of shapes (dynamic content and translation) applies. In this case, server, over time, will form a dictionary of small shapes converted from L1 to L2 by the specific client. This dictionary, the same as the dictionary used in the case of phonemes explained earlier, will help is giving the legitimate pair some advantage over a possible wiretap unit. The session consists of server showing some simple shapes, like English alphabets, on the client's screen and client will draw the shapes. Client's computer will locally convert the drawings into a vector of bits (translation into language L2), and the server will use its local dictionary to provide a best guess for the vector of bits formed as the translation proceeds at the client side.

Another example for languages L1 and L2 are the image of the client's face (language L1) and features of his/her face (language L2). These are features similar to the features used in face recognition, extracted from the image, for example distance between eyes, size of the mouth, form/size of the nose, form/size of ears, etc.

Another example for languages L1 and L2 are voice of the client (language L1) and features of his/her voice, such as features used in speaker recognition and/or speaker verification.

Another example for languages L1 and L2 are finger(s) of the client (language L1) and features of his/her fingers, such as features used in finger print authentication.

In some other embodiments, to generate the noisy bits, the client and the server (legitimate nodes), by possible help from one or more authentication servers, rely on establishing a long path through the Internet between the client and the server, e.g., a server offering a web-service, and sending long UDP packets, with short time intervals between packets, such that any party (including the legitimate intended recipient) who listens to these packets unavoidably experiences some packet loss. The packets received correctly are mixed to generate a key, and the indices of these packets are communicated to the other legitimate party such that the same operation can be performed at the other end, to reach to a unified key. Embed the information in the time that subsequent packets are received, wherein the (legitimate) transmitting node measures the travel time to the (legitimate) recipient and accordingly adjust the transmission time, such that the received time modulo some integer S represents the information of the coded symbol (an integer) at the receiver side. In this process, to provide the legitimate parties with some advantage with respect to any possible wire-tap unit, the procure is orchestrated by several legitimate helpers (called authentication servers). In this configuration, authentication servers collectively transmit the same information embedded in packets' receive times to both the client and the server, e.g., the web-service. The two legitimate units, by receiving the same information from multiple senders (authentication servers, or helpers), have the opportunity to selectively combine multiple received information relevant to the same data, and thereby improve the quality of their channels. The channel quality (in terms of channel noise) in this context will be the time jitter reflecting the deviation in time of the received packets vs. the correct (intended) time carrying the information. Authentication servers are assumed to have a secure link among themselves. Assuming NS authentication servers, this is realized by applying methods to all NS(NS−1) links that can be established between any pair of the NS authentication servers. The encryption key related to these pair-wise links are updated (refreshed) occasionally. This is achieved by replacing (refreshing/updating) the key corresponding to one or more of the oldest link(s) in each round of "key refreshing". This means, the pair-wise links are ordered (indexed) from 1 to NS(NS−1), and their corresponding key is updated in a round-robin fashion.

In all methods, including the embodiment based on embedding the information in packets' received times, the procedure generates an intermediate key (also called component key), which is then used by each of the legitimate parties to generate the actual key. This transformation from intermediate key (also called component key) to the actual key is performed locally within the corresponding party's machine, wherein the new intermediate key is entered into a state machine, and the output of the state machine is used as the actual key. In this manner, the actual key will depend on the entire past history of key establishment between legitimate parties, and the wire-tap unit needs to figure out the state of the underlying state machine, in addition to knowing the intermediate key, in order to be able to hijack the encryption key. The state machines in the two legitimate nodes are kept synchronized (same content) and can be reset once this synchronization is lost. In addition, the data exchanged over each secure channel can be used as an input to the state machine in order to make the key adaptive and changing over time (as a function of data being transmitted).

It should be added that various embodiments explained above can be enhanced by using a closed loop simultaneously (simultaneous with the process of translation) established through a phone or any other means of communications. Access to such a real-time closed loop connection enables the server to guide the process at the client side, and make it adaptive. The adaptation is meant to account for what has already occurred in the same session, with the aid of what is known as static information about the client and/or his computer/phone used in the connection, and/or other attributes related to the client such as his/her location, location history vs. time of the day to account for particular client's habits observed/recorded in previous sessions).

In all above embodiments, the procedure for information distillation and key verification will be conducted, in manners similar to what was explained earlier in the context of phonemes.

Two Factor Authentication: Consider a scenario that a client, using a computer C1, initiates a request to be authenticated by a server using a first authentication factor, say a password. Then, the server uses a second authentication factor by contacting the client using an alternative means of communications (other than link to the computer C1 that has initiated the authentication) e.g., sending a code through SMS that the client is required to enter into the computer C1. This process closes the loop between client and server using two different means of communications, with the expectation that it is very unlikely both these means of communications are compromised. The problem with such legacy two-factor authentication methods is that: To close the loop, client needs to interact with the computer C1 (e.g., needs to enter the code sent through SMS). Consequently, such legacy two factor authentication methods can be hijacked due to the need for the second factor to have a life-time that is long enough to allow the client to do his/her part (e.g., enter the code). Another shortcoming is that, due to their static nature, such legacy two factor authentication methods cannot be made adaptive. In other words, it is not possible to monitor/detect suspicious behaviors on the part of the assumed client in real-time, and guide the authentication session accordingly. It is desirable that the authentication session can adapt the details of the second authentication factor in real-time in order to reduce the chances of making the wrong decision while minimizing the load on the client that causes discomfort and increases the wait time. In summary, the goal of such an adaptive authentication technique is to "avoid refusing legitimate clients", and "avoid granting permission to illegitimate intruders". To solve these shortcomings of legacy two factor authentication methods, embodiments disclose a real-time two-factor authentication technique. In this disclosure, the second factor is designed such that the loop is closed and monitored in real-time, enabling the server to adjust the second authentication factor in real-time, without the need for the client to be directly involved. In one embodiment, the server calls the phone number of the client, and asks the client to put his/her phone on the speaker phone and bring it close to the computer used to initiate the authentication. The phone call continues by playing some music, or instructions regarding what the client needs to do for the authentication session to proceed. The sound played on the phone is a sideshow, and its main goal is to make the experience more pleasant or easier for the client. The main goal is as follows. At the same time of playing the sound, server encodes a sequence of bits into a signal which is mixed at the server side with the sound played on the client's phone. This information carrying signal can be formed by modulating phase or frequency of a sinusoidal signal which falls within the frequency range supported by the phone, e.g., using Frequency Shift Keying Modulation. The sound played by the phone at the client's side will be heard by its computer, and the computer will relay the received sound back to the server. This closes the loop, wherein server continues to monitor the sound signal received back from the client, and (with a small delay) extracts the sequence of bits originally sent to the client's computer. If the bits match, and delay in traversing the loop (including the behavior of delay vs. time) falls within a normal range (is not suspicious), then the authentication is complete. It is obvious that the link can be also closed using a wired connection between client's second device (here, his/her phone) and his/her computer, or wirelessly using Bluetooth or NFC. In the following, "forward channel" means "server to client's phone", and "return channel" means "speakerphone to client's computer, and then to the server". If the delay, or the behavior of the delay vs. time, in receiving the bits through the return channel as compared to the timing used in the original transmission over the forward channel is suspicious, then the rest of the authentication session will be adapted to account for these suspicious observations. Examples of adaptation include "adjusting the length of the session", and "decision to include other authentication factors, such as face recognition and/or bio-metric signatures". In summary, the adaptation will be guided by the server to make sure authentication procedure is performed with high accuracy, and with minimal load or wait-time on the client part. As mentioned, in case that some suspicious anomaly is detected by the server in listening to the return channel, then server can challenge the client by extending the duration of transmitting/monitoring the second factor authentication signal, or ask supplementary questions that are recoded at the time client has registered for the service. Auxiliary information, such as client's location at the time of authentication and his history of movement during the day, and/or features of his/her computer such as its serial number, can be used by the server as side-information to improve accuracy of authentication process while avoiding unnecessarily lengthening the process which would cause discomfort for the client. In another embodiment, to make sure that the involvement of the client in the authentication process is not created (faked) by computer simulation, the server asks the client to actively patriciate in the process in a manner that is decided on the spot by the server. In some embodiments relying on face recognition as part of the authentication procedure, the client is asked (in real time) by the server to move his/her head in certain direction (direction of movement is not known apriori and is decided on the spot by the server). For example, the server can ask the client to move his head, following a pseudo-random set of bits generated anew at the server, to the left (for bit zero) and to the right (for bit one). These real time interactions by the client are detected as the server and, through measuring the delay associated with the client's reaction to the instructions provided by the server, the authenticity of the client is verified.

Distributed Mutual Authentication: In some embodiments, a method includes authenticating a "client" in his/her attempt to access a "service platform" hosted on the Internet. An example authenticating a person (client) who wants to access his/her bank account for e-banking (in this example, bank is the "service platform" hosted on the Internet). In one embodiment, the authentication procedure is performed directly between the "client" and the "service platform", while in another embodiment, the procedure is managed by external unit(s) acting as helpers, called "authentication server(s)". This means, the mutual authentication between "client" and "service platform" is orchestrated/managed by the "authentication server(s)". The rest of this disclosure will be explained in terms of the latter, i.e., the multiple party setup. In this case, the authentication procedure involves at least three parties, a "client", a "service platform", and an "authentication server". Authentication is mutual in the sense that: (1) the "client" seeking the web-service is authenticated to the "service platform" and to the "authentication server", (2) the "service platform" is authenticated to the "client" and to the "authentication server", and (3) the "authentication server" is authenticated to the "service platform" and to the "client". To reduce the chances that the "authentication server" is compromised, in another embodiment, the role played by the "authentication server" is distributed among several separate "authentication servers". In this scenario, "each authentication server", the "client" and the "service platform", collectively participate in the authentication process, wherein each of these units presents a piece of information relevant to the authentication task at hand, and the authentication task concludes successfully (all parties are mutually authenticated) if these various pieces of information fit together (collectively meet certain consistency condition).

In an embodiment, the pieces of information distributed among nodes are formed, using linear binary codes, as follows:

Assume there are M nodes, including the "client", the "service platform" and M−2 "authentication servers". There is a full-rank binary matrix G of size K×N, with N=L.M, where L either divides K, i.e., K=L.B1 for some integers B1, or K divided L, i.e., L=K.B2 for some integer B2 and L is selected according to the level of security desired. The value $2^{(-L)}$ determines the chances that an adversary can impersonate one of the legitimate parties relying on a random guess. The matrix G will be used as the generator matrix of a binary code. Matrix G is divided into M segments, each of size K×A (see FIG. 11). Each of the legitimate nodes has (locally) stored one segment of the matrix G. Segments of G are denoted by SG(i), i=1,2,3, . . . , M, corresponding to nodes 1,2,3, . . . M. There is a parity check matrix H of size (N−K)×N, associated with the generator matrix G, such that G.Ht=(0 mod 2) where Ht is the transpose of H. Matrix H is also divided among the legitimate nodes. A valid code-word CC satisfies: H.CCt=(0 mod 2) which are the parity check equations associated with the binary code. Segments of H are denoted by SH(i), i=1,2,3, . . . , M. Matrix G is divided among nodes column-wise (each SG(i), i=1,2,3, . . . , M generates a segment of the code-word of size N), and matrix H is divided among the M nodes row-wise (each row of H of size N generates one parity). Matrix H is divided row-wise into M segments, SH(i), i=1,2,3, . . . , M, each a matrix of size Q×N, where (N−K)=Q.M.

Figure 11:
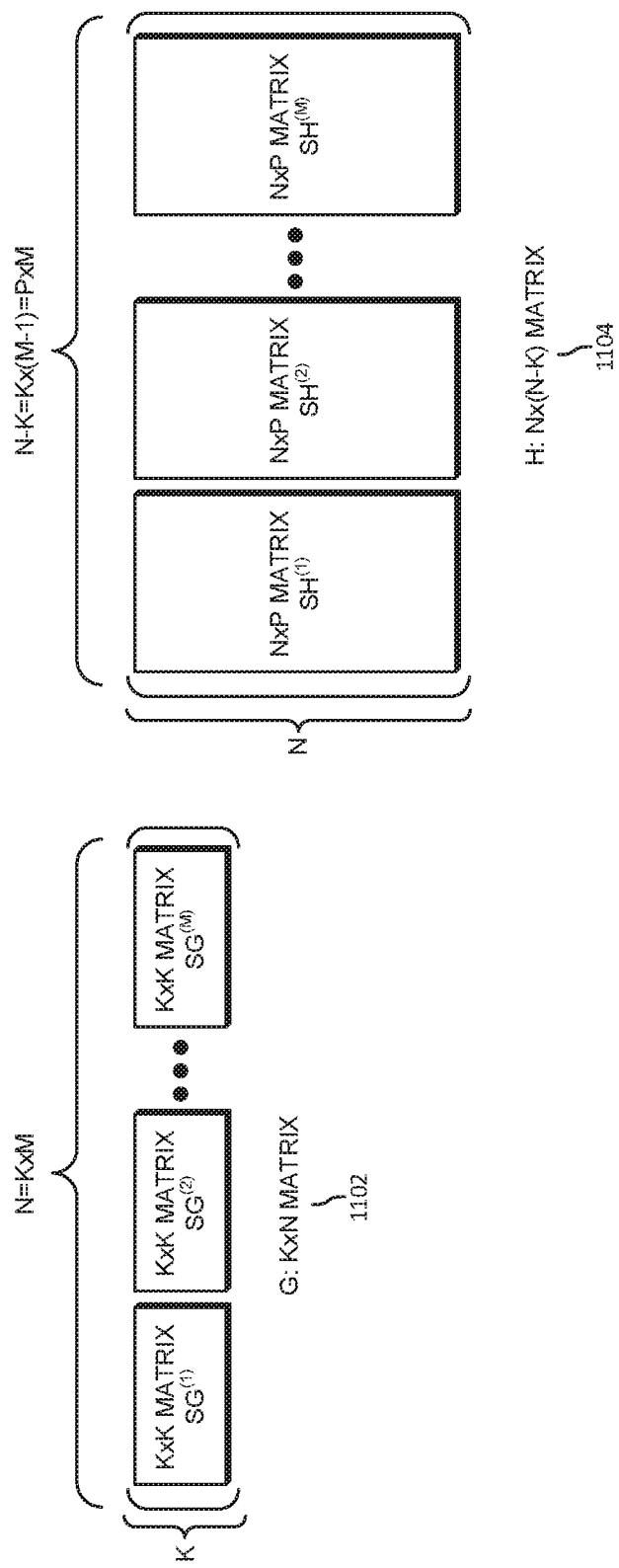
FIG. 11 illustrates exemplary matrices in accordance with one or more embodiment.

Referring to FIG. 11, G and H matrices are shown as matrix 1102 and matrix 1104. In some embodiments, the segments SH(i), i=1,2,3, . . . , M are stored (locally) at to nodes 1,2,3, . . . M, respectively. In summary, each of the legitimate nodes has access to one segment of G and one segment of H. For example, N=200, K=40, N−K=160, M=5, L=40, Q=160/5=32.

In some embodiments, K=L, and the matrices SH(i), i=1,2,3, . . . , M are appended with K−Q zero rows to turn them into K×N matrices.

If one of the nodes, say node A, wants to authenticate the other M−1 nodes. nodes A generates a binary vector V of size K with i.i.d components and sends this vector to the other M−1 nodes. Let us assume the node A is indexed by 1, and the rest of the nodes are indexed by 2,3, . . . M. Each of the M−1 nodes (other than A) use their segment of G, namely SG(i) for the i'th node, i=2,3, . . . , M, to generate a segment of a code-word by computing C(i)=V×SG(i), for i=2,3, . . . , M. Consequently, each C(i) is a binary row vector of size K. Note that, as the parameters N,K,M satisfy the relationship N=K×M, if an intruder (wiretap) can access M−1 of the C(i)'s, say C(i) for i=2,3, . . . , M, these segments, once concatenated as segments of a code-word to be validated, will be a row vector of size K×(M−1)=N−K with N−K bits of information, i.e., its information content is equal to its length, and it does not disclose any useful information about the missing segment of K bits. This is due to the fact that SG(i), i=2,3, . . . , M are not disclosed. As a result, access to the corresponding K×(M−1)=N−K bits will not disclose any useful information to any possible wiretap unit listening to the exchange of information. In summary, even if a wiretap unit manages to access up to M−1 segments of a code-word (while missing one segment), it still faces the same level of difficulty to guess the remaining (missing) K bits, i.e., chances of success in a guess is $2^{(-L)}$. On the other hand, node A, upon receiving these K×(M−1)=N−K bits, can generate the remaining K bits (the missing segment) by using its own local segment of G, namely C(1)

=V×SG(1), concatenate it with the K×(M−1)=N−K bits generated by the other nodes, and the resulting vector of size N (row vector), say CC, will be a complete/valid code-word. Then, node A will use its segment of the H matrix, say SH(1), to compute P(1)=SH(1)×CCt and in this case, the result will be zero if all the other M−1 parties are legitimate (have had access to a valid segment of G). The role of node A in the procedure explained above can sweep through all nodes, and at the end, each node has authenticated every other node.

Auxiliary techniques to further enhance the benefits due to the distributed nature of the above authentication infrastructure. In one such auxiliary technique, matrices SG(i), i=1,2,3, . . . , M and SH(i), i=1,2,3, . . . , M, allocated to each node are updated (changed/refreshed) over time. These changes require some exchange of information among nodes. Such an exchange of information, which is kept at minimum, is (preferably) performed using a secure link. This means, the process of refreshing (updating) G and H, and their segments allocated to different nodes, will be performed once the authentication phase is completed, and subsequently, the units have been able to establish a secure link among all nodes (each node is connected to every other node through a secure channel with its own encryption key). To further reduce the chances of a successful intrusion, methods herein rely on distributed computation to update SH(i), i=1,2,3, . . . , M matrices, once SG(i), i=1,2,3, . . . , M matrices are updated.

In one embodiment, the change in the overall generator matrix G is realized by replacing G with G×A, where A is an N×N matrix, and/or by B×G where B is a K×K matrix. In the following, the focus will be on changing G by using G×A. For the pair (G,H), the modified pair will be (G×A, H×inv($A^t$)), where $A^t$ is the transpose of A. To enable sequential propagation of changes, matrix A is selected to be a block matrix. The sub-blocks Aαα are identity matrices, plus some random K×K matrices in non-diagonal Aαγ positions. In another embodiment, A is triangular. In one embodiment, matrix A is formed as a sparse collection of K×K blocks placed within an N×N identify matrix. If, for example, the sub-blocks Aα1 are full rank K×K random matrices, then the structure of the matrix A will result in parties indexed by 2,3, . . . M, imposing a change in SG(1). In a one embodiment, matrix A is formed as a single K×K block placed at block position Aαγ within an N×N identify matrix. In another embodiment, matrix A is formed as a block diagonal matrix with K×K blocks placed along its main diagonal. In this case, the changes are local, i.e., changes are maintained within each party. In one embodiment, block matrices on the main diagonal which define the local changes (matrix A defines the changes for the party indexed by a) are provided centrally by one of the authentication servers selected at random in different authentication sessions.

To perform the refreshing procedure, one of the authentication servers (called master), selected randomly for each transaction (authentication session), orchestrates the task of refreshing G/H, and propagating the changes to all nodes. The changes are propagated by the master to the rest of the units on a need-to-know basis (means, each unit will receive the minimum information required to adjust its local copy of SG and SH). The master orders (assigns an index to) the other nodes in a random manner, with its own node being the first one in the sequence. In one embodiment, matrix A is selected to be composed of a set of K×K matrices (there will be $M^2$ such matrices filling the matrix A) on its main diagonal (there will be M such matrices on the main diagonal), and another M−1 of K×K matrices on the diagonal below the main one. In such a block diagonal structure, each client will refresh its own SG and imposes a change on the SG of its neighboring node (neighboring is meant to be in the sense of indices following the structure of matrix A).

Several other techniques to change the G matrix with minimum propagation of information. As mentioned earlier, some embodiments are based on multiplying the G matrix from the left by a K×K matrix B, and/or from the right by an N×N matrix A. The crucial point is that if a matrix, say matrix A, is generated at random, to be multiplied with SG from left and/or from the right, the content of A can be disclosed without disclosing any information about the result of the multiplication, namely A×SG or SG×A. Embodiments include forming N×N matrices composed of an identity matrix, with some of its K×K blocks (segmented according to the same partitioning that separates the nodes in their shares, SG's, from the overall G matrix) replaced with independent K×K matrices A1,A2, . . . .

Another embodiment involves changing some of the rows of matrix G (each row corresponds to one generator vector) with new binary vectors with independent and identically distributed (i.i.d.) components. Again, this adjustment in G is orchestrated by one of the nodes acting as the master. The master is selected at random in each session, or is selected according to some pre-arranged ordering of the nodes, such that, after a few authentication sessions, all nodes have acted as the master at some point in time, and consequently, their corresponding SG is modified. In another embodiment, in a session, there will be one master and one or more slaves (a subset of the remaining nodes), which will get involved in refreshing the SG and SH matrices. In particular, if there is a single slave, then the changes in each session of refreshing SG's and SH's will be limited to the exchange of information between two nodes only. By sweeping across different pairs of nodes in successive refreshing sessions, the entire system of distributed trust verification (distributed authentication) will be eventually refreshed. In some embodiments, the changes required in refreshing the matrices SG's and SH's are performed over secure links after the authentication is completed, and subsequently a secure key can be established for each link. In other words, the exchange of information required in the refreshing phase is communicated over secure channels. In another embodiment, the refreshing tasks for the SG and SH matrices of the client (e.g., the individual seeking to connect to a bank to do some e-banking) and that of the web-service platform (e.g., the bank providing the e-banking service) are performed regularly and the other nodes (authentication servers) are refreshed at a lower rate.

In some embodiments, the redundancy in matrices involved in the above operations is more than N/2, where N is block length.

In some embodiments, all matrices explained above are composed of elements modulo some integer KK and the multiplication is performed modulo KK (instead of binary values and mod 2 operation explained in the embodiment described above).

In another embodiment, the authentication is further enhanced by relying on the phoneme dictionary built for the purpose of encryption explained earlier. In another embodiment, authentication is further enhanced by auxiliary factors, which are deployed on a selective basis. Examples of such auxiliary factors are: (1) closed loop two-factor authentication mentioned earlier, (2) the features of the computer used by the client to access the web-service, (3) face recognition, (4) location information in conjunction with building a data base for the past locations of the client, as well as his/her latest movements tracked using his/her cell phone (and/or other devices associated with that particular client that support location based services), (5) biometric signatures such as finger print, (6) checking of the 411 directory to correspond the name with the phone number.

In another embodiment, the very first time of authentication is performed as follows: an individual gets to web-service site (which is directed to one of the authentication servers, called primary server), creates an account, picks a password, and provides his phone number. Next, a primary server checks 411 on-line directory for the phone number and name, cross checking name/address/phone number with the information entered on the site, and then automatically calls the number. Next, the authentication code (generated randomly by the primary server) will be mixed with the sound and played such that primary server can figure out the phone that is answering the call and the computer that is used for creation of the account are close to each other (in the same room). Primary server site then knows the person is really who he/she claims to be, and the account is created. In addition, location of the computer can be checked vs. the address at 411 database. One can think of this step as the step that is currently done through sending an SMS to the person's cell phone, with a number (authentication code) that the person needs to enter into the computer to pass the security check (as second authentication factor). In some embodiments, the phone number can be a cell phone number, or a home phone number (enabling 411 search), and the SMS part is replaced with the coded sound played through the call (sound activated authentication). The closed loop and real-time nature of the disclosed two-factor authentication technique solves one of the known problems with using SMS explained next. As currently the process of entering the authentication code sent through SMS into the computer is done manually and this has an unavoidable delay, it forces the organizations using the SMS for the purpose of two-factor authentication to give the SMS activation code a reasonable life-time (SMS code cannot expire too quickly, as the person using it needs to enter it manually and this takes time). During this fairly long life-time, the SMS can potentially be hijacked by an outsider (who intercepts the SMS and abuses it to impersonate the legitimate person). In the methods disclosed here, the link between the SMS (here, it would be the coded sound played during the authenticating call) and the primary server detecting it (and reacting to it) would be immediate (real time), making it much harder that an intruder could highjack it. The above disclosed method for sound activated authentication entails encoding a message in the sound signal, which could rely, for example, on sending one or more sinusoidal signal(s) within the frequency range of the phone modulating some information bits using modulation techniques used in data communications, including QAM, BPAK, FSK, OFDM, and their differential versions, plus some forward error correction. The important point is that the data, after being received by the client's computer, will be decoded (retrieved) and looped back to the server to confirm the loop is closed through the combination of the legitimate phone and legitimate computer. In another embodiment, once the authentication is established, the server continues sending information to the client, but this part of the transmitted information will not be looped back. This part of the information will be used by the client to generate or help in generating a session encryption key, for example, using some form of hash function plus the state machine explained in the context of other embodiments for the purpose of mixing the new key-related information with previous session keys, as well as data that has been securely communicated in the past between that client and the server.

In one embodiment, the role of sound signal as a means for carrying information between client's phone and his/her computer is replaced by other means of connecting a phone to a computer, preferably using a wired connection (such as a USB cable) or NFC.

In another embodiment, the server, upon detection and confirmation of real-time closed loop operation, plus other auxiliary means of authentication mentioned earlier such as face recognition with real-time instructions to the client for moving his/her head and confirming the client is really responding to such instructions in real-time, the server sends a sequence of UDP packets with random data (payload) to the client's phone using cellular network, such as LTE. These UDP packets are time stamped for their receive times, and a subset of UDP packets that are received with less delay (indicating that wireless transmission of those UDP packets has been successful in the first attempt) are mixed to generate or help in the generation/renewal of an encryption key. The underlying tasks (time stamping the UDP packets, selection of a subset of UDP packets based on their receive times, and subsequent mixing of the selected subset of UDP packets) can be performed in the client's cell, and/or divided between the client's cell and his/her computer. In such an embodiment, client's phone preferably relies of a wired connection to the client's computer. In a one embodiment, UDP packets are immediately passed to the computer upon being received by the client's phone and all the above tasks (i.e., time stamping the UDP packets, selection of a subset of UDP packets based on their receive times, and subsequent mixing of the selected subset of UDP packets) are performed by the client's computer.

One of skill in the art will appreciate that various methods herein for authentication and/or encryption can be combined with each other, preferably forming an adaptive system which decides for "how to combine the different techniques" depending on the circumstances, such that security is maintained, and at the same time, client is exposed to minimal work and discomfort.

The process of initial authentication can be repeated in follow-up access to the web-service platform, in case something unusual is detected—for example, when the location of the user, or the computer of the user, etc., does not match relevant logs related to that person recorded in previous successful authentication sessions which is kept in a database at the primary server site, or reliability of detected bio-metric signatures (such as face/voice/finger print) is not adequate. Embodiments include the use of additional checks in a hierarchy of subsequent steps, activating more advanced authentication engines (e.g., using finger print scan, or face recognition, etc.) if the earlier steps turn out to be insufficient. This process is optimized using a statistical decision making strategy, to balance the comfort of the user versus the accuracy needed, and decide for more involved/complex/advanced authentication procedures only if it is necessary, and select the authentication steps (complementary methods of authentication and their order of activation) based on circumstances, i.e., based on past history of relevant data and current situation at hand when a client aims to access the site anew.

Secure key agreement based on channel noise: Some embodiments rely on transmission medium to establish common randomness between legitimate nodes. Common randomness means the two nodes have access to two separate observations, which are dependent on each other. An example is receiving a sequence of bits broadcasted by a satellite, wherein the broadcasted bits are detected at legitimate nodes (subject to independent noise terms), and possibly at eavesdropping nodes, but again, with independent noise terms for all nodes. The definition of channel noise in the context embodiments encompasses a broader range as compared to what is commonly understood at additive noise in legacy transmission channels. Two examples of channel noise used in methods are as follows: Channel phase in transmission of a Radio Frequency (RF) carrier. In this case, any party listening to a carrier sent by a transmitting node can detect a phase for its corresponding channel, but the phase values will be different and depend on many factors including the details of multi-path propagation of RF signal to each receiving antenna. In some embodiments, delay jitter in the transmission of data packets (preferably UDP packets) in the Internet. In this scenario, any node receiving (legitimately, or through eavesdropping) such transmitted packets can record a receive time stamp for each packet, and this time stamp captures the actual delay between the transmitting and receiving nodes, plus delay jitter (noise) caused, for example, by variations in the network load, switching delays, and variation in software-based delays caused by resource sharing that is common in software domain.

The notion of channel noise, in conjunction with channel reciprocity, provides the basis for establishing common randomness in various embodiments. In such cases, it is desirable that Level of noise is controllable and falls right at the threshold that the error correcting codes used for key consolidation can function, but channel noise should not fall significantly below this threshold (ideally, eavesdropping should be as hard as possible). Level of noise for legitimate nodes (in measuring the reciprocal quantity in the channel, e.g., phase of RF carrier, or travel time in the Internet) is lower (as much as possible) as compared to the noise encountered in eavesdropping.

It desirable that the above features are added to, and/or are enhanced in, the channels used in embodiments. In the following, the embodiment for adding/enhancing these features will be explained in the context of packet transmission over the Internet. Application to other channels, such as phase in an RF channel between nodes A and B, or error in looping bits in a wireless link will be clear to experts in the related fields. In this category of embodiments, considering legitimate nodes A and B, the channel with reciprocity property is constituted in one of the following forms:

Channel A→B and channel B→A

Channel A→B→A and Channel B→A→B (channels created by looping between nodes)

Channel A→B→A→B→A and Channel B→A→B→A→B (channels created by twice looping between nodes), or, likewise, channels created by more than twice looping between the nodes.

Next, this embodiment is explained in conjunction with sending UDP packets overt the Internet, and for the channel formation types 2 and 3 explained above. Generalization to the transmission medium, and other channel formation strategies will be clear to experts in the related fields.

The procedure, for channel formation type 2 explained above, starts by one of the legitimate nodes, say node A, sending a sequence of UDP packets to its legitimate counterpart, here node B. node B receives the packets and sends them back to node A. This allows node A to measure one realization for the travel time in the loop A→B→A for each packet sent though the loop. To realize the desired features explained earlier, node A adds an i.i.d. pseudo-random delay to each packet in the sequence of packets being sent, one UDP packet after the other, through the loop A→B→A. Likewise, replacing the role of node A with node B, node B sends a sequence of UDP packets (each packet with a pseudo-random delay) to node A, and node A sends the packets back to node B, closing the loop B→A→B. The key idea is that, from the perspective of any eavesdropping node, say node E, the pseudo-random delays inserted by legitimate nodes acts as an additional source of noise. In this case, noise is the jitter (random variations) in travel time of UDP packets in going through their corresponding loops. On the other hand, each legitimate node is aware of noise that has been intentionally added by the node and can remove its effect. As a conclusion, the variance of the noise (jitter) for the legitimate nodes can be controlled (by adjusting the variance of the pseudo-random delays generated at each legitimate node), and the variance will be larger for any potential eavesdropper as compared to that of the legitimate nodes. To further enhance the outcome, in a one embodiment, the loop between legitimate nodes includes two or more independent communication links. An example is based on closing the loop by including a link through a cellular network (such as LTE). In this case, node A (assumed to be the server in the cloud) sends the sequence of UDP packets to client's cell phone (client is node B), and client's cell phone passes the packets to client's computer, and client's computer closes the loop by sending the packets back to node A through its Internet connection. Using notations "B(cell)" and "B(comp)" to specify client's cell phone and his/her computer, the loops are as follows: A→B(cell)→B(comp)→A and B(cell)→B(comp)→A→B (cell) (or B(comp)→A→B(cell)→B(comp). After gathering enough number of samples for the travel time through these loops, the two parties can rely of reciprocity in travel times to reach to a set of common random bits (common randomness), which can be in turn used in key generation.

In another embodiment, nodes A and B, use a structure based on looing A→B→A and B→A→B for the purpose of transmitting bits randomly generated at one of the nodes, say node A, to its counterpart, here node B, and vice versa. Such bits can be used, upon error correction, as part of generating the key. The procure, initiated form node A, is as follows: node A sends a sequence of UDP packets to node B, and node B, upon receiving each packet, adjusts its transmission time (in the process of relaying the packet back to node A) according to the value of one or more randomly generated bits (bits generated at node B). The perturbation in the transmission time of each packet results in a change in the time instance that the corresponding packet is received back at node A. node A detects the time change, vs. the expected time of arrival, and from this measurement aims to extract the bits values embedded in the transmission time at node B. Preferably, this procedure is applied simultaneously in the two loops, i.e., A→B→A and B→A→B, in order to make eavesdropping more difficult. In this manner, the bits sent from each node to its counterpart can be extracted at the target node and are collectively used in key generation. In another embodiment, these two ideas of: "transmitting bits through looping", and "addition of jitter as noise through looping" are combined. The procedure is as follows: node A sends a sequence of packets to node B, node B adjusts the transmission time of each packet according to some data bits that node B aims to send to node A, and then, node A, upon receiving each packet (upon closing of the loop) adds some time jitter (intentional noise) to the time that the packet is resent to node B. Each packet is received for the second time at node B and node B, once again, adjusts the retransmission time of each such packet based on some information to be sent to node A, and the process continues by node A adding jitter, sending back to node B, node B embedding bits in the transmission time and sending the packets (for the third time) to node A, which will, once again add jitter and send to node B, and the process continues several rounds until enough bits are communicated from node B to node A.

The above embodiments can be combined in various ways, and such combinations will be clear to individuals skilled in relevant areas. In all cases, to enhance the performance (level of security), it is desirable that the loop is composed of two or more different transmission mechanisms. For example, it is desirable that the loop includes a wireless link using cellular networks such as LTE. Closing the loop through a wireless hop based on LTE, or other wireless technologies such as 3G, WiFi, etc., has three distinct benefits:

The wireless hop offers more delay, and higher packet error rates for UDP packets, which are two desirable features in some of the disclosed embodiments.

The wireless hop, relying on client's cell phone, reduces the chances that an eavesdropper with access to the Local Area Network of the client can successfully extract information about the content and/or timing of the UPD packets sent between the server and its associated client (node A and node B).

Relying on two or more independent transmission mechanisms in the loop reduces the possibility of eavesdropping as the eavesdropper typically needs to access all the underlying links in order to succeed.

The embodiments explained above for the transmission of bits through establishing a loop between legitimate nodes can be used for the establishment of the "modulo channel" and/or "semi-secure" channel mentioned in embodiments explained in earlier parts of this disclosure.

Secure key agreement based on information hiding/mixing: Another embodiment relates to secure key agreement between two legitimate parties by hiding the information that makes eavesdropping difficult.

Method 1: The main idea is that, if a full rank N×N matrix G (or H) is multiplied by an N×N matrix Z with a rank lesser than N, say of rank aN, a<1, then an eavesdropper observing G×Z (or Z×H) will not be able to guess the details of G (or H), although receiving $aN^2$ bits of information about the elements of G (or H). The eavesdropper still lacks $(1-a)N^2$ bits of information about the details of G (or H) and this ambiguity is spread over all elements of G (or H). Relying on this idea, the disclosed procedure for key agreement works as follows: Legitimate nodes A and B, each will locally generate an N×N matrix with i.i.d. (independent, identically distributed) binary elements, say G and H, respectively. One of the two nodes, or an external trusted node, generates a matrix Z or rank aN, a<1. This matrix can be generated by multiplying matrix X of size N×aN by matrix Y of size aN×N, where X and Y are matrices with i.i.d. binary elements. Then node A computes G×Z (an N×N matrix of rank aN) and sends it to node B, and node B computes Z×H (an N×N matrix of rank aN) and sends it to node A. node A, having G and receiving Z×H computes G×Z×H. node B, having H and receiving G×Z computes G×Z×H. The two nodes A and B now have access to two identical matrices of size N×N, of ranks aN, which will be used to extract a shared key.

Method 2: The procedure again relies on two full ranks binary matrices G and H locally stored at legitimate nodes A and B, respectively. G and H are locally generated with i.i.d. (independent, identically distributed) binary elements. There is a matrix Z constructed locally by one of the legitimate nodes or a trusted third node. Construction of matrix Z starts by generating an aN×aN (a<1) binary matrix, S, with i.i.d. binary elements. Then, by performing row and column operations the matrix S is converted into an N×N matrix. These operations start by placing the initial aN×aN matrix S in the upper left corner of an N×N matrix where zeros are added in empty locations to fill the N×N matrix in order to form an intermediate N×N matrix, I1. This means, N−aN zeros are appended to the rows and columns of S, and zeros are placed in the (N−aN)×(N−aN) matrix in the lower right hand corner of the N×N matrix, to form 11. Then, a linear combination of rows of I1 are formed and added to the lower half (starting with all zeros) of the intermediate matrix I1. The resulting matrix is still filled with zeros in the last (right hand side) N−aN columns. Then, column operations are performed over matrix I1 to fill the last (right hand side) N−aN columns. The final matrix I2 then undergoes random row permutations and random column permutations to generate a matrix I1. Then, the resulting matrix I3 is multiplied by two full rank matrices W and V to form the matrix P=W×I3×V. The matrix P is sent to the other node. Then, the two legitimate nodes A and B locally compute G×P and P×H, respectively, and each node send the result to its counterpart. The matrices G×P×H, computed at the two nodes, will be used to create the secret key.

In both methods 1 and 2 explained above, the two nodes then rely on some form of privacy amplification (same, deterministic, method is used at both ends) to reduce or remove the dependency among the elements of G×Z×H (method 1), or G×P×H (method 2). For example, the two nodes can agree of a method (same method is used at both ends) for extracting a full rank matrix from G×Z×H (method 1), or G×P×H (method 2). For method 1, this operation can be performed by selecting a specific set of aN basis (column indices) and perform elementary column operation (linear combinations of columns are added to another column) to create an N×aN matrix of rank aN over the selected columns. The key will be generated by concatenating the resulting vectors (each of size N) with a pre-agreed ordering of these vectors to generate a key of size $aN2$ bits. In another embodiment, to further enhance the secrecy, these vectors are XORED element by element to generate a vector of size N. For method 2, this exemplary operation can be performed by selecting a specific set of aN row indices and aN column indices and performing elementary row operation (linear combinations of rows are added to another row) and elementary column operation (linear combinations of columns are added to another column) to create an aN×aN matrix of rank aN over the selected rows/columns. The key will be generated by concatenating the resulting vectors (each of size aN) with a pre-agreed ordering of these vectors to generate a key of size $a2N2$ bits. In another embodiment, to further enhance the secrecy, these vectors are XORED element by element to generate a vector of size aN.

Generating common randomness through public discussions: Another class of embodiments is based on the idea that for certain quantities and certain combining rule, if two sample A and B, are combined as F(A,B), then the result, F(A,B), does not disclose any information that would enable an observer to separate A and B from F(A,B). This means, the operation is commutative.

A and B are i.i.d. binary matrices, and F(A,B)=A×B

A and B are i.i.d. binary matrices, and F(A,B)=A xor B (element wise xor)

A and B are bits and F(A,B)=A xor B

A and B are i.i.d. random variable with Gaussian PDF and F(A,B)=A+B

A and B are i.i.d. random variable and $F(A,B)=A \times B$

In some embodiments, the PDF of $F(A,B)$ is the same as that of the PDF of A and B. Examples for such random variables include:

A and B are i.i.d. random variable with Gaussian PDF and $F(A,B)=A+B$

A and B are i.i.d. bits, with equal probability for zero and one, and $F(A,B)=A$ xor $B$ There is a second commutative operation, $G(A,B)$, to be used in establishing the common randomness.

In this embodiment, two legitimate nodes L1 and L2, will establish a source of common randomness Consider a class of random variables with the above mentioned property. node L1 generates two i.i.d. samples of the random variable, A,X and sends $F(A,X)$ to L2. node L2 generates two i.i.d. samples of the random variable, B,Y and sends $F(B,Y)$ to L1. L1 and L2 rely on $G(A,B)$ as the common information, where G is an appropriate operation on A,B. For example, for the case that random variables are i.i.d. Gaussian, $G(A,B)=A \times B$. As another example, for the case that random variables are i.i.d. binary matrices, then $F(A,B)=A$ xor $B$ and $G(A,B)=A \times B$.

In this embodiment, the legitimate nodes repeat the above operations and establish a sequence of such random variables at L1 and L2. Note that, X and Y act as sources of noise (confusion) in the sequence of values $G(A,B)$ computed at L1, L2 and at any possible eavesdropper.

In some embodiments, the decision about the next symbols at each node (A,X at node L1 and B,Y at node L2) is based on what the corresponding node has received from the other legitimate party up to that point in time. Nodes L1 and L2 rely on quantization to extract bits from the information available at their ends. This operation is realized in a manner that similarity in values translates into similarity between the corresponding bit streams (small Hamming distance). Then, the two nodes rely on error correction coding to reach to a common key at the two ends (key consolidation). The application of error correcting codes for the purpose of key consolidation can be, in one embodiment, the error correcting code is deployed as follows: One of the two nodes, say L1, selects a valid code-word from a code C, adds it bit-wise to the information extracted at L1 (masking the bit stream) and sends the resulting bit stream to node L2. node L2 then adds the received bit stream to its own extracted bit stream and then finds the closest code-word of the code C to the outcome. This code-word captures the error between bit streams extracted at the two nodes.

In another embodiment, the error correcting code is deployed as follows: One of the two nodes, say L1, generates a set of parity bits (e.g., using an LDPC code) for the bits extracted at L1 and sends the parities (at once, or gradually in a manner reminiscent of legacy HARQ) to node L2. node L2 then uses the parities to identify and adjust the bit positions within its own stream of extracted bits (adjusts the differences such that the bit streams at L1 and L2 become the same).

In another embodiment, each of the two nodes L1 and L2 embeds some redundancy in the sequence of random variables generated at their end. This redundancy will be exploited by the other node to reduce the level of noise in the sequence of G values formed at their ends. In one embodiment, embedded redundancy is generated by a triangular generator matrix which results in a Markov property for their corresponding sequence of symbols. This property will enable each of the two legitimate nodes to rely on past received symbols (up to the current time) to decide for the next symbol, in a manner that benefits the other legitimate party and creates most confusion for any eavesdropper.

Next another embodiment is based on looping between legitimate nodes is disclosed.

One of the two legitimate nodes, say node A, sends a sequence of UDP packets to its counterpart, here node B. The time gaps between transmission times of the successive UDP packets is non-uniform (generated by a pseudo-random number generator at node A). node B, upon receiving each of these packets will relay them back to node A, upon embedding a bit of information in the "wait time" of each packet will send the packets back to node A. The "wait time" is the time that the packet is kept at node B before being forwarded to node A. The "wait time" is a pseudo-random variable taking values in the range of [0 to T0] for sending zero and in the range of [T0-FD1 to T0-FD1+D2] for sending one. The values of T0, D1 and D2 and the probability distributions of the two pseudo-random variables are adjusted (in a static or dynamic manner) such that the overall transmission scheme (sending bits from node B to node A) operates right at the threshold of error correcting code used for key consolidation (correcting erroneous bits at node A), but not significantly higher than the threshold (to make eavesdropping more difficult). Note that D1 can be both positive and negative, depending on the target level of confusion (the smaller is D1, the higher will be confusion—harder will be extraction of bits). Detection algorithm at node A works as follows: Receive times of successive packets are recoded, then, node A, knowing the value of the pseudo-random quantity initially used to send each packet, will compute the time that it has taken for each packet to traverse the loop (called "packet travel time" hereafter). Then, the packet travel times are averaged. Then, the travel times that are below the average value are decoded to zero, and the travel times that are above the average value are decoded to one. In a variation of this embodiment, to make sure that the aforementioned detection rules performs well, the data bits to be sent from node B to node A are divided into subsets of size 2S (an even number) and then transmission is performed by constructing words composed of S zeros and S ones (equal number of zeros and ones). The assignment of data bits to each such word can be performed using a lookup table (because S is typically a small number), or using the permutation labeling disclosed. Again, to improve immunity to eavesdropping, the operation of sending bits from one of the legitimate nodes to its counterpart is performed by sending some bits from node A to node B and some bits from node B to node A, preferably at the same time. These two sets of bits will be mixed and used towards key generation. Two variations of this embodiment are disclosed, in one variation the delays created at the relay node for embedding data bits is cumulative, and in another variation, these delays are not cumulative. It will be clear for individuals expert in the area that the embodiments disclosed here can be used to create the "modulo channel" and/or the "semi-secure channel" disclosed in earlier embodiments. It is also desirable that the loop on the side of the client is obtained by mixing links relying on multiple separate transmission mechanisms. For example, the loop can be closed by using a cellular link from the server in the cloud to the client's cell phone, followed (concatenated) by a link from the client's cell phone to the client's computer (e.g., using USB cable, or NFC) and then followed (concatenated) with the link from the client's computer to the server in the cloud using a wired connection. According to some embodiments, role of the server in the cloud can be distributed among multiple servers, with a secure link between each pair of the servers over the cloud established using embodiments herein, wherein each server in the cloud separately establishes a loop to the client, and then the bits communicated through each of these loops will be mixed in the cloud to further enhance security.

According to some embodiments, secure data storage in the cloud. In many scenarios of data storage in the cloud, due to the sensitivity of information being stored, it is desirable that the data is stored in any encrypted form, with the feature that only the owner of the data can decrypt and access the actual data. To realize this feature, some embodiments relate to a set of servers in the cloud, divided into two categories of: active servers, and passive servers. Active servers have data processing capability, for example, can host a virtual machine. Examples are Microsoft Azure, or similar cloud services offered by Amazon and Google. The passive servers can only store data. Examples are Dropbox, Box, Google Drive, Microsoft Onedrive, etc. Note that active servers have the capability of storing data, in addition to the ability to perform various computing tasks and control of transmission strategies over the network, for example, establishing the UDP connections disclosed in embodiments and measuring the corresponding transmit/receive times, their associated delays, key consolidation, etc. The active servers are used in two forms: there are one of more primary active server, and one or more auxiliary active servers. The primary active servers orchestrate various tasks, and the auxiliary active servers are used by the active primary server(s) for the purpose of distributed processing. Active servers should be ideally located in different geographical locations, and rely on different firewall rules for the communications that involve all users, vs. communications that are related to one particular client. The combination of servers assist a client to securely store and retrieve data. Client side, preferably, include a computer and a cell phone that are linked to each other and are linked to the servers. The link for the cell phone is composed of a hop over a cellular network, such as LTE, and the link to the computer is typically a wired connection. The combination of client's devices can together close a loop to one or several of the servers. Active servers will establish a secure among link among each pair of servers, using other (auxiliary) embodiments. The servers are connected to the client's devices through secure links established using other (auxiliary) embodiments.

In addition to various keys (established using the methods herein) for the purpose of secure transmission, embodiments use two classes of keys for secure storage. One is for client-centric encryption of data to be stored, and one is for an additional level of encryption, called server-centric encryption, applied in the cloud to the data that has been already encrypted using client-centric encryption. The special features of client-based and server-based encryption keys are explained next. It should be added the basic encryption engines used in either of these encryption mechanisms can be a legacy encryption strategy, with the key that adheres to the features disclosed herein.

Client-Centric Encryption

One feature of the "Client-centric Encryption" is that neither the key, nor the decrypted data would ever leave client's trusted devices, such as client's computer, or even a hardware-based secure storage device, such as a smart card, that belong to the client. Client-centric Encryption key is constructed at the client's side by applying a transformation to a password or pass phrase selected and memorized by the client. This transformation is kept at the server side, and each time that the client needs to decrypt a piece of data, the encrypted data and the transformation are sent to the client (through a secure channel that is established using methods herein). Client's trusted devices, upon receiving the transformation, and having access to the client's password, will apply the transformation to the password to (internally) regenerate the Client-centric Encryption key. Upon using the regenerated key, and decrypting the data, the key as well as the transformation are erased from the client's device. Transformation is formed using pseudo-random numbers, and has the property that if client's password has C1 bits of information, and the transformation is constructed based on C2 pseudo-random i.i.d. bits—with equal probabilities for zero and one (i.e., it contains C2 bits of information), then the application of transformation to the client's passwords should have an information content as close as possible the maximum possible value of C1+C2. A simple example for the transformation is based on considering the transformation, as a sequence of C2 pseudo-random i.i.d. bits—with equal probabilities for zero and one, as the impulse response of a linear system, and forming the transformation by convolving the client's password (upon conversion to bits) with this impulse response. The length of the convolution output will be C1+C2−1, with i.i.d. bits (equal probabilities for zero and one). Another example for such a transformation is based on using a binary matrix of size N by C1, composed i.i.d. bits (equal probabilities for zero and one).

Sever-centric Encryption: Sever-centric Encryption is applied to the data that has been already encrypted, at the client's side, using Client-centric Encryption. The special feature of the "Server-centric Encryption" is that, it is distributed. This means, the corresponding key is divided into several sub-keys (each sub-key is of the same size as the original Sever-centric Encryption key) and each of these sub-keys is stored on a separate server in the cloud, such that each of the servers involved in such a distributed storage and distributed trust system stores only a single sub-key. Another special feature of the "Server-centric Encryption" is that, each such sub-key plays an equal role in security of Sever-centric Encryption, in the sense that the information content of all sub-keys, and that of the main key constructed by mixing all sub-keys, is the same. An example for constructing such a set of sub-keys, say N sub-keys of size K, is based on generating N binary vectors, each of size K, wherein different binary sub-key vectors are composed of i.i.d. bits (equal probabilities for zero and one). In this case, the main key is constructed by performing a bit-by-bit XOR operation on all sub-keys. Another useful characteristic of the Sever-centric Encryption is that, it can be updated (encryption key can be changed) without the need to involve the client.

Nested Encryption

Data that has been initially encrypted on the client's side using Client-centric Encryption is sent to one of the main active servers, and this server generates the sub-keys, used them to apply another level of encryption to the data, and storing the result in the cloud. Once this task is completed, the server locally stores one of the sub-keys, and send each of the remaining sub-keys to a separate server to be stored there. These auxiliary storage servers should ideally belong to different cloud service providers, such that if some of these servers are hacked, the main key cannot be reconstructed unless all sub-keys are available. To further enhance the difficulty of hacking, the sub-keys can be refreshed from time-to-time, such that if a hacker has managed to gain access to a subset of the sub-keys over time, the sub-keys have a relatively short life-span, requiring that the hacker needs to regain access to all sub-keys within a short time window (life-span of the sub-keys). An example for an embodiment to realize such a changing of sub-keys (in to shorten sub-keys' life-span) is explained next. One of the servers, selected at random, generates M i.i.d. binary vectors of the same length as the length of the sub-keys, such that these M vectors, when added bit-wise, result in a zero vector. This server, then keeps one of these vectors, to be added to its local sub-key (sub-key is replaced by this summation), and sends the rest M−1 binary vectors to M−1 other servers selected at random. Then, each server that has received such a binary vector will in turn add it to its local sub-key (sub-key is replaced by this summation). This procedure for updating of "Server-centric Encryption" does not necessitate decrypting the Server-centric Encryption. Variations based on first decrypting the Server-centric Encryption and then encrypting it anew, can be used as well to supplement the key refreshing procedure (enhance the security). Such a technique, based on first decrypting the Server-centric Encryption and then encrypting it anew, can be especially effective if it is applied each time that the data is accessed by the client, and for this purpose, the exiting Server-centric Encryption has been decrypted. Note that, in order to decrypt the Server-centric Encryption, all sub-keys should be gathered at the server that is storing the encrypted data. As a result, the old sub-keys need to be communicated over the Internet, and thereby will be exposed. Although any such communication will rely on the methods herein for encryption of the underling communication links—which itself is being added as an additional layer of security to the existing legacy encryption mechanism such as Transport Layer Security (TLS) and/or Hypertext Transfer Protocol Secure (HTTPS)—, in some embodiments, the entire "Server-centric Encryption" is redone from scratch upon any such exposure of sub-keys.

For the purpose of secure storage, it remains to address the following issue: How can the client's password be recovered in case it is lost or forgotten? To address this issue, methods herein rely on a second transformation that would convert the answers to some known questions into the client's password. Again, this transformation is stored in the cloud, and (possibly) on the client's trusted device as well. The questions and their answers are decided at the time that the client first time registers for the service, and during the same process, transformation is derived (computed) within the client's trusted device. An embodiment for the realization of such a transformation is based on using a linear transformation of the form of a matrix multiplication. The matrix can be constructed starting from a sparse matrix, wherein the minimum number of ones are placed in matrix entries that, when applied (sparse matrix is multiplied by the answers to the questions) would result in the password. Then, the zero entries of the matrix will be filled by i.i.d. bits, with some restriction on some of the bits, such that the result of the multiplication remains the same (continues to transform the answers to the password). Denting the binary vector composed of the answers to the questions by "A", the binary vector corresponding to the password by "P", and the sparse matrix by "S", this entails adding any binary matrix M, satisfying M×A=0, to S. Matrix M can be computed by starting from a matrix that includes all-zero vectors in columns corresponding to non-zero elements of the vector A, and zero elsewhere. The non-zeros binary elements are selected to be i.i.d. (with equal probability for zero and one). To create more confusion, the resulting matrix, i.e., M+S is multiplied from the left by another rectangular matrix with all entries filled with i.i.d. bits (with equal probability for zero and one). The final matrix computed in this manner continues transforming A to the client's password. Again, this transformation is also stored in the cloud, preferably in a distributed manner among involving multiple servers. The transformation is recalled from storage in rare situations that the password needs to be regenerated. Once the password is regenerated within the client's trusted device, part of the password will be displayed to the client in order to help the client to recover the actual password from his/her memory. In a one embodiment, transformation for the password recovery is divided into segment, each segment capable of recovering part of the password, wherein these segments are separately sent to the client, piece by piece, with each piece recovering a larger segment of the password, and the process continues only up to the point that the client can recall the forgotten password. This helps to minimize the exposure to possible eavesdroppers. It is also possible that, depending on the client's preference, the transformation is limited in its ability to recover the password, and for example, can only recover the first few characters in the password, to provide limited, but more secure, possibility for the client to be able to recover a forgotten password. In any event, each time that such a transformation is retrieved from the storage and used for password recovery, an entirely new transformation (recall that the transformation mapping the answers to the password is not unique) will be generated and stored.

Methods disclosed above for the purpose of secure storage are a suitable candidate for integration with distributed authentication disclosed in the earlier parts. Using distributed authentication enables all involved nodes (client's computer, client's cell, and various servers in the cloud) mutually authenticate each other.

Embodiments Related To Authentication

One set of embodiments is related to authentication. Thus, one or more embodiments provide a method for authentication including interacting with a user by a server in real time to collect verification data for authentication by requiring the user to take an action in real time; comparing a detected reaction by the user in response to the requirement to take the action to a predetermined metric; and determining based on the comparison to the predetermined metric, whether to authenticate the user.

Embodiments further provide that the interacting with the user by the server in real time to collect verification data for authentication by requiring the user to take the action in real time, further includes requiring the user to move in a direction s specified by the server in real-time; measuring a delay in the user's movement, and comparing, at the server, numerical attributes extracted from the users image recorded at the server in real time, such as numerical attributed used for face verification and identification, by related records captured from the same user in previous successful authentication attempts.

In some embodiments, the interacting with the user by the server in real time to collect verification data for authentication by requiring the user to take the action in real time, includes requiring the user to type certain text as specified by the server in real-time; measuring a delay in the user's speed in typing consecutive words; and comparing, at the server, the new typing speed measurements by records captured from the same user in previous successful authentication attempts.

In some embodiments, the interacting with the user by the server in real time to collect verification data for authentication by requiring the user to take the action in real time, includes requiring the user to pronounce words specified by the server in real-time; measuring a delay in the users speed in pronouncing consecutive words; and comparing, at the server, numerical attributes extracted from the pronounced words, such as numerical attributed used for speaker verification and identification, by related records captured from the same user in previous successful authentication attempts.

In some embodiments, the method includes determining, based on the comparison to the predetermined metric, to require the user to perform an additional authentication procedure.

In some embodiments, the additional authentication procedure includes one or more of identifying a location of the user as compared to a logged record of locations of the user; and identifying a serial number of a device of the user as compared to a logged serial number of one or more devices of the user.

In some embodiments, the interacting with the user by the server in real time to collect verification data for authentication by requiring the user to take an action in real time includes interacting with the user via a plurality of devices of the user, the plurality of devices interconnected and capable of a plurality of communication protocols, the requiring the user to take an action in real time including: establishing a loop from the server to the user via the plurality of devices of the user using the plurality of communication protocols; and measuring a time delay in traversing the loop to establish a location of the user.

In some embodiments, the interacting with the user by the server in real time to collect verification data for authentication by requiring the user to take an action in real time includes interacting with the user via a trusted device of the user, the trusted device of the user capable of a plurality of communication protocols, the requiring the user to take an action in real time including: establishing a loop from the server to the client via the trusted device of the user using the plurality of communication protocols; and measuring a time delay in traversing the loop to establish a location of the user.

In some embodiments, the plurality of devices of the user includes at least two devices of the user capable of an internet connection using at least two communication protocols, and the loop includes a cellular connection to one of the at least two devices of the user and to a second of the at least two devices of the user, followed by a connection to the server using a different communication protocol of the at least two communication protocols from the second of the at least two devices of user to the server.

Another embodiment includes a method for distributed, mutual authentication of a plurality of parties, includes locally storing, by each party a segment of a generator matrix, plus a segment of a parity check matrix, of a linear binary code, wherein, in each authentication session, one of the plurality of parties acts as a master; locally generating, by each party for the purpose of mutual authentication, as coordinated by the master, a segment of a code-word, randomly selected by the master, from the linear binary code; gathering a plurality of binary segments at the master through a secure communications channel; and concatenating, by the master, the plurality of segments received at the master; and verifying at the master whether a result of the concatenation of the plurality of segments results in a valid code-word.

In some embodiments, the method includes updating the plurality of segments periodically; or updating the plurality of segments upon completion of each authentication session.

In some embodiments, the updating occurs for different parties of the plurality of parties such that the updating propagates to encompass all the parties over time.

In some embodiments, the method includes coordinating, by the master, the updating to enable verification using respective segments of the plurality of segments.

In some embodiments, the method further includes alternating identification of the master between two or more client trusted devices, wherein each of the two or more client trusted devices are locally connected, the mutual authentication including authentication among the two or more client trusted devices being the plurality of parties. In some embodiments, the mutual authentication of the plurality of parties includes two or more of client's devices, and, in each authentication session, the two or more client's devices are locally connected to each other, and, the role of the master, in successive authentication sessions, alternates between the two or more client's trusted devices involved in the mutual authentication.

Embodiments Related to Secure Storage

Some embodiments relate to a method for secure data storage including constructing an encryption key from a plurality of key elements, the constructing including: distributing the plurality of key elements to a plurality of key maintenance entities, each of the plurality of key maintenance entities employing a plurality of independent safe guards for their respective key elements of the plurality of key elements; requiring access to the plurality of key elements to construct the encryption key; and encrypting data at a client node, the encrypting including: receiving a subset of the plurality of key elements via a twice-encrypted communications channel; and regenerating the encryption key at the client node; and after encrypting data, deleting the subset of the plurality of key elements received over the twice-encrypted communications channel, retaining any of the plurality of key elements previously stored at the client node; storing the encrypted data in one or more servers coupled to the client node; and decrypting the data at the client node, the decrypting including: receiving the subset of the plurality of key elements via the twice-encrypted communications channel; and regenerating the encryption key at the client node; and after decrypting the data, deleting the subset of the plurality of key elements received over the twice-encrypted communications channel, retaining any of the plurality of key elements previously stored at the client node.

In some embodiments, the method further includes storing at least one of the plurality of key elements in the one or more servers coupled to the client node; performing the encrypting and decrypting within a client trusted computing device; and storing at least one of the plurality of key elements within a client trusted storage device, the client trusted storage device locally connected to the client trusted computing device to enable temporary transfer during the encrypting and decrypting.

In some embodiments, the method includes recovering one or more passwords at the client node, wherein the plurality of key elements includes the one or more passwords for recovery by the client node, each of the one or more passwords associated with a password transformation stored in the one or more servers and a password recovery phrase stored in the client trusted storage device, the recovering one or more passwords further including: transmitting to a client trusted computing device the password transformation via the twice-encrypted communication channel; and receiving, at the client trusted computing device, the password recovery phrase from the client trusted storage device.

In some embodiments the password recovery phrase associated with each password is constructed from a plurality of answers to a plurality of questions determined during a registration process, wherein the plurality of questions are distributed among the one or more servers, and the plurality of answers are stored at the client trusted storage device.

In some embodiments the method includes encrypting the data using a second layer of encryption at the one or more servers prior to the storing the encrypted data.

In some embodiments, the encrypting the data using the second layer of encryption includes: generating a server-centric encryption key by bit-wise addition of a second plurality of key elements, each of the second plurality of key elements stored on a different server of the plurality of servers, and wherein each of the second plurality of key elements are required to reconstruct the server-centric encryption key.

In some embodiments, the method includes updating a subset of the second plurality of key elements independent of altering the server-centric encryption key.

In some embodiments, the method includes updating the second plurality of key elements by altering the server-centric encryption key and the second plurality of key elements.

In some embodiments, receiving a subset of the plurality of key elements via a twice-encrypted communications channel, further includes providing the twice-encrypted communications channel as an encryption layer supplementing an existing communications protocol, the encryption layer formed by constructing an encryption key from a first and a second dependent random variable, the first dependent random variable determined from a first measurement at the server, the second dependent random variable determined from a second measurement at the client node, each of the first and second measurements being a function of a stochastic procedure to enable measurements of probabilistic outcomes to a set of transmissions.

In some embodiments the stochastic procedure to enable measurements of probabilistic outcomes to a set of transmissions includes: sending a plurality of user datagram protocol packets between the server and the client node, and measuring a plurality of travel times between the server and the client node.

In some embodiments the plurality of travel times include travel times over a first loop from the server to the client node and to the server and a second loop from the client node to the server and to the client node, the plurality of travel times including delay measurements for the first loop and the second loop.

In some embodiments, the sending the plurality of user datagram protocol packets between the server and the client node, and measuring the plurality of travel times between the server and the client node, includes measuring the plurality of travel times from the server to the client trusted computing device, to a second client trusted computing device and back to the server.

In some embodiments, a communications channel from the server to the client node is prone to channel error.

In some embodiments, the sending the plurality of user datagram protocol packets between the server and the client node, and measuring the plurality of travel times between the server and the client node, includes: sending the user datagram protocol packets, each packet containing pseudo-random bits, over the communications channel prone to channel error; receiving, at the server, a plurality of indices of the user datagram protocol packets, the plurality of indices selected by the client node and identifying a subset of the user datagram protocol packets that were successfully received in a first transmission attempt; and generating a cryptographic key by using the identified subset of user datagram protocol packets.

In some embodiments, the generating the cryptographic key by using the identified subset of user datagram protocol packets includes: adding the subset of user datagram protocol packets via a bit-wise addition procedure.

Embodiments for Constructing an Encryption Key

Some embodiments are directed to a method for encrypting data communications, including performing a stochastic procedure between a plurality of nodes, including at least a first node and a second node; collecting a measured outcome of the random experiment, the measured outcome of the random experiment providing a dependent random variable pair; and constructing an encryption key based on one or more correlations identified between at least a first random variable and a second random variable, the first and second random variables forming the dependent random variable pair.

In one or more embodiments, the performing the stochastic procedure includes: transmitting a plurality of data packets between a first node and a second node via a user datagram protocol, the dependent random variable pair being a function of a first travel time between the first node and the second node and a second travel time between the second node and the first node.

In one or more embodiments, performing the stochastic procedure includes: measuring the first travel time and the second travel time as a first loop from the first node to produce the first random variable; and measuring the second travel time and the first travel time as a second loop from the second node to produce the second random variable.

In one or more embodiments, the method includes performing quantization by the first node and the second node to locally extract a bit-string component of each dependent random variable pair, the quantization providing a range of each random variable.

In one or more embodiments, the method includes routing the first loop and the second loop through one or more relay nodes; and measuring a plurality of routed first loops and second loops, each measured routed loop corresponding to a different route between the first node and the second node.

In one or more embodiments, the measuring the plurality of routed first loops and second loops includes transmitting a plurality of data packets from the first node to the second node, each of the plurality of data packets holding pseudo-random data; and receiving, by the first node, a plurality of indices identifying successfully received data packets of the plurality of data packets.

In one or more embodiments, the method includes mixing the identified successfully received data packets at the first node and the second node; generating the pair of dependent random variables as a function of the mixing the identified successfully received data packets; and generating an encryption key or a component of the encryption key by applying a result of the mixing.

In one or more embodiments, the mixing the identified successfully received data packets includes mixing based on a multi-input hash.

In one or more embodiments, the mixing the identified successfully received data packets includes: mixing based on bit-wise addition via an exclusive OR operation (XOR).

In one or more embodiments, the measuring the plurality of routed first loops and second loops includes transmitting a plurality of modulation symbols from the first node to the second node; receiving, by the first node, a plurality of indices identifying successfully received symbols of the plurality of symbols, the successfully received symbols being symbols received with a predetermined reliability; and determining the dependent random variable pair based on each symbol in the selected subset of modulated symbols.

In one or more embodiments, the plurality of modulation symbols are quadrature phase shift keying (QPSK) symbols.

In one or more embodiments, the method includes performing quantization by the first node and the second node to locally extract a bit-string component of each dependent random variable pair, the quantization providing a range of each random variable.

In one or more embodiments, the performing quantization further includes applying recursive Gray labeling as a bit-string associated with each quantization partition; and error-correction coding to correct for mismatches between bit-string components of each dependent random variable pair.

In one or more embodiments, the error-correction coding further includes repeating until a reliability criterion is met to identify a reliable plurality of pairs of binary vectors; performing concatenating at each node one or more local components of a plurality of bit-string pairs to provide a pair of binary vectors, including a first node vector and a paired dependent binary vector at the second node; adding a randomly selected code-word from an error-correction code to the first node vector to mask a plurality of bit values; receiving from the first node the masked binary vector at the second node; adding at the second node the received masked binary vector to the paired dependent binary vector at the second node; decoding at the second node a result of each addition of the randomly selected code word; selecting at the second node, at least one binary vector pair based on a hamming distance to a closest code-word, the hamming distance being less than a threshold as a measure of reliability; adding an error vector at the second node, the error vector obtained by decoding the error-correction code to flip one or more bits and reduce a mismatch with the first node binary vector; and notifying by the second node of a plurality of indices indicative of the reliable plurality of pairs of binary vectors; and applying the reliable plurality of pairs of binary vectors as inputs of a mixing operation, such as bit-wise addition, exclusive OR(XOR), for generating a cryptographic key.

In one or more embodiments, the error-correction coding further includes concatenating one or more local components of each node a plurality of bit-string pairs to generate at least a pair of binary vectors, a first node vector and a paired dependent binary second node vector; identifying by the first node, the first node vector as a systematic portion of a code-word from an error-correcting code and generating respective parity bits associated with the systematic portion; receiving from the first node at the second node, the respective parity bits; associating at the second node the respective parity bits with the paired dependent binary second node vector to form a candidate code word; and identifying by the second node a closest code word of the error-correction code by flipping one or more bits in the systematic portion of the candidate code word to form one or more bit-strings similar to the plurality of bit string pairs of the first node.

In one or more embodiments, the method includes transmitting the respective parity bits in a plurality of consecutive phases from the first node to the second node, each of the consecutive phases activated by a request from the second node to the first node if a combination of the respective parity bits sent in one or more prior phases fails to identify a valid code-word.

In one or more embodiments, a plurality of communication paths exist between the first node, the second node, a client and a server, via a plurality of communication devices, each communication device of the plurality of communication devices supporting a different communication protocol, and, wherein, two or more communication devices of the plurality of communication devices are on a client side connected locally, and form a plurality of loops from the server to the client and back to the server, and wherein each of the plurality of loops is used to generate a separate pair of dependent random variables, and a separate key component, and wherein, each of the separate key components are mixed to generate the encryption key.

In one or more embodiments, at least one of the plurality of communication paths includes a wired internet connection from the server to a first trusted device belonging to the client, and a wireless cellular connection from the server to a second trusted device belonging to the client, wherein at least one of the plurality of loops from the server to the client and back to the server are formed as (1) from server to a first client device to server; (2) from server to a second client device to server; (3) from server to first client device to second client device to server; (4) or (5) from server to second client device to first client device to server.

In one or more embodiments, the constructing the encryption key based on the one or more correlations identified between at least the first random variable and the second random variable, the first and second random variables forming the dependent random variable pair further includes: generating the first and second random variables by translating a content from a first language to a second language wherein a first node translation mechanism is different from a second node translation mechanism to produce two or more different and dependent random variables.

In one or more embodiments, the first language is one or more of a face print, voice print, fingerprint or a speed in typing on a keyboard, and the second language is a collection of one or more numerical attributes associated with the face print, voice print, fingerprint or the speed in typing on the keyboard.

In one or more embodiments, the method includes translating, for each encryption key, by capturing a new record of one or more features associated with the first language and performing the translation to the second language by extracting the numerical attributes associated with the new record; and translating, for each encryption key at a server, by using a dictionary of average numerical attributes associated with client features, and using error-correction to remove mismatches between the first random variable and the second random variable, and updating a dictionary of a plurality of average values related to one or more client features to improve client representation.

In one or more embodiments, the method includes verifying whether the pair of binary vectors, a first node vector and the paired dependent binary second node vector are identical by: applying a one-way hash function to each of the pair of binary vectors; transmitting from the first node to the second node a first hash value for comparison with a second hash value; and forming the encryption key if the first hash value matches the second hash value.

In one or more embodiments, the performing the stochastic procedure includes starting from the first node, and transmitting a plurality of data packets to the second node via a user datagram protocol, and wherein, the second node relays the plurality of data packets transmitted by the first node and received at the second node, back to the first node, and the first node relays the plurality of packets transmitted by the second node and received at the first node, back to the second node, and the operations of relaying between the first node and the second node is repeated multiple times, and the dependent random variable pair is formed by: measuring, at the first node, a difference between a first transmit time that a first packet is transmitted from the first node to the second node, and a first receive time that a last packet, transmitted by the second node, is received at the first node, and measuring, at the second node, a difference between a second receive time that the first packet transmitted by the first node is received at the second node, and a third receive time that the last packet transmitted by the first node is received at the second node.

I claim:

1. A method for encrypting data communications, comprising:
performing a stochastic procedure between a plurality of nodes, including transmitting a plurality of packets between at least a first node and a second node via a user datagram protocol;
collecting a measured outcome of the stochastic procedure, the measured outcome of the stochastic procedure providing a dependent random variable pair having at least a first random variable and a second random variable, wherein the first random variable and second random variable are functions of (i) a first travel time between the first node and the second node and (ii) a second travel time between the second node and the first node; and
constructing an encryption key based on one or more correlations identified between the at least first random variable and a second random variable.

2. The method of claim 1, wherein the performing the stochastic procedure includes:
measuring the first travel time and the second travel time as a first loop from the first node to produce the first random variable;
measuring the second travel time and the first travel time as a second loop from the second node to produce the second random variable.

3. The method of claim 2 further comprising:
routing the first loop and the second loop through one or more relay nodes; and
measuring a plurality of routed first loops and second loops, each measured routed loop corresponding to a different route between the first node and the second node.

4. The method of claim 3, wherein the measuring the plurality of routed first loops and second loops further comprises:
transmitting a plurality of data packets from the first node to the second node, each of the plurality of data packets holding pseudo-random data; and
receiving, by the first node, a plurality of indices identifying successfully received data packets of the plurality of data packets.

5. The method of claim 4, further comprising:
mixing the identified successfully received data packets at the first node and the second node;
generating the dependent random variable pair as a function of the mixing the identified successfully received data packets; and
generating an encryption key or a component of the encryption key by applying a result of the mixing.

6. The method of claim 5 wherein the mixing the identified successfully received data packets includes:
mixing based on a multi-input hash.

7. The method of claim 5 wherein the mixing the identified successfully received data packets includes:
mixing based on bit-wise addition via an exclusive OR operation (XOR).

8. The method of claim 3, wherein the measuring the plurality of routed first loops and second loops further comprises:
transmitting a plurality of modulation symbols from the first node to the second node; receiving, by the first node, a plurality of indices identifying successfully received symbols of the plurality of symbols, the successfully received symbols being symbols received with a predetermined reliability; and
determining the dependent random variable pair based on each symbol in the selected subset of modulated symbols.

9. The method of claim 8 wherein the plurality of modulation symbols are quadrature phase shift keying (QPSK) symbols.

10. The method of claim 8, further comprising:
performing quantization by the first node and the second node to locally extract a bit-string component of each dependent random variable pair, the quantization providing a range of each random variable.

11. The method of claim 10, wherein the performing quantization further comprises:
applying recursive Gray labeling as a bit-string associated with each quantization partition; and
error-correction coding to correct for mismatches between bit-string components of each dependent random variable pair.

12. The method of claim 10, wherein the error-correction coding further comprises:
repeating until a reliability criterion is met to identify a reliable plurality of pairs of binary vectors:
performing concatenating at each node one or more local components of a plurality of bit-string pairs to provide a pair of binary vectors, including a first node vector and a paired dependent binary vector at the second node;
adding a randomly selected code-word from an error-correction code to the first node vector to mask a plurality of bit values;
receiving from the first node the masked binary vector at the second node;
adding at the second node the received masked binary vector to the paired dependent binary vector at the second node;
decoding at the second node a result of each addition of the randomly selected code word;
selecting at the second node, at least one binary vector pair based on a hamming distance to a closest code-word, the hamming distance being less than a threshold as a measure of reliability;
adding an error vector at the second node, the error vector obtained by decoding the error-correction code to flip one or more bits and reduce a mismatch with the first node binary vector; notifying by the second node of a plurality of indices indicative of the reliable plurality of pairs of binary vectors; and
applying the reliable plurality of pairs of binary vectors as inputs of a mixing operation, such as bit-wise addition, exclusive OR(XOR), for generating a cryptographic key.

13. The method of claim 10 wherein the error-correction coding further comprises:
concatenating one or more local components of each node a plurality of bit-string pairs to generate at least a pair of binary vectors, a first node vector and a paired dependent binary second node vector;

identifying by the first node, the first node vector as a systematic portion of a code-word from an error-correcting code and generating respective parity bits associated with the systematic portion; receiving from the first node at the second node, the respective parity bits;

associating at the second node the respective parity bits with the paired dependent binary second node vector to form a candidate code word;

identifying by the second node a closest code word of the error-correction code by flipping one or more bits in the systematic portion of the candidate code word to form one or more bit-strings similar to the plurality of bit string pairs of the first node.

14. The method of claim 13 further comprising:
transmitting the respective parity bits in a plurality of consecutive phases from the first node to the second node, each of the consecutive phases activated by a request from the second node to the first node if a combination of the respective parity bits sent in one or more prior phases fails to identify a valid code-word.

15. The method of claim 2 wherein a plurality of communication paths exist between the first node, the second node, a client and a server, via a plurality of communication devices, each communication device of the plurality of communication devices supporting a different communication protocol, and, wherein, two or more communication devices of the plurality of communication devices are on a client side connected locally, and form a plurality of loops from the server to the client and back to the server, and wherein each of the plurality of loops is used to generate a separate pair of dependent random variables, and a separate key component, and wherein, each of the separate key components are mixed to generate the encryption key.

16. The method of claim 15, wherein at least one of the plurality of communication paths includes a wired internet connection from the server to a first trusted device belonging to the client, and a wireless cellular connection from the server to a second trusted device belonging to the client, wherein at least one of the plurality of loops from the server to the client and back to the server are formed as (1) from server to a first client device to server; (2) from server to a second client device to server; (3) from server to first client device to second client device to server; or (4) from server to second client device to first client device to server.

17. The method of claim 1 further comprising:
performing quantization by the first node and the second node to locally extract a bit-string component of each dependent random variable pair, the quantization providing a range of each random variable.

18. The method of claim 1, wherein the performing the stochastic procedure includes:
starting from the first node, and transmitting a plurality of data packets to the second node via a user datagram protocol, and wherein,
the second node relays the plurality of data packets transmitted by the first node and received at the second node, back to the first node, and
the first node relays the plurality of packets transmitted by the second node and received at the first node, back to the second node, and
the operations of relaying between the first node and the second node are repeated multiple times, and the dependent random variable pair is formed by:
measuring, at the first node, a difference between a first transmit time that a first packet is transmitted from the first node to the second node, and a first receive time that a last packet, transmitted by the second node, is received at the first node, and
measuring, at the second node, a difference between a second receive time that the first packet transmitted by the first node is received at the second node, and a third receive time that the last packet transmitted by the first node is received at the second node.

19. A system comprising:
a processor; and
a non-transitory computer-readable medium storing instructions that are operative, when executed by the processor, to:
perform a stochastic procedure between a plurality of nodes, including at least a first node and a second node by transmitting a plurality of packets between at least a first node and a second node via a user datagram protocol;
collect a measured outcome of the stochastic procedure, the measured outcome of the stochastic procedure providing a dependent random variable pair having at least a first random variable and a second random variable, wherein the first random variable and second random variable are functions of (i) a first travel time between the first node and the second node and (ii) a second travel time between the second node and the first node; and
construct an encryption key based on one or more correlations identified between at least a first random variable and a second random variable, the first and second random variables forming the dependent random variable pair.

20. The system of claim 19, wherein the performing the stochastic procedure includes instructions to cause the processor to:
measure the first travel time and the second travel time as a first loop from the first node to produce the first random variable;
measure the second travel time and the first travel time as a second loop from the second node to produce the second random variable.

21. The system of claim 19 further comprising instructions causing the processor to:
perform quantization by the first node and the second node to locally extract a bit-string component of each dependent random variable pair, the quantization providing a range of each random variable.

* * * * *